United States Patent
Amin et al.

(10) Patent No.: US 12,472,180 B2
(45) Date of Patent: *Nov. 18, 2025

(54) COMBINATIONS FOR TREATMENT OF NAFLD/NASH AND RELATED DISEASES

(71) Applicant: Pfizer Inc., New York, NY (US)

(72) Inventors: Neeta Balkrishan Amin, Cambridge, MA (US); Arthur James Bergman, Salem, CT (US); Roberto Arnaldo Calle, Marlborough, MA (US); William Paul Esler, Clinton, CT (US); Albert Myung Kim, Newton, MA (US); Jeffrey Allen Pfefferkorn, Acton, MA (US); Patrick Robert Verhoest, Newton, MA (US)

(73) Assignee: Pfizer Inc., New York, NY (US)

( * ) Notice: Subject to any disclaimer, the term of this patent is extended or adjusted under 35 U.S.C. 154(b) by 647 days.

This patent is subject to a terminal disclaimer.

(21) Appl. No.: 17/904,537

(22) PCT Filed: Feb. 22, 2021

(86) PCT No.: PCT/IB2021/051479
§ 371 (c)(1),
(2) Date: Aug. 18, 2022

(87) PCT Pub. No.: WO2021/171164
PCT Pub. Date: Sep. 2, 2021

(65) Prior Publication Data
US 2023/0218616 A1    Jul. 13, 2023

Related U.S. Application Data

(60) Provisional application No. 62/980,664, filed on Feb. 24, 2020.

(51) Int. Cl.
*A61K 31/506* (2006.01)
*A61K 31/438* (2006.01)
*A61P 1/16* (2006.01)
*A61P 3/00* (2006.01)

(52) U.S. Cl.
CPC .......... *A61K 31/506* (2013.01); *A61K 31/438* (2013.01); *A61P 1/16* (2018.01); *A61P 3/00* (2018.01); *C07B 2200/13* (2013.01)

(58) Field of Classification Search
CPC .... A61K 31/506; A61K 31/438; A61K 45/06; A61P 1/16; A61P 3/00; A61P 3/04; A61P 3/06; A61P 3/10; A61P 9/10; C07B 2200/13

USPC ......................................................... 514/256
See application file for complete search history.

(56) References Cited

U.S. PATENT DOCUMENTS

| 11,254,660 B2 * | 2/2022 | Esler | A61P 1/16 |
| 12,247,022 B2 * | 3/2025 | Esler | A61P 3/10 |
| 2018/0051012 A1 * | 2/2018 | Boehm | A61P 27/06 |

FOREIGN PATENT DOCUMENTS

| WO | 2018033832 | 2/2018 | |
| WO | 2020044266 | 3/2020 | |
| WO | WO-2020044266 A1 * | 3/2020 | A61K 31/438 |
| WO | 2020234726 | 11/2020 | |

OTHER PUBLICATIONS

International Patent Application No. PCT/IB2021/051479, filed Feb. 22, 2021, International Preliminary Report on Patentability and Written Opinion of the International Searching Authority, mailed Aug. 30, 2022, 7 pages.
Anonymous: "NCT03776175—A Study To Assess Pharmacodynamics, Safety And Tolerability of PF-05221304 And PF-06865571 Co-Administered for 6 weeks In Adults With Non-Alcoholic Fatty Liver Disease", Clinical Trials.gov., Dec. 14, 2018, pp. 1-10, XP055801758, https://clinicaltrials.gov/ct2/show/record/NCT3776175.
Anonymous: NCT04321031—Metabolic Inteventions to Resolve Non-alcoholic Steatohepatitis (NASH) with Fibrosis (MIRNA), Clinical Trials.gov., Mar. 25, 2020, pp. 1-8, XP055801752, https://clinicaltrials.gov/ct2show/record/NCT04321031.
International Patent Application No. PCT/IB2021/051479, filed Feb. 22, 2021, International Search Report and Written Opinion, mailed May 25, 2021, 15 pages.
Ross, T.R., et al., "Co-administration of acc inhibitor PF-05221304 and the DGAT2 inhibitor PF-06865571 produces greater efficacy and mitigates ACC inhibitormediated increases in circulation triglyceride NAFLD/NASH models", Hepatology, Oct. 1, 2019, pp. 1258A, vol. 70 (Supplement 1).

* cited by examiner

*Primary Examiner* — Yevgeny Valenrod
(74) *Attorney, Agent, or Firm* — Zhigang Rao

(57) ABSTRACT

A method for treating fatty liver disease and related diseases or disorders with a therapeutically effective amount of a composition comprising from about 25 mg to about 1200 mg of (S)-2-(5-((3-ethoxypyridin-2-yl)oxy)pyridin-3-yl)-N-(tetrahydrofuran-3-yl)pyrimidine-5-carboxamide or a pharmaceutically acceptable salt thereof, and from about 5 mg to about 40 mg of 4-(4-(1-Isopropyl-7-oxo-1,4,6,7-tetrahydrospiro[indazole-5,4'-piperidine]-1'-carbonyl)-6-methoxypyridin-2-yl)benzoic acid or a pharmaceutically acceptable salt thereof.

17 Claims, 29 Drawing Sheets

FIG. 12
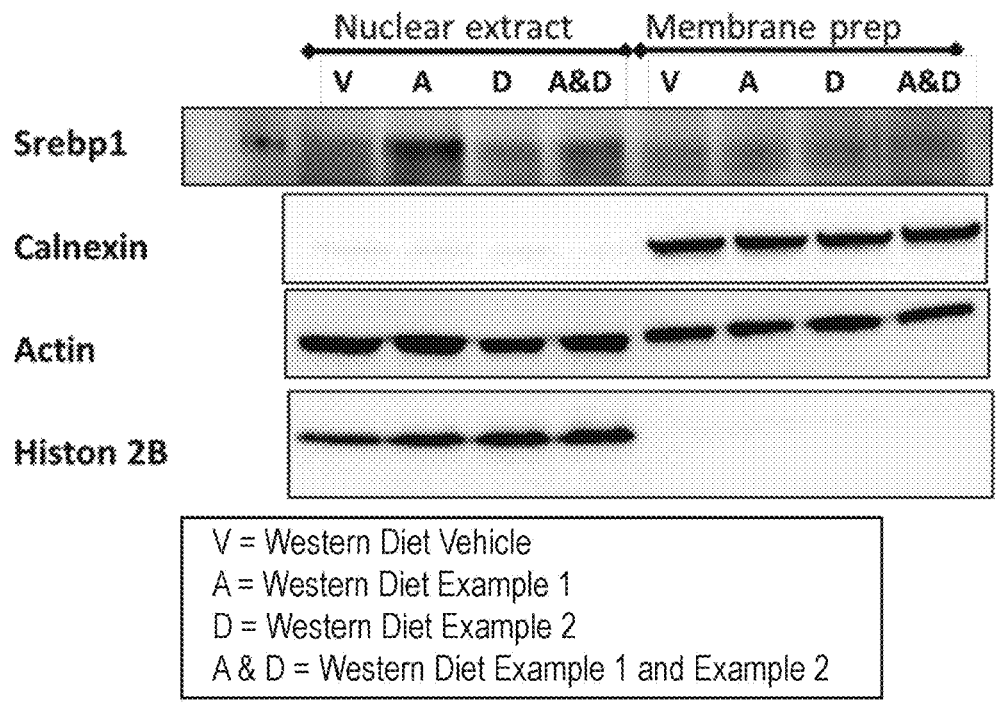
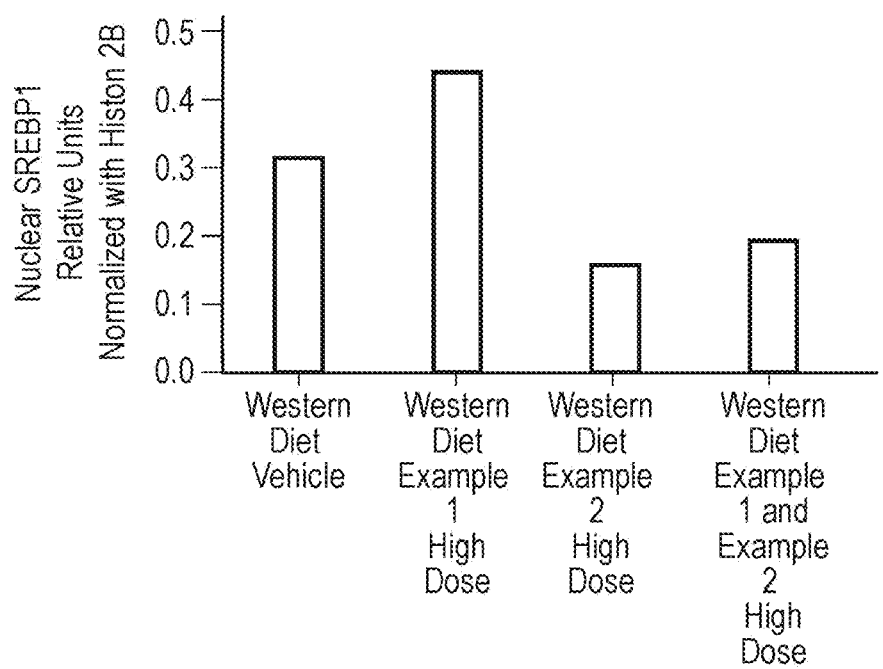

COMBINATIONS FOR TREATMENT OF NAFLD/NASH AND RELATED DISEASES

This application is a national stage application under 35 U.S.C. 371 of PCT/NB2021/051479, filed on Feb. 22, 2021, which claims the benefit of U.S. Provisional Patent Application No. 62/980,664, filed on Feb. 24, 2020, the disclosures of which are hereby incorporated by reference in their entirety.

FIELD OF THE INVENTION

The invention relates to new pharmaceutical compositions comprising (S)-2-(5-((3-ethoxypyridin-2-yl)oxy)pyridin-3-yl)-N-(tetrahydrofuran-3-yl)pyrimidine-5-carboxamide, or pharmaceutically acceptable salt thereof, and 4-(4-(1-Isopropyl-7-oxo-1,4,6,7-tetrahydrospiro[indazole-5,4'-piperidine]-1'-carbonyl)-6-methoxypyridin-2-yl)benzoic acid, or pharmaceutically acceptable salt thereof, for treatment fatty liver disease and diseases related thereto.

BACKGROUND OF THE INVENTION

Nonalcoholic steatohepatitis (NASH) is a clinical and histological subset of non-alcoholic fatty liver disease (NAFLD, defined as presence of ≥5% hepatic steatosis) that is associated with increased all cause mortality, cirrhosis and end stage liver disease, increased cardiovascular mortality, and increased incidence of both liver related and non-liver related cancers (Sanyal et al, *Hepatology* 2015; 61(4):1392-1405). NAFLD is the hepatic manifestation of metabolic syndrome, and is a spectrum of hepatic conditions encompassing steatosis, NASH, fibrosis, cirrhosis and ultimately hepatocellular carcinoma. NAFLD and NASH are considered the primary fatty liver diseases as they account for the greatest proportion of individuals with elevated hepatic lipids. The severity of NAFLD/NASH is based on the presence of lipid, inflammatory cell infiltrate, hepatocyte ballooning, and the degree of fibrosis. At the present time, treatment options are limited to management of associated conditions (EASL-EASD-EASO Clinical Practice Guidelines, *J. Hepatol.* 2016; 64(6):1388-1402).

Alterations in lipid metabolism have been hypothesized to contribute to the molecular pathogenesis of NAFLD and NASH. Steatosis is a necessary but not sufficient component of the pathogenesis of NASH (Day C, and James O., Hepatology. 1998; 27(6):1463-6). Consistent with this, multiple studies have demonstrated that the severity of steatosis predicts the risk of concomitant steatohepatitis as well as the risk of progression to cirrhosis (Sorensen et al, *Lancet.* 1984; 2(8397): 241-4; Wanless I and Lentz J, *Hepatology* 1990; 12(5):1106-10; Reeves H, et al, *J. Hepatol.* 1996; 25(5): 677-83). Hepatic steatosis is a consequence of an imbalance in triglyceride production/uptake into the liver and clearance/removal (Cohen J C, et al, *Science.* 2011; 332(6037): 1519-1523). It is hypothesized that reducing steatosis, the metabolic driver underpinning the development of NAFLD/NASH, will result in subsequent improvements in hepatic inflammation and fibrosis.

Acetyl-CoA Carboxylase (ACC) and diacylglycerol acyltransferase 2 (DGAT2) are two key enzymes regulating lipid metabolism. ACC catalyzes an essential and rate limiting step in the process of de novo lipogenesis (DNL) (Saggerson D, *Annu. Rev. Nutr.* 2008; 28:253-72.). Further, ACC also regulates mitochondrial beta-oxidation of fatty acids through allosteric regulation of the enzyme carnitine palmitoyltransferase 1 (CPT1) (Saggerson, 2008; Waite M, and Wakil S J. *J. Biol. Chem.* 1962; 237:2750-2757.). Emerging data also suggest that suppression of DNL through ACC inhibition may directly reduce inflammation by restraining the formation of the inflammatory interleukin-17 (IL-17) secreting T-cells of the T helper 17 lineage (Th17 cells) and favoring the development of anti-inflammatory FoxP3(+) regulatory T (Treg) cells (Berod L, et al. *Nat. Med.* 2014; 20(11): 1327-33).

Inhibition of ACC activity is hypothesized to be beneficial to patients with NASH by at least two independent mechanisms. As summarized above, humans with NAFLD show marked elevations in hepatic DNL and normalization of this increased flux through pharmacologic hepatic ACC inhibition is hypothesized to reduce steatosis. In addition, the effect of ACC inhibitors to increase fatty acid oxidation may also contribute to reduce liver fat content. Consistent with this, ACC inhibitors have been shown to inhibit DNL. See Griffith D A, et al. *J. Med. Chem.* 2014; 57(24):10512-10526; Kim C W, et al. *Cell Metab.* 2017; 26, 394-406; Stiede K, et al. *Hepatology.* 2017; 66(2):324-334; Lawitz E J, et al. *Clin Gastroenterol Hepatol.* 2018 (https://doi.org/10.1016/j.cgh.2018.04.042). In addition, inhibition of DNL in IL-17 secreting T-cells is expected to suppress hepatic inflammation by restraining the formation of the inflammatory Th17 cells (Berod et al., 2014), a pathway that may be important in NASH pathogenesis (Rau M, et al. *J. Immunol.* 2016; 196(1):97-105), and favoring the development of anti-inflammatory Treg cells. Further, ACC inhibition may reduce stellate cell activation and fibrosis (Ross et al., 2019).

Triglycerides or triacylglycerols (TG) represent a major form of energy storage in mammals. TG's are formed by the sequential esterification of glycerol with three fatty acids of varying chain lengths and degrees of saturation (Coleman, R. A., and Mashek, D. G. 2011. *Chem. Rev.* 111: 6359-6386). TG synthesized in the intestine or liver are packaged into chylomicrons or very low-density lipoprotein (VLDL), respectively, and exported to peripheral tissues where they are hydrolyzed to their constituent fatty acids and glycerol by lipoprotein lipase (LPL). The resultant non-esterified fatty acids (NEFA) can either be metabolized further to produce energy or reesterified and stored.

Under normal physiological conditions, the energy-dense TG remains sequestered in various adipose depots until there is a demand for its release, whereupon, it is hydrolyzed to glycerol and free fatty acids which are then released into the blood stream. This process is tightly regulated by the opposing actions of insulin and hormones such as catecholamines which promote the deposition and mobilization of TG stores under various physiological conditions. In the post-prandial setting, insulin acts to inhibit lipolysis, thereby, restraining the release of energy in the form of NEFA and ensuring the appropriate storage of dietary lipids in adipose depots. However, in patients with type 2 diabetes, the ability of insulin to suppress lipolysis is ameliorated and NEFA flux from adipocytes is inappropriately elevated. This, in turn, results in increased delivery of lipid to tissues such as muscle and liver. In the absence of energetic demand the TG and other lipid metabolites, such as diacylglycerol (DAG) can accumulate and cause a loss of insulin sensitivity (Erion, D. M., and Shulman, G. I. 2010. Nat Med 16: 400-402). Insulin resistance in muscle is characterized by reduced glucose uptake and glycogen storage, whilst in the liver, loss of insulin signaling gives rise to dysregulated glucose output and over-production of TG-rich VLDL, a hallmark of type 2 diabetes (Choi, S. H., and Ginsberg, H. N. 2011. *Trends Endocrinol. Metab.* 22: 353-363). Elevated secretion of TG-enriched VLDL, so called VLDL1 particles, is thought to stimulate the production of small, dense low-density lipoprotein (sdLDL), a proatherogenic subfraction of LDL that is associated with elevated risk of coronary heart disease (St-Pierre, A. C. et. al. 2005. *Arterioscler. Thromb. Vasc. Biol.* 25: 553-559).

In mammals, two diacylglycerol acyltransferases (DGAT) enzymes (DGAT1 and DGAT2) have been characterized. Although these enzymes catalyze the same enzymatic reaction, their respective amino acid sequences are unrelated and they occupy distinct gene families. Mice harboring a disruption in the gene encoding DGAT1 are resistant to diet-induced obesity and have elevated energy expenditure and activity (Smith, S. J. et. al., 2000. *Nat Genet* 25: 87-90). Dgat1−/− mice exhibit dysregulated postaborpative release of chylomicrons and accumulate lipid in the enterocytes (Buhman, K. K. et. al. 2002. *J. Biol. Chem.* 277: 25474-25479). The metabolically favorable phenotype observed in these mice is suggested to be driven by loss of DGAT1 expression in the intestine (Lee, B., et. al. 2010. *J. Lipid Res.* 51: 1770-1780). Importantly, despite a defect in lactation in female Dgat1−/− mice, these animals retain the capacity to synthesize TG suggesting the existence of additional DGAT enzymes. This observation and the isolation of a second DGAT from the fungus *Mortierella rammaniana* led to the identification and characterization of DGAT2 (Yen, C. L. et. al. 2008. J. Lipid Res. 49: 2283-2301).

DGAT2 is highly expressed in liver and adipose, and unlike DGAT1, exhibits exquisite substrate specificity for DAG (Yen, C. L., 2008). Deletion of the DGAT2 gene in rodents results in defective intrauterine growth, severe lipemia, impaired skin barrier function, and early post-natal death (Stone, S. J. et. al. 2004. *J. Biol. Chem.* 279: 11767-11776). Due to the lethality caused by loss of DGAT2, much of our understanding of the physiological role of DGAT2 derives from studies performed with antisense oligonucleotides (ASO) in rodent models of metabolic disease. In this setting, inhibition of hepatic DGAT2 resulted in improvements in plasma lipoprotein profile (decrease in total cholesterol and TG) and a reduction of hepatic lipid burden which was accompanied by improved insulin sensitivity and whole-body glucose control (Liu, Y. et. al. 2008. *Biochim. Biophys. Acta* 1781: 97-104; Choi, C. S. et. al. 2007. *J. Biol. Chem.* 282: 22678-22688; Yu, X. X. et. al. 2005. *Hepatology* 42: 362-371). Although the molecular mechanisms underlying these observations are not fully elucidated, it is clear that suppression of DGAT2 results in a down-regulation of the expression of multiple genes encoding proteins involved in lipogensis, including sterol regulatory element-binding proteins 1c (SREBP1c) and stearoyl CoA-desaturase 1 (SCD1) (Choi, 2007; Yu, 2005). In parallel, oxidative pathways are induced as evidenced by increased expression of genes such as carnitine palmitoyl transferase 1 (CPT1) (Choi, 2007). The net result of these changes is to decrease the levels of hepatic DAG and TG lipid which, in turn, leads to improved insulin responsiveness in the liver. Furthermore, DGAT2 inhibition suppresses hepatic VLDL TG secretion and reduction in circulating cholesterol levels. Finally, plasma apolipoprotein B (APOB) levels were suppressed, possibly due to decreased supply of TG for lipidation of the newly synthesized APOB protein (Liu, 2008; Yu, 2005). The beneficial effects of DGAT2 inhibition on both glycemic control and plasma cholesterol profile suggest that this target might be valuable in the treatment of metabolic disease (Choi, 2007). In addition, the observation that suppression of DGAT2 activity results in reduced hepatic lipid accumulation suggests that inhibitors of this enzyme might have utility in the treatment of NASH.

In view of the above, there exists a need for medicaments, for example, oral medicaments, containing combination of (S)-2-(5-((3-ethoxypyridin-2-yl)oxy)pyridin-3-yl)-N-(tetrahydrofuran-3-yl)pyrimidine-5-carboxamide (DGAT2 inhibitor) or a pharmaceutically acceptable salt thereof, and 4-(4-(1-Isopropyl-7-oxo-1,4,6,7-tetrahydrospiro[indazole-5,4'-piperidine]-1'-carbonyl)-6-methoxypyridin-2-yl)benzoic acid (ACCI inhibitor) or a pharmaceutically acceptable salt thereof. The specific combinations described herein satisfy the existing need.

SUMMARY OF THE INVENTION

The invention is directed to a method for treating a disease or condition selected from fatty liver; nonalcoholic fatty liver disease; nonalcoholic steatohepatitis; nonalcoholic steatohepatitis with liver fibrosis; nonalcoholic steatohepatitis with cirrhosis; and nonalcoholic steatohepatitis with cirrhosis and with hepatocellular carcinoma or with a metabolic-related disease, the method comprising the steps of: administering to a human in need thereof a therapeutically effective amount of a composition comprising from about 5 mg to about 1200 mg of (S)-2-(5-((3-ethoxypyridin-2-yl)oxy)pyridin-3-yl)-N-(tetrahydrofuran-3-yl)pyrimidine-5-carboxamide or a pharmaceutically acceptable salt thereof, and from about 5 mg to about 60 mg of 4-(4-(1-Isopropyl-7-oxo-1,4,6,7-tetrahydrospiro[indazole-5,4'-piperidine]-1'-carbonyl)-6-methoxypyridin-2-yl)benzoic acid or a pharmaceutically acceptable salt thereof.

The present invention is also directed to a method for treating a disease or condition selected from fatty liver; alcoholic fatty liver disease; alcoholic steatohepatitis; alcoholic steatohepatitis with liver fibrosis; alcoholic steatohepatitis with cirrhosis; and alcoholic steatohepatitis with cirrhosis and with hepatocellular carcinoma or with a metabolic-related disease, the method comprising the steps of: administering to a human in need thereof a therapeutically effective amount of a composition comprising from about 5 mg to about 1200 mg of (S)-2-(5-((3-ethoxypyridin-2-yl)oxy)pyridin-3-yl)-N-(tetrahydrofuran-3-yl)pyrimidine-5-carboxamide or a pharmaceutically acceptable salt thereof, and from about 5 mg to about 60 mg of 4-(4-(1-Isopropyl-7-oxo-1,4,6,7-tetrahydrospiro[indazole-5,4'-piperidine]-1'-carbonyl)-6-methoxypyridin-2-yl)benzoic acid or a pharmaceutically acceptable salt thereof.

The present invention is also directed to a method for treating a cardiovascular disease or condition selected from, atherosclerosis, stroke, myocardial infarction, aortic vascular disease, cerebral vascular disease, renal vascular disease, heart failure, atrial fibrillation, or coronary heart disease, the method comprising the steps of: administering to a human in need thereof a therapeutically effective amount of a composition comprising from about 5 mg to about 1200 mg of (S)-2-(5-((3-ethoxypyridin-2-yl)oxy)pyridin-3-yl)-N-(tetrahydrofuran-3-yl)pyrimidine-5-carboxamide or a pharmaceutically acceptable salt thereof, and from about 5 mg to about 60 mg of 4-(4-(1-Isopropyl-7-oxo-1,4,6,7-tetrahydrospiro[indazole-5,4'-piperidine]-1'-carbonyl)-6-methoxypyridin-2-yl)benzoic acid or a pharmaceutically acceptable salt thereof.

The present invention is also directed to a method for treating a metabolic disease or condition selected from obesity, dyslipidemia, type 2 diabetes mellitus, glycemic control in patients with type 2 diabetes mellitus, conditions of impaired glucose tolerance (IGT), conditions of impaired fasting plasma glucose, metabolic syndrome, syndrome X, hyperglycemia, hyperinsulinemia, insulin resistance, or impaired glucose metabolism, the method comprising the steps of: administering to a human in need thereof a therapeutically effective amount of a composition comprising from about 5 mg to about 1200 mg of (S)-2-(5-((3-ethoxypyridin-2-yl)oxy)pyridin-3-yl)-N-(tetrahydrofuran-3-yl)pyrimidine-5-carboxamide or a pharmaceutically acceptable salt thereof, and from about 5 mg to about 60 mg of 4-(4-(1-Isopropyl-7-oxo-1,4,6,7-tetrahydrospiro[indazole-5,4'-piperidine]-1'-carbonyl)-6-methoxypyridin-2-yl)benzoic acid or a pharmaceutically acceptable salt thereof.

It is to be understood that both the foregoing general description and the following detailed description are exemplary and explanatory only and are not restrictive of the invention, as claimed.

BRIEF DESCRIPTION OF THE DRAWINGS

FIG. 12 summarizes the effect of administration of Compound A and Compound D as monotherapy and in combination on SREBP-1 nuclear localization in Western diet fed rats.

DETAILED DESCRIPTION OF THE INVENTION

Figure 1:
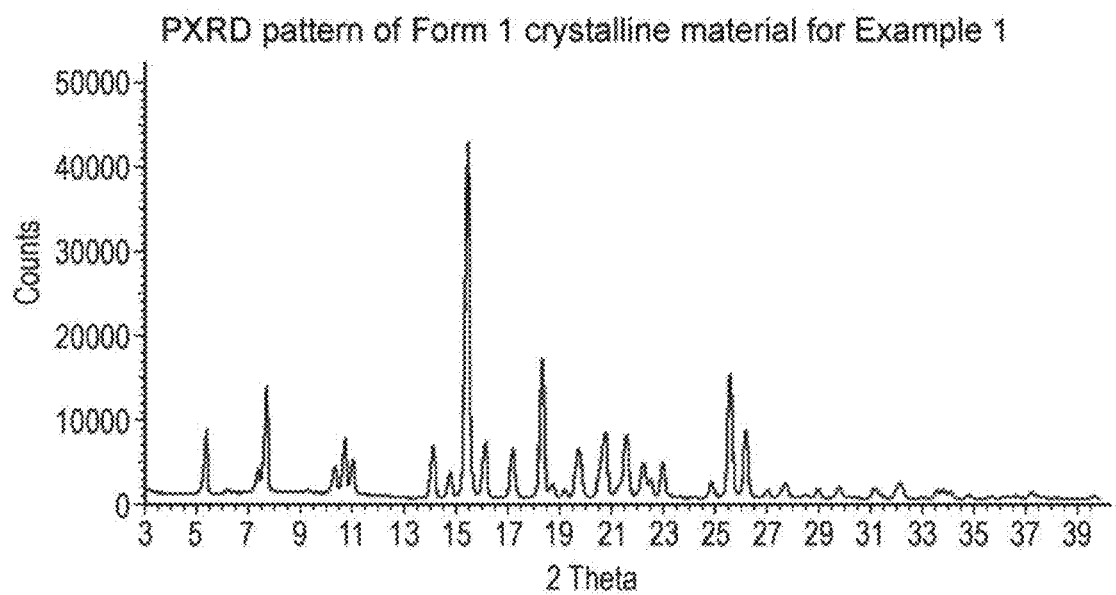
FIG. 1 is a characteristic x-ray powder diffraction pattern showing crystalline Form 1 of Example 1 of the DGAT2i Compound (Compound D) (Vertical Axis: Intensity (CPS); Horizontal Axis: Two theta (degrees)).

The invention may be understood more readily by reference to the following detailed description of exemplary embodiments of the invention and the examples included therein.

It is to be understood that this invention is not limited to specific synthetic methods of making that may of course vary. It is also to be understood that the terminology used herein is for the purpose of describing particular embodiments only and is not intended to be limiting. In this specification and in the claims that follow, reference will be made to a number of terms that shall be defined to have the following meanings:

As used herein in the specification, "a" or "an" may mean one or more. As used herein in the claim(s), when used in conjunction with the word "comprising", the words "a" or "an" may mean one or more than one. As used herein "another" may mean at least a second or more.

The term "about" refers to a relative term denoting an approximation of plus or minus 10% of the nominal value it refers. For the field of this disclosure, this level of approximation is appropriate unless the value is specifically stated to require a tighter range.

"Compounds" when used herein includes the compounds described herein or any pharmaceutically acceptable derivative or variation, including conformational isomers (e.g., cis and trans isomers) and all optical isomers (e, enantiomers and diastereomers), racemic, diastereomeric and other mixtures of such isomers, as well as solvates, hydrates, isomorphs, polymorphs, tautomers, esters, salt forms, and prodrugs. The expression "prodrug" refers to compounds that are drug precursors which following administration, release the drug in vivo via some chemical or physiological process (e.g., a prodrug on being brought to the physiological pH or through enzyme action is converted to the desired drug form). Exemplary prodrugs upon cleavage release the corresponding free acid, and such hydrolyzable ester-forming residues of the compounds of the invention include but are not limited to those having a carboxyl moiety wherein the free hydrogen is replaced by ($C_1$-$C_4$)alkyl, ($C_2$-$C_7$) alkanoyloxymethyl, 1-(alkanoyloxy)ethyl having from 4 to 9 carbon atoms, 1-methyl-1-(alkanoyloxy)-ethyl having from 5 to 10 carbon atoms, alkoxycarbonyloxymethyl having from 3 to 6 carbon atoms, 1-(alkoxycarbonyloxy)ethyl having from 4 to 7 carbon atoms, 1-methyl-1-(alkoxycarbonyloxy)ethyl having from 5 to 8 carbon atoms, N-(alkoxycarbonyl)aminomethyl having from 3 to 9 carbon atoms, 1-(N-(alkoxycarbonyl)amino)ethyl having from 4 to 10 carbon atoms, 3-phthalidyl, 4-crotonolactonyl, gamma-butyrolacton-4-yl, di-N,N—($C_1$-$C_2$)alkylamino($C_2$-$C_3$)alkyl (such as p-dimethylaminoethyl), carbamoyl-($C_1$-$C_2$)alkyl, N,N-di ($C_1$-$C_2$)alkylcarbamoyl-($C_1$-$C_2$)alkyl and piperidino-, pyrrolidino- or morpholino($C_2$-$C_3$)alkyl.

"Patient" refers to warm blooded animals such as, for example, guinea pigs, mice, rats, gerbils, cats, rabbits, dogs, cattle, goats, sheep, horses, monkeys, chimpanzees, and humans.

A "mammal" is a patient.

By "pharmaceutically acceptable" is meant that the substance or composition must be compatible chemically and/or toxicologically, with the other ingredients comprising a formulation, and/or the mammal being treated therewith.

As used herein, the following terms have the general meaning for administration of pharmaceutical agents: QD means once daily and BID means twice daily.

As used herein, the term "selectivity" or "selective" refers to a greater effect of a compound in a first assay, compared to the effect of the same compound in a second assay. For example, in "gut selective" compounds, the first assay is for the half-life of the compound in the intestine and the second assay is for the half-life of the compound in the liver.

"Therapeutically effective amount" means an amount of a compound described herein that treats the particular disease, condition, or disorder described herein. "Therapeutically effective amount" can also mean an amount of 4-(4-(1-Isopropyl-7-oxo-1,4,6,7-tetrahydrospiro[indazole-5,4'-piperidine]-1'-carbonyl)-6-methoxypyridin-2-yl)benzoic acid in combination with an amount of (S)-2-(5-((3-Ethoxypyridin-2-yl)oxy)pyridin-3-yl)-N-(tetrahydrofuran-3-yl)pyrimidine-5-carboxamide, optionally, in combination with an amount of another compound(s), that treats the particular disease, condition, or disorder described herein.

The term "treating", "treat" or "treatment" as used herein embraces preventative, i.e., prophylactic; palliative treatment, i.e., relieve, alleviate, or slow the progression of the patient's disease (or condition) or any tissue damage associated with the disease (or condition); and reversal where the patient's disease (or condition) is not only alleviated but any tissue damage associated with the disease (or condition) is placed in a better state then when treatment was initiated. This latter could occur, for example and not limitation, from any one or more of the following: demonstration of NASH resolution and/or from an improvement in the fibrosis score based on liver biopsy; lower incidence of progression to cirrhosis, hepatocellular carcinoma, and/or other liver related outcomes; a reduction or improvement of the level of serum or imaging based markers of nonalcoholic steatohepatitis activity; reduction or improvement of nonalcoholic steatohepatitis disease activity; or reduction in the medical consequences of nonalcoholic steatohepatitis.

The compounds of the invention may contain asymmetric or chiral centers, and, therefore, exist in different stereoisomeric forms. Unless specified otherwise, it is intended that all stereoisomeric forms of the compounds of the invention as well as mixtures thereof, including racemic mixtures, form part of the invention. In addition, the invention embraces all geometric and positional isomers. For example, if a compound of the invention incorporates a double bond or a fused ring, both the cis- and trans-forms, as well as mixtures, are embraced within the scope of the invention.

Chiral compounds of the invention (and chiral precursors thereof) may be obtained in enantiomerically-enriched form using chromatography, typically high pressure liquid chromatography (HPLC) or supercritical fluid chromatography (SFC), on a resin with an asymmetric stationary phase and with a mobile phase consisting of a hydrocarbon, typically heptane or hexane, containing from 0 to 50% isopropanol, typically from 2 to 20%, and from 0 to 5% of an alkylamine, typically 0.1% diethylamine (DEA) or isopropylamine. Concentration of the eluent affords the enriched mixture.

Diastereomeric mixtures can be separated into their individual diastereoisomers on the basis of their physical chemical differences by methods well known to those skilled in the art, such as by chromatography and/or fractional crystallization. Enantiomers can be separated by converting the enantiomeric mixture into a diastereomeric mixture by reaction with an appropriate optically active compound (e.g. chiral auxiliary such as a chiral alcohol or Mosher's acid chloride), separating the diastereoisomers and converting (e.g. hydrolyzing) the individual diastereoisomers to the corresponding pure enantiomers. Enantiomers can also be separated by use of a chiral HPLC column. Alternatively, the specific stereoisomers may be synthesized by using an optically active starting material, by asymmetric synthesis using optically active reagents, substrates, catalysts or solvents, or by converting one stereoisomer into the other by asymmetric transformation.

Where the compounds of the invention possess two or more stereogenic centers and the absolute or relative stereochemistry is given in the name, the designations R and S refer respectively to each stereogenic center in ascending numerical order (1, 2, 3, etc.) according to the conventional IUPAC number schemes for each molecule. Where the compounds of the invention possess one or more stereogenic centers and no stereochemistry is given in the name or structure, it is understood that the name or structure is intended to encompass all forms of the compound, including the racemic form.

It is also possible that the intermediates and compounds of the invention may exist in different tautomeric forms, and all such forms are embraced within the scope of the invention. The term "tautomer" or "tautomeric form" refers to structural isomers of different energies which are interconvertible via a low energy barrier. For example, proton tautomers (also known as prototropic tautomers) include interconversions via migration of a proton, such as keto-enol and imine-enamine isomerizations.

Valence tautomers include interconversions by reorganization of some of the bonding electrons.

Included within the scope of the claimed compounds invention are all stereoisomers, geometric isomers and tautomeric forms of the compounds of the invention, including compounds exhibiting more than one type of isomerism, and mixtures of one or more thereof.

Also included are acid addition or base salts wherein the counterion is optically active, for example, D-lactate or L-lysine, or racemic, for example, DL-tartrate or DL-arginine.

The invention includes all pharmaceutically acceptable isotopically-labelled compounds of the invention wherein one or more atoms are replaced by atoms having the same atomic number, but an atomic mass or mass number different from the atomic mass or mass number usually found in nature.

Examples of isotopes suitable for inclusion in the compounds of the invention include isotopes of hydrogen, such as $^2$H and $^3$H, carbon, such as $^{11}$C, $^{13}$C and $^{14}$C, chlorine, such as $^{36}$Cl, fluorine, such as $^{18}$F, iodine, such as $^{123}$I, $^{124}$I and $^{125}$I, nitrogen, such as $^{13}$N and $^{15}$N, oxygen, such as $^{15}$O, $^{17}$O and $^{18}$O, phosphorus, such as $^{32}$P, and sulphur, such as $^{35}$S.

Certain isotopically-labelled compounds of the invention, for example, those incorporating a radioactive isotope, are useful in drug and/or substrate tissue distribution studies. The radioactive isotopes tritium, i.e. $^3$H, and carbon-14, i.e. $^{14}$C, are particularly useful for this purpose in view of their ease of incorporation and ready means of detection.

Substitution with heavier isotopes such as deuterium, i.e. $^2$H, may afford certain therapeutic advantages resulting from greater metabolic stability, for example, increased in vivo half-life or reduced dosage requirements, and hence may be preferred in some circumstances.

Substitution with positron emitting isotopes, such as C, $^{18}$F, $^{15}$O and $^{13}$N, can be useful in Positron Emission Tomography (PET) studies for examining substrate receptor occupancy.

Isotopically-labelled compounds of the invention can generally be prepared by conventional techniques known to those skilled in the art or by processes analogous to those described in the accompanying Examples and Preparations using an appropriate isotopically-labelled reagents in place of the non-labelled reagent previously employed.

The compounds of the invention may be isolated and used per se, or when possible, in the form of its pharmaceutically acceptable salt. The term "salts" refers to inorganic and organic salts of a compound of the invention. These salts can be prepared in situ during the final isolation and purification of a compound, or by separately treating the compound with a suitable organic or inorganic acid or base and isolating the salt thus formed. The acids which are used to prepare the pharmaceutically acceptable acid addition salts of the aforementioned base compounds of this invention are those which form non-toxic acid addition salts, (i.e., salts containing pharmacologically acceptable anions, such as the hydrochloride, hydrobromide, hydroiodide, nitrate, sulfate, bisulfate, phosphate, acid phosphate, acetate, lactate, citrate, acid citrate, tartrate, bitartrate, succinate, maleate, fumarate, gluconate, saccharate, benzoate, methanesulfonate, ethanesulfonate, benzenesulfonate, naphthylate, mesylate, glucoheptonate, lactobionate, laurylsulphonate, hexafluorophosphate, benzene sulfonate, tosylate, formate, trifluoroacetate, oxalate, besylate, palmitiate, pamoate, malonate, stearate, laurate, malate, borate, p-toluenesulfonate and pamoate (i.e., 1,1'-methylene-bis-(2-hydroxy-3-naphthoate)) salts.

The invention also relates to base addition salts of the compounds of the invention. The chemical bases that may be used as reagents to prepare pharmaceutically acceptable base salts of those compounds of the invention that are acidic in nature are those that form non-toxic base salts with such compounds. Such non-toxic base salts include, but are not limited to those derived from such pharmacologically acceptable cations such as alkali metal cations (e.g., lithium, potassium and sodium) and alkaline earth metal cations (e.g., calcium and magnesium), ammonium or water-soluble amine addition salts such as N-methylglucamine-(meglumine), tetramethylammonium, tetraethylammonium, methylamine, dimethylamine, trimethylamine, triethylamine, ethylamine, and the lower alkanolammonium and other base salts of pharmaceutically acceptable organic amines. See e.g. Berge, et al. *J. Pharm. Sci.* 66, 1-19 (1977).

Certain compounds of the invention may exist in more than one crystal form (generally referred to as "polymorphs"). Polymorphs may be prepared by crystallization under various conditions, for example, using different solvents or different solvent mixtures for recrystallization, crystallization at different temperatures; and/or various modes of cooling, ranging from very fast to very slow cooling during crystallization. Polymorphs may also be obtained by heating or melting the compound of the invention followed by gradual or fast cooling. The presence of polymorphs may be determined by solid probe NMR spectroscopy, IR spectroscopy, differential scanning calorimetry, powder X-ray diffraction or such other techniques.

4-(4-(1-Isopropyl-7-oxo-1,4,6,7-tetrahydrospiro[indazole-5,4'-piperidine]-1'-carbonyl)-6-methoxypyridin-2-yl)benzoic acid (also referred to as "Compound A) is a selective ACC inhibitor and was prepared as the free acid in Example 9 of U.S. Pat. No. 8,859,577, which is the U.S. national phase of International Application No. PCT/IB2011/054119, both of which are hereby incorporated herein by reference in their entireties. Crystalline forms of the compound are described in International patent application no. PCT/IB2018/058966, published as WO 2019/102311 on 31 May 2019, the disclosure of which is herby incorporated herein by reference in its entirety.

It appears that the administration of an ACC inhibitor may have positive effects to lower hepatic triglycerides and potentially other beneficial effects on treatment of NASH. Increases in circulating triglycerides levels has been reported to be a mechanistic consequence of hepatic ACC inhibition (Kim et al, 2017), though doses of ACC inhibitors that only partially inhibit DNL may not produce elevations in circulating triglycerides (Bergman et al., ACCP, Clinical Pharmacology in Drug Develeopment 2020, 00(0) 1-13). WO2016/112305 provides methods of treating, stabilizing or lessening the severity or progression of a non-alcoholic fatty liver disease using an ACC inhibitor alone or with one or more additional therapeutic agents. It has been discovered that administration of 4-(4-(1-isopropyl-7-oxo-1,4,6,7-tetrahydrospiro[indazole-5,4'-piperidine]-1'-carbonyl)-6-methoxypyridin-2-yl)benzoic acid, optionally administered as a pharmaceutically acceptable salt, has a potential to result in elevations in circulating triglycerides (generally measured from plasma or serum) in Western diet fed Sprague Dawley rats as was observed in human subjects. In addition, decreases in platelets has been reported with administration of 4-(4-(1-Isopropyl-7-oxo-1,4,6,7-tetrahydrospiro[indazole-5,4'-piperidine]-1'-carbonyl)-6-methoxypyridin-2-yl)benzoic acid (Bergman, A., et al., "Safety, tolerability, pharmacokinetics and pharmacodynamics of a liver-targerting ACC inhibitor following single and multiple oral doses", J. Hepatology, April 2018, Vol. 68, Supp 1, Pg. S582.

(S)-2-(5-((3-Ethoxypyridin-2-yl)oxy)pyridin-3-yl)-N-(tetrahydrofuran-3-yl)pyrimidine-5-carboxamide (also referred to as "Compound D) is a DGAT2 inhibitor and is Example 1 in US Published Patent Application US 2018-0051012A1 which is hereby incorporated herein by reference in its entirety. It was discovered that co-administration of a DGAT2 inhibitor with an ACC inhibitor would reverse the ACC inhibitor-induced triglyceride elevations and produce greater efficacy then monotherapy. It was also unexpectedly discovered that co-administration of a DGAT2 inhibitor with an ACC inhibitor mitigated the decrease in platelet count associated with ACC inhibitor monotherapy.

While liver biopsy remains the standard for identification of NASH patients, non-invasive methods for identifying patients with inflammatory liver disease have been described by Drescher, H., et al., ("Current status in testing for nonalcoholic fatty liver disease (NAFLD) and non-alcoholic steatohepatitis (NASH), Cells 2019, 8, 845). These non-invasive surrogate markers include, blood tests, liver function tests, and imaging which have been successfully relied upon as a means to identify inflammatory liver disease (hepatic steatosis, steatohepatitis, and fibrosis) and a measure for efficacy of a specific therapy.

Hepatic steatosis (steatosis) is a key factor in NAFLD. While there is no specific serum marker existing today, there are several blood biomarkers panels that can be utilized to assess steatosis. These blood biomarkers may include, but are not limited to: i) NAFLD ridge score (parameters include ALT, HDL, cholesterol, triglycerides, HbA1c, leukocyte count hypertension); ii) NAFLD Liver Fat Score (NLFS) (parameters include liver fat content, metabolic syndrome, type-2 diabetes, AST, AST:ALT, fasting insulin); iii) Hepatic Steatosis Index (HIS) (parameters include AST, ALT, BMI, diabetes, sex); iv) Fatty Liver Index (FLI) (parameters include BMI, waist circumference, triglycerides, γ-glutamyl transferase); v) lipid accumulation product index (LAP) (parameters include sex, triglycerides, weight circumference); vi) Fatty Liver Inhibition of Progression (FLIP) algorithm (parameters include histological steatosis, disease activity, fibrosis score); vii) CHek score (parameters include age, HbA1c, γ-glutamyl transferase, adiponectin, M30); viii) NAFLD Fibrosis Score (NFS) (parameters include AST: ALT, albumin, platelet count, age, BMI, hyperglycemia); ix) Fibrosis-4-Score (FIB-4) (parameters include AST, ALT, platelet count, age); x) AST to Platelet Ratio Index (APRI) (parameters include AST, platelet count); xi) BARD Score (parameters include BMI, AST:ALT, diabetes); xii) Enhanced Liver Fibrosis panel (ELF) (parameters include age, TIMP-1, PIIINP, hyaluronic acid); xiii) Hepascore (parameters include bilirubin, γ-glutamyl transferase, hyaluronic acid, $α_2$ macroglobilin, age, gender); xiv) Fibro-Test-FibroSURE/Acti-Test (parameters include $α_2$ macroglobulin, haptoglobin, γ-glutamyl transferase, total bilirubin, apolipoprotein A1, ALT, age, gender); and xv) FibroMeter NAFLD index (parameters include platelet count, prothrombin index, ferritin, AST, ALT, body weight, age, liver stiffness determined by vibration controlled transient elastography). The parameters identified for each biomarker assist in the assessment of liver damage/dysfunction (e.g., AST, ALT, γ-GT, platelet count, haptoglobin), lipid metabolism disorders (e.g., cholesterol, triglycerides), diabetes (e.g., HbA1c, fastin insulin level), inflammation (e.g., $α_2$ macroglobilin, ferritin).

Imaging techniques can also be used in conjunction with biopsy and blood biomarkers to identify NAFLD/NASH patients. Imaging techniques include, but are not limited to ultrasound (e.g., contrast-enhanced ultrasound (CEUS)); ultrasound-based elastography (e.g., vibration-controlled transient elastography (VCTE; FibroScan), real-time shear wave elastography (SWE), acoustic radiation force impulse elastography (ARFI), supersonic shear imaging (SSI)); controlled attenuation parameters; magnetic resonance imaging (MRI) such as MRI proton density fat fraction (MRI-PDFF); and magnetic resonance elastography (MRE).

In each of the embodiments previously disclosed, it is preferred that the (S)-2-(5-((3-ethoxypyridin-2-yl)oxy)pyridin-3-yl)-N-(tetrahydrofuran-3-yl)pyrimidine-5-carboxamide or a pharmaceutically acceptable salt thereof, and the 4-(4-(1-Isopropyl-7-oxo-1,4,6,7-tetrahydrospiro[indazole-5, 4'-piperidine]-1'-carbonyl)-6-methoxypyridin-2-yl)benzoic acid or a pharmaceutically acceptable salt thereof are administered once a day.

In each of the embodiments previously disclosed, it is preferred that the (S)-2-(5-((3-ethoxypyridin-2-yl)oxy)pyridin-3-yl)-N-(tetrahydrofuran-3-yl)pyrimidine-5-carboxamide or a pharmaceutically acceptable salt thereof, and the 4-(4-(1-Isopropyl-7-oxo-1,4,6,7-tetrahydrospiro[indazole-5, 4'-piperidine]-1'-carbonyl)-6-methoxypyridin-2-yl)benzoic acid or a pharmaceutically acceptable salt thereof are administered twice a day.

In certain other embodiments, the ratio of the S)-2-(5-((3-ethoxypyridin-2-yl)oxy)pyridin-3-yl)-N-(tetrahydrofuran-3-yl)pyrimidine-5-carboxamide or a pharmaceutically acceptable salt thereof to 4-(4-(1-Isopropyl-7-oxo-1,4,6,7-tetrahydrospiro[indazole-5,4'-piperidine]-1'-carbonyl)-6-methoxypyridin-2-yl)benzoic acid or a pharmaceutically acceptable salt thereof is about 1:1, about 5:1, about 10:1, about 15:1, about 20:1, or about 30:1. In certain embodiments the ratio is about 20:1.

In certain embodiments, the method according to any one of the preceding claims, wherein the therapeutically effective amount of (S)-2-(5-((3-ethoxypyridin-2-yl)oxy)pyridin-3-yl)-N-(tetrahydrofuran-3-yl)pyrimidine-5-carboxamide or a pharmaceutically acceptable salt thereof is about 5 mg, about 10 mg, about 15 mg, about 20 mg, about 25 mg, about 50 mg, about 75 mg, about 100 mg, about 150 mg, about 200 mg, about 225 mg, about 300 mg, about 400 mg, about 450 mg, about 600 mg or about 1200 mg; and the therapeutically effective amount of the 4-(4-(1-Isopropyl-7-oxo-1,4,6,7-tetrahydrospiro[indazole-5,4'-piperidine]-1'-carbonyl)-6-methoxypyridin-2-yl)benzoic acid or a pharmaceutically acceptable salt thereof is about 5 mg, about 10 mg, about 15 mg, about 20 mg, about 40 mg, about 50 mg or about 60 mg.

In certain embodiments, the therapeutically effective amount of (S)-2-(5-((3-ethoxypyridin-2-yl)oxy)pyridin-3-yl)-N-(tetrahydrofuran-3-yl)pyrimidine-5-carboxamide or a pharmaceutically acceptable salt thereof is about 600 mg and the therapeutically effective amount of the 4-(4-(1-Isopropyl-7-oxo-1,4,6,7-tetrahydrospiro[indazole-5,4'-piperidine]-1'-carbonyl)-6-methoxypyridin-2-yl)benzoic acid or a pharmaceutically acceptable salt thereof is about 20 mg.

In certain other embodiments, the therapeutically effective amount of (S)-2-(5-((3-ethoxypyridin-2-yl)oxy)pyridin-3-yl)-N-(tetrahydrofuran-3-yl)pyrimidine-5-carboxamide or a pharmaceutically acceptable salt thereof is about 450 mg and the therapeutically effective amount of the 4-(4-(1-Isopropyl-7-oxo-1,4,6,7-tetrahydrospiro[indazole-5,4'-piperidine]-1'-carbonyl)-6-methoxypyridin-2-yl)benzoic acid or a pharmaceutically acceptable salt thereof is about 15 mg.

In certain embodiments, the therapeutically effective amount of (S)-2-(5-((3-ethoxypyridin-2-yl)oxy)pyridin-3-yl)-N-(tetrahydrofuran-3-yl)pyrimidine-5-carboxamide or a pharmaceutically acceptable salt thereof is about 400 mg and the therapeutically effective amount of the 4-(4-(1-Isopropyl-7-oxo-1,4,6,7-tetrahydrospiro[indazole-5,4'-piperidine]-1'-carbonyl)-6-methoxypyridin-2-yl)benzoic acid or a pharmaceutically acceptable salt thereof is about 20 mg.

In certain other embodiments, the therapeutically effective amount of (S)-2-(5-((3-ethoxypyridin-2-yl)oxy)pyridin-3-yl)-N-(tetrahydrofuran-3-yl)pyrimidine-5-carboxamide or a pharmaceutically acceptable salt thereof is about 300 mg. When the therapeutically effective amount of (S)-2-(5-((3-ethoxypyridin-2-yl)oxy)pyridin-3-yl)-N-(tetrahydrofuran-3-yl)pyrimidine-5-carboxamide or a pharmaceutically acceptable salt thereof is about 300 mg, in certain embodiments, the therapeutically effective amount of the 4-(4-(1-Isopropyl-7-oxo-1,4,6,7-tetrahydrospiro[indazole 5,4'-piperidine]-1'-carbonyl)-6-methoxypyridin-2-yl)benzoic acid or a pharmaceutically acceptable salt thereof is about 10 mg. In other embodiments, the therapeutically effective amount of the 4-(4-(1-Isopropyl-7-oxo-1,4,6,7-tetrahydrospiro[indazole-5,4'-piperidine]-1'-carbonyl)-6-methoxypyridin-2-yl)benzoic acid or a pharmaceutically acceptable salt thereof is about 15 mg. In yet another embodiment, the therapeutically effective amount of the 4-(4-(1-Isopropyl-7-oxo-1,4,6,7-tetrahydrospiro[indazole-5,4'-piperidine]-1'-carbonyl)-6-methoxypyridin-2-yl)benzoic acid or a pharmaceutically acceptable salt thereof is about 20 mg.

In certain other embodiments, the therapeutically effective amount of (S)-2-(5-((3-ethoxypyridin-2-yl)oxy)pyridin-3-yl)-N-(tetrahydrofuran-3-yl)pyrimidine-5-carboxamide or a pharmaceutically acceptable salt thereof is about 225 mg and the therapeutically effective amount of the 4-(4-(1-Isopropyl-7-oxo-1,4,6,7-tetrahydrospiro[indazole-5,4'-piperidine]-1'-carbonyl)-6-methoxypyridin-2-yl)benzoic acid or a pharmaceutically acceptable salt thereof is about 15 mg.

In certain other embodiments, the therapeutically effective amount of (S)-2-(5-((3-ethoxypyridin-2-yl)oxy)pyridin-3-yl)-N-(tetrahydrofuran-3-yl)pyrimidine-5-carboxamide or a pharmaceutically acceptable salt thereof is about 200 mg. When the therapeutically effective amount of (S)-2-(5-((3-ethoxypyridin-2-yl)oxy)pyridin-3-yl)-N-(tetrahydrofuran-3-yl)pyrimidine-5-carboxamide or a pharmaceutically acceptable salt thereof is about 200 mg, in certain embodiments, the therapeutically effective amount of the 4-(4-(1-Isopropyl-7-oxo-1,4,6,7-tetrahydrospiro[indazole-5,4'-piperidine]-1'-carbonyl)-6-methoxypyridin-2-yl)benzoic acid or a pharmaceutically acceptable salt thereof is about 10 mg. In certain other embodiments, the therapeutically effective amount of the 4-(4-(1-Isopropyl-7-oxo-1,4,6,7 tetrahydrospiro[indazole-5,4'-piperidine]-1'-carbonyl)-6-methoxypyridin-2-yl)benzoic acid or a pharmaceutically acceptable salt thereof is about 20 mg.

In yet another embodiment, the therapeutically effective amount of (S)-2-(5-((3-ethoxypyridin-2-yl)oxy)pyridin-3-yl)-N-(tetrahydrofuran-3-yl)pyrimidine-5-carboxamide or a pharmaceutically acceptable salt thereof is about 150 mg. When the therapeutically effective amount of (S)-2-(5-((3-ethoxypyridin-2-yl)oxy)pyridin-3-yl)-N-(tetrahydrofuran-3-yl)pyrimidine-5-carboxamide or a pharmaceutically acceptable salt thereof is about 150 mg, in certain embodiments, the therapeutically effective amount of the 4-(4-(1-Isopropyl-7-oxo-1,4,6,7-tetrahydrospiro[indazole-5,4'-piperidine]-1'-carbonyl)-6-methoxypyridin-2-yl)benzoic acid or a pharmaceutically acceptable salt thereof is about 5 mg. In other embodiments, the therapeutically effective amount of the 4-(4-(1-Isopropyl-7-oxo-1,4,6,7-tetrahydrospiro[indazole-5,4'-piperidine]-1'-carbonyl)-6-methoxypyridin-2-yl) benzoic acid or a pharmaceutically acceptable salt thereof is about 10 mg. In another embodiment, the therapeutically effective amount of the 4-(4-(1-Isopropyl-7-oxo-1,4,6,7-tetrahydrospiro[indazole-5,4'-piperidine]-1'-carbonyl)-6-methoxypyridin-2-yl)benzoic acid or a pharmaceutically acceptable salt thereof is about 15 mg.

In yet another embodiment, the therapeutically effective amount of (S)-2-(5-((3-ethoxypyridin-2-yl)oxy)pyridin-3-yl)-N-(tetrahydrofuran-3-yl)pyrimidine-5-carboxamide or a pharmaceutically acceptable salt thereof is about 100 mg. When the therapeutically effective amount of (S)-2-(5-((3-ethoxypyridin-2-yl)oxy)pyridin-3-yl)-N-(tetrahydrofuran-3-yl)pyrimidine-5-carboxamide or a pharmaceutically acceptable salt thereof is about 100 mg, in certain embodiments, the therapeutically effective amount of the 4-(4-(1-Isopropyl-7-oxo-1,4,6,7-tetrahydrospiro[indazole-5,4'-piperidine]-1'-carbonyl)-6-methoxypyridin-2-yl)benzoic acid or a pharmaceutically acceptable salt thereof is about 5 mg. In another embodiment, the therapeutically effective amount of the 4-(4-(1-Isopropyl-7-oxo-1,4,6,7-tetrahydrospiro[indazole-5,4'-piperidine]-1'-carbonyl)-6-methoxypyridin-2-yl) benzoic acid or a pharmaceutically acceptable salt thereof is about 10 mg. In yet another embodiment, the therapeutically effective amount of the 4-(4-(1-Isopropyl-7-oxo-1,4,6,7-tetrahydrospiro[indazole-5,4'-piperidine]-1'-carbonyl)-6-methoxypyridin-2-yl)benzoic acid or a pharmaceutically acceptable salt thereof is about 20 mg.

In other embodiments, the therapeutically effective amount of (S)-2-(5-((3-ethoxypyridin-2-yl)oxy)pyridin-3-yl)-N-(tetrahydrofuran-3-yl)pyrimidine-5-carboxamide or a pharmaceutically acceptable salt thereof is about 75 mg. When the therapeutically effective amount of (S)-2-(5-((3-ethoxypyridin-2-yl)oxy)pyridin-3-yl)-N-(tetrahydrofuran-3-yl)pyrimidine-5-carboxamide or a pharmaceutically acceptable salt thereof is about 75 mg, in certain embodiments, the therapeutically effective amount of the 4-(4-(1-Isopropyl-7-oxo-1,4,6,7-tetrahydrospiro[indazole-5,4'-piperidine]-1'-carbonyl)-6-methoxypyridin-2-yl)benzoic acid or a pharmaceutically acceptable salt thereof is about 5 mg. In another embodiment, the therapeutically effective amount of the 4-(4-(1-Isopropyl-7-oxo-1,4,6,7-tetrahydrospiro[indazole-5, 4'-piperidine]-1'-carbonyl)-6-methoxypyridin-2-yl)benzoic acid or a pharmaceutically acceptable salt thereof is about 15 mg.

In another embodiment, the therapeutically effective amount of (S)-2-(5-((3-ethoxypyridin-2-yl)oxy)pyridin-3-yl)-N-(tetrahydrofuran-3-yl)pyrimidine-5-carboxamide or a pharmaceutically acceptable salt thereof is about 50 mg. When the therapeutically effective amount of (S)-2-(5-((3-ethoxypyridin-2-yl)oxy)pyridin-3-yl)-N-(tetrahydrofuran-3-yl)pyrimidine-5-carboxamide or a pharmaceutically acceptable salt thereof is about 50 mg, in certain embodiments, the therapeutically effective amount of the 4-(4-(1-Isopropyl-7-oxo-1,4,6,7-tetrahydrospiro[indazole-5,4'-piperidine]-1'-carbonyl)-6-methoxypyridin-2-yl)benzoic acid or a pharmaceutically acceptable salt thereof is about 5 mg. In another embodiment, the therapeutically effective amount of the 4-(4-(1-Isopropyl-7-oxo-1,4,6,7-tetrahydrospiro[indazole-5,4'-piperidine]-1'-carbonyl)-6-methoxypyridin-2-yl)benzoic acid or a pharmaceutically acceptable salt thereof is about 10 mg.

In certain other embodiments, the therapeutically effective amount of (S)-2-(5-((3-ethoxypyridin-2-yl)oxy)pyridin-3-yl)-N-(tetrahydrofuran-3-yl)pyrimidine-5-carboxamide or a pharmaceutically acceptable salt thereof is about 25 mg and the therapeutically effective amount of the 4-(4-(1-Isopropyl-7-oxo-1,4,6,7-tetrahydrospiro[indazole-5,4'-piperidine]-1'-carbonyl)-6-methoxypyridin-2-yl)benzoic acid or a pharmaceutically acceptable salt thereof is about 5 mg.

In another embodiment, the therapeutically effective amount of (S)-2-(5-((3-ethoxypyridin-2-yl)oxy)pyridin-3-yl)-N-(tetrahydrofuran-3-yl)pyrimidine-5-carboxamide or a pharmaceutically acceptable salt thereof is about 20 mg and the therapeutically effective amount of the 4-(4-(1-Isopropyl-7-oxo-1,4,6,7-tetrahydrospiro[indazole-5,4'-piperidine]-1'-carbonyl)-6-methoxypyridin-2-yl)benzoic acid or a pharmaceutically acceptable salt thereof is about 20 mg.

In yet another embodiment, the therapeutically effective amount of (S)-2-(5-((3-ethoxypyridin-2-yl)oxy)pyridin-3-yl)-N-(tetrahydrofuran-3-yl)pyrimidine-5-carboxamide or a pharmaceutically acceptable salt thereof is about 15 mg and the therapeutically effective amount of the 4-(4-(1-Isopropyl-7-oxo-1,4,6,7-tetrahydrospiro[indazole-5,4'-piperidine]-1'-carbonyl)-6-methoxypyridin-2-yl)benzoic acid or a pharmaceutically acceptable salt thereof is about 15 mg.

In another embodiment, the therapeutically effective amount of (S)-2-(5-((3-ethoxypyridin-2-yl)oxy)pyridin-3-yl)-N-(tetrahydrofuran-3-yl)pyrimidine-5-carboxamide or a pharmaceutically acceptable salt thereof is about 10 mg and the therapeutically effective amount of the 4-(4-(1-Isopropyl-7-oxo-1,4,6,7-tetrahydrospiro[indazole-5,4'-piperidine]-1'-carbonyl)-6-methoxypyridin-2-yl)benzoic acid or a pharmaceutically acceptable salt thereof is about 10 mg.

In another embodiment, the therapeutically effective amount of (S)-2-(5-((3-ethoxypyridin-2-yl)oxy)pyridin-3-yl)-N-(tetrahydrofuran-3-yl)pyrimidine-5-carboxamide or a pharmaceutically acceptable salt thereof is about 5 mg and the therapeutically effective amount of the 4-(4-(1-Isopropyl-7-oxo-1,4,6,7-tetrahydrospiro[indazole-5,4'-piperidine]-1'-carbonyl)-6-methoxypyridin-2-yl)benzoic acid or a pharmaceutically acceptable salt thereof is about 5 mg.

In any of the above embodiments, the administration of the combination in any of the above-mentioned therapeutically effective amounts can be administered once or twice daily.

In any of the above-mentioned embodiments, the administration of the combination achieves a change in whole liver fat from baseline equal to or greater than about 30%. In other instances, the administration of the combination achieves a change in whole liver fat from baseline equal to or greater than about 50%.

In any of the above-mentioned embodiments, identification of a patient may be through use of one or more blood marker panels. Suitable blood marker panels include, but are not limited to the group consisting of NAFLD ridge score, NAFLD Liver Fat Score (NLFS), Hepatic Steatosis Index (HIS), Fatty Liver Index (FLI), Lipid accumulation product index (LAP), Fatty Liver Inhibition of Progress (FLIP) algorithm, CHeK score, NALFD Fibrosis Score (NFS), Fibrosis-4 Score (Fib-4), AST to Platelet Ratio Index (APRI), BARD score, Enhanced Liver Fibrosis panel (ELF), Hepascore, FibroTest-FibroSURE/ActiTest, ibroMeter NAFLD index, and any combinations of the foregoing.

In certain embodiments, when a patient is identified as having hepatic steatosis, the blood marker panel utilized is the NAFLD ridge score. In another embodiment, the blood marker panel is NAFLD Liver Fat Score (NLFS). In another embodiment, the blood marker panel is Fatty Liver Index (FLI).

In certain embodiments, when the patient is identified as having steatohepatitis, the blood marker panel utilized is the Fatty Liver Inhibition of Progress (FLIP) algorithm. In another embodiment, the blood marker panel is the CHeK score.

In certain embodiments, when a patient is identified as having fibrosis, the blood marker panel utilized is the NAFLD Fibrosis Score (NFS). In another embodiment, the blood marker panel is the Fibrosis-4 score (Fib-4). In another embodiment, the blood marker panel is the AST to Platelet Ratio Index (APRI). In another embodiment, the blood marker panel is the BARD score.

In certain other embodiments, in the methods described above, the step of identifying a patient with hepatic steatosis, steatohepatitis or both further includes the use of imaging. The imaging may include, but is not limited to, ultrasound, ultrasound-based elastography, controlled attenuation parameter (CAP), magnetic resonance imaging (MRI), magnetic resonance elastography, or a combination of the foregoing. In one embodiment, the imaging is contrast-enhanced ultrasound (CEUS). In another embodiment, the imaging is ultrasound-based elastography is selected from vibration-controlled transient elastography (VCTE), acoustic radiation force impulse elastography (ARFI), supersonic shear imaging (SSI), or a combination of the foregoing. In another embodiment, the imaging is magnetic resonance imaging (MRI) is MRI proton density fat fraction (MRI-PDFF). In another embodiment, the imaging is magnetic resonance elastography.

In addition to the above-mentioned methods and means for identifying inflammatory liver disease in a patient, regulatory authority recognized conditional approval for Phase III studies in NASH is based on histological surrogate markers obtained by liver biopsy. These generally accepted surrogates are i) resolution of NASH without worsening of fibrosis (i.e. a numerical increase in fibrosis stage); ii) a one or more stage reduction in fibrosis without worsening of NASH. Details may be found in: Ratziu, A critical review of endpoints for non-cirrhotic NASH therapeutic trials, Journal of Hepatology, 2018, 68. 353-361, and references therein.

Additionally, regulatory authorities look to a change in the Nonalcoholic Fatty Liver Disease (NAFLD) Activity Score (NAS) from baseline. The NAFLD Activity Score (NAS) is a composite score equal to the sum of the steatosis grade (0-3), lobular inflammation grade (0-3), and hepatocellular ballooning grade (0-2), from centralized pathologist scoring of liver biopsies. The overall scale of the NAS is 0-8, with higher scores indicating more severe disease. The outcome measure, change from baseline in NAFLD Activity Score (NAS), has a possible range from −8 to +8, with negative values indicating a better outcome (improvement) and positive values indicating a worse outcome. Components of the NAS are scored as follows: Steatosis grade 0=<5% steatosis, 1=5-33% steatosis, 2=34-66% steatosis, 3=>66% steatosis. Lobular inflammation grade=amount of lobular inflammation (combines mononuclear, fat granulomas, and polymorphonuclear (pmn) foci): 0=0, 1=<2 under 20× magnification, 2=2-4 under 20× magnification, 3=>4 under 20× magnification. Hepatocellular ballooning 0=none, 1=mild, 2=more than mild.

In addition to the above-mentioned methods, regulatory authority recognized full approval for drugs to treat NASH is based on demonstrating efficacy against one or more clinical measures including (1) progression to cirrhosis on histopathology, (2) reduction in hepatic decompensation events (including hepatic encephalopathy, variceal bleeding, ascites), (3) change in MELD score from less than or equal to 12 to more than 15, (4) liver transplant, or (5) all-cause mortality.

In a further embodiment, the pharmaceutical composition contains (S)-2-(5-((3-ethoxypyridin-2-yl)oxy)pyridin-3-yl)-N-(tetrahydrofuran-3-yl)pyrimidine-5-carboxamide as a crystalline solid of structure:

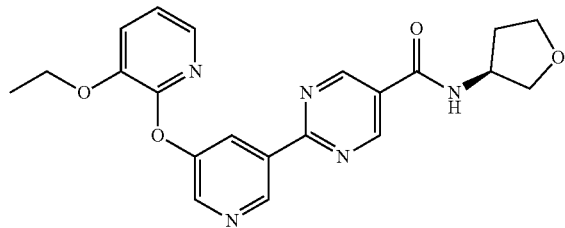 [SMILES: CCOc1cccnc1Oc1cncc(-c2ncc(C(=O)N[C@H]3CCOC3)cn2)c1]

or a pharmaceutically acceptable salt thereof.

In a further embodiment, the crystalline solid has a powder x-ray Diffraction pattern comprising 2-theta values of (CuKα radiation, wavelength of 1.54056 Å) 5.3 0.2, 7.7±0.2, and 15.4±0.2.

In a further embodiment, the crystalline solid has a powder x-ray diffraction pattern comprising 2-theta values of (CuKα radiation, wavelength of 1.54056 Å) 6.5 0.2, 9.3±0.2, and 13.6±0.2.

In a further embodiment, the pharmaceutical composition contains 4-(4-(1-Isopropyl-7-oxo-1,4,6,7-tetrahydrospiro[indazole-5,4'-piperidine]-1'-carbonyl)-6-methoxypyridin-2-yl)benzoic acid, or a pharmaceutically acceptable salt thereof, as a crystalline solid of structure:

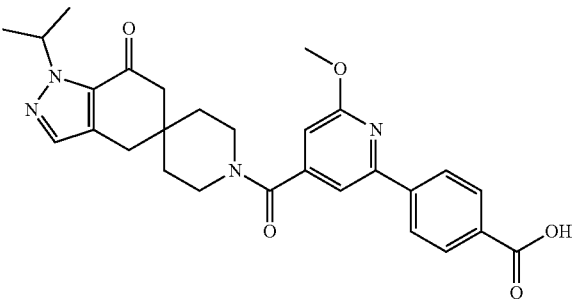 [SMILES: COc1cc(C(=O)N2CCC3(CC2)CC(=O)c2c(cnn2C(C)C)C3)cc(-c2ccc(C(=O)O)cc2)n1]

or a pharmaceutically acceptable salt thereof.

In a further embodiment, the crystalline solid is 2-amino-2-(hydroxymethyl)propane-1,3-diol salt of 4-(4-(1-isopropyl-7-oxo-1,4,6,7-tetrahydrospiro[indazole-5,4'-piperidine]-1'-carbonyl)-6-methoxypyridin-2-yl)benzoic acid.

In a further embodiment, the disease or condition is fatty liver. In another embodiment, the disease or condition is nonalcoholic fatty liver disease. In another embodiment, the disease or condition is nonalcoholic steatohepatitis. In another embodiment, the disease or condition is nonalcoholic steatohepatitis with liver fibrosis. In another embodiment, the disease or condition is nonalcoholic steatohepatitis with cirrhosis. In another embodiment, the disease or condition is nonalcoholic steatohepatitis with cirrhosis and with hepatocellular carcinoma. In another embodiment, the disease or condition is nonalcoholic steatohepatitis with cirrhosis and with a metabolic-related disease.

In a further embodiment, the disease or condition is fatty liver. In another embodiment, the disease or condition is alcoholic fatty liver disease. In another embodiment, the disease or condition is alcoholic steatohepatitis. In another embodiment, the disease or condition is alcoholic steatohepatitis with liver fibrosis. In another embodiment, the disease or condition is alcoholic steatohepatitis with cirrhosis. In another embodiment, the disease or condition is alcoholic steatohepatitis with cirrhosis and with hepatocellular carcinoma. In another embodiment, the disease or condition is alcoholic steatohepatitis with cirrhosis and with a metabolic-related disease.

In a further embodiment, the method or composition includes at least one other pharmaceutical agent, wherein the agent is selected from the group consisting of an acetyl-CoA carboxylase-(ACC) inhibitor, a farnesoid X receptor agonist (e.g., tropifexor, obeticholic acid), a diacylglycerol O-acyltransferase 1 (DGAT-1) inhibitor, monoacylglycerol O-acyltransferase inhibitors, a phosphodiesterase (PDE)-10 inhibitor, an AMPK activator, a sulfonylurea, a meglitinide, an α-amylase inhibitor, an α-glucoside hydrolase inhibitor, an α-glucosidase inhibitor, a PPARγ agonist, a PPAR α/γ agonist (e.g., elafibranor), a biguanide, a glucagon-like peptide 1 (GLP-1) modulator, liraglutide, albiglutide, exenatide, albiglutide, lixisenatide, dulaglutide, semaglutide, a protein tyrosine phosphatase-1B (PTP-1B) inhibitor, SIRT-1 activator, a dipeptidyl peptidase IV (DPP-IV) inhibitor, an insulin secreatagogue, a fatty acid oxidation inhibitor, an A2 antagonist, a c-jun amino-terminal kinase (JNK) inhibitor, glucokinase activators (GKa), insulin, an insulin mimetic, a glycogen phosphorylase inhibitor, a VPAC2 receptor agonist, SGLT2 inhibitors, a glucagon receptor modulator, GPR119 modulators, FGF21 derivatives or analogs, TGR5 receptor modulators, GPBAR1 receptor modulators, GPR40 agonists, GPR120 modulators, high affinity nicotinic acid receptor (HM74A) activators, SGLT1 inhibitors, inhibitors or modulators of carnitine palmitoyl transferase enzymes, inhibitors of fructose 1,6-diphosphatase, inhibitors of aldose reductase, mineralocorticoid receptor inhibitors, inhibitors of TORC2, inhibitors of CCR2 and/or CCR5, inhibitors of PKC isoforms (e.g. PKCα, PKCβ, PKCγ), inhibitors of fatty acid synthetase, inhibitors of serine palmitoyl transferase, modulators of GPR81, GPR39, GPR43, GPR41, GPR105, Kv1.3, retinol binding protein 4, glucocorticoid receptor, somatostatin receptors, inhibitors or modulators of PDHK2 or PDHK4, inhibitors of MAP4K4, modulators of IL1 family including IL1beta, HMG-CoA reductase inhibitors, squalene synthetase inhibitors, fibrates, bile acid sequestrants, ACAT inhibitors, MTP inhibitors, lipooxygenase inhibitors, cholesterol absorption inhibitors, PCSK9 modulators, cholesteryl ester transfer protein inhibitors and modulators of RXRalpha.

In a further embodiment, the method or composition includes at least one other pharmaceutical agent, wherein the agent is selected from the group consisting of cysteamine or a pharmaceutically acceptable salt thereof, cystamine or a pharmaceutically acceptable salt thereof, an anti-oxidant compound, lecithin, vitamin B complex, a bile salt preparations, an antagonists of Cannabinoid-1 (CB1) receptor, an inverse agonists of Cannabinoid-1 (CB1) receptor, a peroxisome proliferator-activated receptor) activity regulators, a benzothiazepine or benzothiepine compound, an RNA antisense construct to inhibit protein tyrosine phosphatase PTPRU, a heteroatom-linked substituted piperidine and derivatives thereof, an azacyclopentane derivative capable of inhibiting stearoyl-coenzyme alpha delta-9 desaturase, acylamide compound having secretagogue or inducer activity of adiponectin, a quaternary ammonium compound, Glatiramer acetate, pentraxin proteins, a HMG-CoA reductase inhibitor, n-acetyl cysteine, isoflavone compound, a macrolide antibiotic, a galectin inhibitor, an antibody, or any combination of thereof.

Particularly when provided as a single dosage unit, the potential exists for a chemical interaction between the combined active ingredients. For this reason, when a first therapeutic agent and a second therapeutic agent are combined in a single dosage unit they are formulated such that although the active ingredients are combined in a single dosage unit, the physical contact between the active ingredients is minimized (that is, reduced). For example, one active ingredient may be enteric coated. By enteric coating one of the active ingredients, it is possible not only to minimize the contact between the combined active ingredients, but also, it is possible to control the release of one of these components in the gastrointestinal tract such that one of these components is not released in the stomach but rather is released in the intestines. One of the active ingredients may also be coated with a material that effects a sustained release throughout the gastrointestinal tract and also serves to minimize physical contact between the combined active ingredients. Furthermore, the sustained-released component can be additionally enteric coated such that the release of this component occurs only in the intestine. Still another approach would involve the formulation of a combination product in which the one component is coated with a sustained and/or enteric release polymer, and the other component is also coated with a polymer such as a low viscosity grade of hydroxypropyl methylcellulose (HPMC) or other appropriate materials as known in the art, in order to further separate the active components. The polymer coating serves to form an additional barrier to interaction with the other component.

These as well as other ways of minimizing contact between the components of combination products of the present invention, whether administered in a single dosage form or administered in separate forms but at the same time by the same manner, will be readily apparent to those skilled in the art, once armed with the present disclosure.

In combination therapy treatment, both the compounds of this invention and the other drug therapies are administered to mammals (e.g., humans, male or female) by conventional methods.

The dosage of each therapeutic agent, e.g., Compound A, Compound D, and any additional therapeutic agent, is generally dependent upon a number of factors including the health of the subject being treated, the extent of treatment desired, the nature and kind of concurrent therapy, if any, and the frequency of treatment and the nature of the effect desired. In general, the dosage range of each therapeutic agent is in the range of from about 0.001 mg to about 100 mg per kilogram body weight of the individual per day, preferably from about 0.1 mg to about 10 mg per kilogram body weight of the individual per day. However, some variability in the general dosage range may also be required depending upon the age and weight of the subject being treated, the intended route of administration, the particular anti-obesity agent being administered and the like. The determination of dosage ranges and optimal dosages for a particular patient is also well within the ability of one of ordinary skill in the art having the benefit of the instant disclosure.

According to the methods of treatment of the invention, a compound of the invention or a combination of a compound of the invention and at least one additional pharmaceutical agent (referred to herein as a "combination") is administered to a subject in need of such treatment, preferably in the form of a pharmaceutical composition. In the combination aspect of the invention, the compound of the invention and at least one other pharmaceutical agent (e.g., another anti-obesity agent,) may be administered either separately or in a pharmaceutical composition comprising both. It is generally preferred that such administration be oral.

When a combination of a compound of the invention and at least one other pharmaceutical agent are administered together, such administration may be sequential in time or simultaneous. Simultaneous administration of drug combinations is generally preferred. For sequential administration, a compound of the invention and the additional pharmaceutical agent may be administered in any order. It is generally preferred that such administration be oral. It is especially preferred that such administration be oral and simultaneous. When a compound of the invention and the additional pharmaceutical agent are administered sequentially, the administration of each may be by the same or by different methods.

According to the methods of the invention, a compound of the invention or a combination is preferably administered in the form of a pharmaceutical composition. Accordingly, a compound of the invention or a combination can be administered to a patient separately or together in any conventional oral, rectal, transdermal, parenteral (e.g., intravenous, intramuscular or subcutaneous), intracisternal, intravaginal, intraperitoneal, topical (e.g., powder, ointment, cream, spray or lotion), buccal or nasal dosage form (e.g., spray, drops or inhalant).

The compounds of the invention or combinations can be administered alone but will generally be administered in an admixture with one or more suitable pharmaceutical excipients, adjuvants, diluents or carriers known in the art and selected with regard to the intended route of administration and standard pharmaceutical practice. The compound of the invention or combination may be formulated to provide immediate-, delayed-, modified-, sustained-, pulsed- or controlled-release dosage forms depending on the desired route of administration and the specificity of release profile, commensurate with therapeutic needs.

The pharmaceutical composition comprises a compound of the invention or a combination in an amount generally in the range of from about 1% to about 75%, 80%, 85%, 90% or even 95% (by weight) of the composition, usually in the range of about 1%, 2% or 3% to about 50%, 60% or 70%, more frequently in the range of about 1%, 2% or 3% to less than 50% such as about 25%, 30% or 35%.

Methods of preparing various pharmaceutical compositions with a specific amount of active compound are known to those skilled in this art. For examples, see Remington: The Practice of Pharmacy, Lippincott Williams and Wilkins, Baltimore Md. 20.sup.th ed. 2000.

Compositions suitable for parenteral injection generally include pharmaceutically acceptable sterile aqueous or non-aqueous solutions, dispersions, suspensions, or emulsions, and sterile powders for reconstitution into sterile injectable solutions or dispersions. Examples of suitable aqueous and nonaqueous carriers or diluents (including solvents and vehicles) include water, ethanol, polyols (propylene glycol, polyethylene glycol, glycerol, and the like), suitable mixtures thereof, triglycerides including vegetable oils such as olive oil, and injectable organic esters such as ethyl oleate. A preferred carrier is Miglyol® brand caprylic/capric acid ester with glycerine or propylene glycol (e.g., Miglyol® 812, Miglyol® 829, Miglyol® 840) available from Condea Vista Co., Cranford, N.J. Proper fluidity can be maintained, for example, by the use of a coating such as lecithin, by the maintenance of the required particle size in the case of dispersions, and by the use of surfactants.

These compositions for parenteral injection may also contain excipients such as preserving, wetting, emulsifying, and dispersing agents. Prevention of microorganism contamination of the compositions can be accomplished with various antibacterial and antifungal agents, for example, parabens, chlorobutanol, phenol, sorbic acid, and the like. It may also be desirable to include isotonic agents, for example, sugars, sodium chloride, and the like. Prolonged absorption of injectable pharmaceutical compositions can be brought about by the use of agents capable of delaying absorption, for example, aluminum monostearate and gelatin.

Solid dosage forms for oral administration include capsules, tablets, chews, lozenges, pills, powders, and multi-particulate preparations (granules). In such solid dosage forms, a compound of the invention or a combination is admixed with at least one inert excipient, diluent or carrier. Suitable excipients, diluents or carriers include materials such as sodium citrate or dicalcium phosphate and/or (a) one or more fillers or extenders (e.g., microcrystalline cellulose (available as Avicel™ from FMC Corp.) starches, lactose, sucrose, mannitol, silicic acid, xylitol, sorbitol, dextrose, calcium hydrogen phosphate, dextrin, alpha-cyclodextrin, beta-cyclodextrin, polyethylene glycol, medium chain fatty acids, titanium oxide, magnesium oxide, aluminum oxide and the like); (b) one or more binders (e.g., carboxymethylcellulose, methylcellulose, hydroxypropylcellulose, hydroxypropylmethylcellulose, gelatin, gum arabic, ethyl cellulose, polyvinyl alcohol, pullulan, pregelatinized starch, agar, tragacanth, alginates, gelatin, polyvinylpyrrolidone, sucrose, acacia and the like); (c) one or more humectants (e.g., glycerol and the like); (d) one or more disintegrating agents (e.g., agar-agar, calcium carbonate, potato or tapioca starch, alginic acid, certain complex silicates, sodium carbonate, sodium lauryl sulphate, sodium starch glycolate (available as Explotab™ from Edward Mendell Co.), cross-linked polyvinyl pyrrolidone, croscarmellose sodium A-type (available as Ac-di-sol™), polyacrilin potassium (an ion exchange resin) and the like); (e) one or more solution retarders (e.g., paraffin and the like); (f) one or more absorption accelerators (e.g., quaternary ammonium compounds and the like); (g) one or more wetting agents (e.g., cetyl alcohol, glycerol monostearate and the like); (h) one or more adsorbents (e.g., kaolin, bentonite and the like); and/or (i) one or more lubricants (e.g., talc, calcium stearate, magnesium stearate, stearic acid, polyoxyl stearate, cetanol, talc, hydrogenated caster oil, sucrose esters of fatty acid, dimethylpolysiloxane, microcrystalline wax, yellow beeswax, white beeswax, solid polyethylene glycols, sodium lauryl sulfate and the like). In the case of capsules and tablets, the dosage forms may also comprise buffering agents.

Solid compositions of a similar type may also be used as fillers in soft or hard filled gelatin capsules using such excipients as lactose or milk sugar, as well as high molecular weight polyethylene glycols, and the like.

Solid dosage forms such as tablets, dragees, capsules, and granules may be prepared with coatings and shells, such as enteric coatings and others well known in the art. They may also contain opacifying agents, and can also be of such composition that they release the compound of the invention and/or the additional pharmaceutical agent in a delayed manner. Examples of embedding compositions that can be used are polymeric substances and waxes. The drug may also be in micro-encapsulated form, if appropriate, with one or more of the above-mentioned excipients.

For tablets, the active agent will typically comprise less than 50% (by weight) of the formulation, for example less than about 10% such as 5% or 2.5% by weight. The predominant portion of the formulation comprises fillers, diluents, disintegrants, lubricants and optionally, flavors. The composition of these excipients is well known in the art. Frequently, the fillers/diluents will comprise mixtures of two or more of the following components: microcrystalline cellulose, mannitol, lactose (all types), starch, and di-calcium phosphate. The filler/diluent mixtures typically comprise less than 98% of the formulation and preferably less than 95%, for example 93.5%. Preferred disintegrants include Ac-di-sol™, Explotab™, starch and sodium lauryl sulphate. When present a disintegrant will usually comprise less than 10% of the formulation or less than 5%, for example about 3%. A preferred lubricant is magnesium stearate. When present a lubricant will usually comprise less than 5% of the formulation or less than 3%, for example about 1%.

Tablets may be manufactured by standard tabletting processes, for example, direct compression or a wet, dry or melt granulation, melt congealing process and extrusion. The tablet cores may be mono or multi-layer(s) and can be coated with appropriate overcoats known in the art.

Liquid dosage forms for oral administration include pharmaceutically acceptable emulsions, solutions, suspensions, syrups, and elixirs. In addition to the compound of the invention or the combination, the liquid dosage form may contain inert diluents commonly used in the art, such as water or other solvents, solubilizing agents and emulsifiers, as for example, ethyl alcohol, isopropyl alcohol, ethyl carbonate, ethyl acetate, benzyl alcohol, benzyl benzoate, propylene glycol, 1,3-butylene glycol, dimethylformamide, oils (e.g., cottonseed oil, groundnut oil, corn germ oil, olive oil, castor oil, sesame seed oil and the like), Miglyole™ (available from CONDEA Vista Co., Cranford, N.J.), glycerol, tetrahydrofurfuryl alcohol, polyethylene glycols and fatty acid esters of sorbitan, or mixtures of these substances, and the like.

Besides such inert diluents, the composition may also include excipients, such as wetting agents, emulsifying and suspending agents, sweetening, flavoring, and perfuming agents.

Oral liquid forms of the compounds of the invention or combinations include solutions, wherein the active compound is fully dissolved. Examples of solvents include all pharmaceutically precedented solvents suitable for oral administration, particularly those in which the compounds of the invention show good solubility, e.g., polyethylene glycol, polypropylene glycol, edible oils and glyceryl- and glyceride-based systems. Glyceryl- and glyceride-based systems may include, for example, the following branded products (and corresponding generic products): Captex™ 355 EP (glyceryl tricaprylate/caprate, from Abitec, Columbus Ohio), Crodamol™ GTC/C (medium chain triglyceride, from Croda, Cowick Hall, UK) or Labrafac™ CC (medium chain triglyceride, from Gattefosse), Captex™ 500P (glyceryl triacetate i.e. triacetin, from Abitec), Capmul™ MCM (medium chain mono- and diglycerides, from Abitec), Migyol™ 812 (caprylic/capric triglyceride, from Condea, Cranford N.J.), Migyol™ 829 (caprylic/capric/succinic triglyceride, from Condea), Migyol™ 840 (propylene glycol dicaprylate/dicaprate, from Condea), Labrafil™ M1944CS (oleoyl macrogol-6 glycerides, from Gattefosse), Peceol™ (glyceryl monooleate, from Gattefosse) and Maisine™ 35-1 (glyceryl monooleate, from Gattefosse). Of particular interest are the medium chain (about $C_8$ to $C_{10}$) triglyceride oils. These solvents frequently make up the predominant portion of the composition, i.e., greater than about 50%, usually greater than about 80%, for example about 95% or 99%. Adjuvants and additives may also be included with the solvents principally as taste-mask agents, palatability and flavoring agents, antioxidants, stabilizers, texture and viscosity modifiers and solubilizers.

Suspensions, in addition to the compound of the invention or the combination, may further comprise carriers such as suspending agents, e.g., ethoxylated isostearyl alcohols, polyoxyethylene sorbitol and sorbitan esters, microcrystalline cellulose, aluminum metahydroxide, bentonite, agar-agar, and tragacanth, or mixtures of these substances, and the like.

Compositions for rectal or vaginal administration preferably comprise suppositories, which can be prepared by mixing a compound of the invention or a combination with suitable non-irritating excipients or carriers, such as cocoa butter, polyethylene glycol or a suppository wax which are solid at ordinary room temperature, but liquid at body temperature, and therefore melt in the rectum or vaginal cavity thereby releasing the active component(s).

Dosage forms for topical administration of the compounds of the invention or combinations include ointments, creams, lotions, powders and sprays. The drugs are admixed with a pharmaceutically acceptable excipient, diluent or carrier, and any preservatives, buffers, or propellants that may be required.

When compounds are poorly soluble in water, e.g., less than about 1 μg/mL, liquid compositions in solubilizing, non-aqueous solvents such as the medium chain triglyceride oils discussed above are a preferred dosage form for these compounds.

Solid amorphous dispersions, including dispersions formed by a spray-drying process, are also a preferred dosage form for the poorly soluble compounds of the invention. By "solid amorphous dispersion" is meant a solid material in which at least a portion of the poorly soluble compound is in the amorphous form and dispersed in a water-soluble polymer. By "amorphous" is meant that the poorly soluble compound is not crystalline. By "crystalline" is meant that the compound exhibits long-range order in three dimensions of at least 100 repeat units in each dimension. Thus, the term amorphous is intended to include not only material which has essentially no order, but also material which may have some small degree of order, but the order is in less than three dimensions and/or is only over short distances. Amorphous material may be characterized by techniques known in the art such as powder x-ray diffraction (PXRD) crystallography, solid state NMR, or thermal techniques such as differential scanning calorimetry (DSC).

Preferably, at least a major portion (i.e., at least about 60 wt %) of the poorly soluble compound in the solid amorphous dispersion is amorphous. The compound can exist within the solid amorphous dispersion in relatively pure amorphous domains or regions, as a solid solution of the compound homogeneously distributed throughout the polymer or any combination of these states or those states that lie intermediate between them. Preferably, the solid amorphous dispersion is substantially homogeneous so that the amorphous compound is dispersed as homogeneously as possible throughout the polymer. As used herein, "substantially homogeneous" means that the fraction of the compound that is present in relatively pure amorphous domains or regions within the solid amorphous dispersion is relatively small, on the order of less than 20 wt %, and preferably less than 10 wt % of the total amount of drug.

Water-soluble polymers suitable for use in the solid amorphous dispersions should be inert, in the sense that they do not chemically react with the poorly soluble compound in an adverse manner, are pharmaceutically acceptable, and have at least some solubility in aqueous solution at physiologically relevant pHs (e.g. 1-8). The polymer can be neutral or ionizable, and should have an aqueous-solubility of at least 0.1 mg/mL over at least a portion of the pH range of 1-8.

Water-soluble polymers suitable for use with the invention may be cellulosic or non-cellulosic. The polymers may be neutral or ionizable in aqueous solution. Of these, ionizable and cellulosic polymers are preferred, with ionizable cellulosic polymers being more preferred.

Exemplary water-soluble polymers include hydroxypropyl methyl cellulose acetate succinate (HPMCAS), hydroxypropyl methyl cellulose (HPMC), hydroxypropyl methyl cellulose phthalate (HPMCP), carboxy methyl ethyl cellulose (CMEC), cellulose acetate phthalate (CAP), cellulose acetate trimellitate (CAT), polyvinylpyrrolidone (PVP), hydroxypropyl cellulose (HPC), methyl cellulose (MC), block copolymers of ethylene oxide and propylene oxide (PEO/PPO, also known as poloxamers), and mixtures thereof. Especially preferred polymers include HPMCAS, HPMC, HPMCP, CMEC, CAP, CAT, PVP, poloxamers, and mixtures thereof. Most preferred is HPMCAS. See European Patent Application Publication No. 0 901 786 A2, the disclosure of which is incorporated herein by reference.

The solid amorphous dispersions may be prepared according to any process for forming solid amorphous dispersions that results in at least a major portion (at least 60%) of the poorly soluble compound being in the amorphous state. Such processes include mechanical, thermal and solvent processes. Exemplary mechanical processes include milling and extrusion; melt processes including high temperature fusion, solvent-modified fusion and melt-congeal processes; and solvent processes including non-solvent precipitation, spray coating and spray drying. See, for example, the following U.S. Patents, the pertinent disclosures of which are incorporated herein by reference: U.S. Pat. Nos. 5,456,923 and 5,939,099, which describe forming dispersions by extrusion processes; U.S. Pat. Nos. 5,340,591 and 4,673,564, which describe forming dispersions by milling processes; and U.S. Pat. Nos. 5,707,646 and 4,894,235, which describe forming dispersions by melt congeal processes. In a preferred process, the solid amorphous dispersion is formed by spray drying, as disclosed in European Patent Application Publication No. 0 901 786 A2. In this process, the compound and polymer are dissolved in a solvent, such as acetone or methanol, and the solvent is then rapidly removed from the solution by spray drying to form the solid amorphous dispersion. The solid amorphous dispersions may be prepared to contain up to about 99 wt % of the compound, e.g., 1 wt %, 5 wt %, 10 wt %, 25 wt %, 50 wt %, 75 wt %, 95 wt %, or 98 wt % as desired.

The solid dispersion may be used as the dosage form itself or it may serve as a manufacturing-use-product (MUP) in the preparation of other dosage forms such as capsules, tablets, solutions or suspensions. An example of an aqueous suspension is an aqueous suspension of a 1:1 (w/w) compound/HPMCAS-HF spray-dried dispersion containing 2.5 mg/mL of compound in 2% polysorbate-80. Solid dispersions for use in a tablet or capsule will generally be mixed with other excipients or adjuvants typically found in such dosage forms. For example, an exemplary filler for capsules contains a 2:1 (w/w) compound/HPMCAS-MF spray-dried dispersion (60%), lactose (fast flow) (15%), microcrystalline cellulose (e.g., Avicel$^{(R0\text{-}102)}$ (15.8%), sodium starch (7%), sodium lauryl sulfate (2%) and magnesium stearate (1%).

The HPMCAS polymers are available in low, medium and high grades as Aqoa$^{(R)\text{-}LF}$, Aqoat$^{(R)\text{-}MF}$ and Aqoat$^{(R)\text{-}HF}$ respectively from Shin-Etsu Chemical Co., LTD, Tokyo, Japan. The higher MF and HF grades are generally preferred.

The following paragraphs describe exemplary formulations, dosages, etc. useful for non-human animals. The administration of Compound A, or a pharmaceutically acceptable salt thereof, in combination with Compound D, or a pharmaceutically acceptable salt thereof, as the two agents or in combinations with another agent can be effected orally or non-orally.

An amount of Compound A, or a pharmaceutically acceptable salt thereof, with Compound D, or a pharmaceutically acceptable salt thereof, together or in combination with an another agent is administered such that an effective dose is received. Generally, a daily dose that is administered orally to an animal is between about 0.01 and about 1,000 mg/kg of body weight, e.g., between about 0.01 and about 300 mg/kg or between about 0.01 and about 100 mg/kg or between about 0.01 and about 50 mg/kg of body weight, or between about 0.01 and about 25 mg/kg, or about 0.01 and about 10 mg/kg or about 0.01 and about 5 mg/kg. A daily dose of Compound A that is administered may be 5 mg, 10 mg, 15 mg, 20 mg, 40 mg, 50 mg, or 60 mg. The daily dose may be divided into multiple doses, such as twice a day (e.g., "BID" or "q12" hour dosing interval). For example, in certain instances the daily dose of Compound A may be administered as 15 mg twice a day (e.g., q12 hours). A daily dose of Compound D that is administered may be 5 mg, 10 mg, 15 mg, 20 mg, 25 mg, 50 mg, 75 mg, 100 mg, 150 mg, 200 mg, 225 mg, 300 mg, 450 mg, or 600 mg The daily dose may be divided into multiple doses, such as twice a day (e.g., "BID" or "q12 hour dosing interval". For example, in certain instances the daily dose of Compound D may be administered as 300 mg twice a day (e.g., q12 hours).

Conveniently, a compound of the invention (or combination) can be carried in the drinking water so that a therapeutic dosage of the compound is ingested with the daily water supply. The compound can be directly metered into drinking water, preferably in the form of a liquid, water-soluble concentrate (such as an aqueous solution of a water-soluble salt).

Conveniently, a compound of the invention (or combination) can also be added directly to the feed, as such, or in the form of an animal feed supplement, also referred to as a premix or concentrate. A premix or concentrate of the compound in an excipient, diluent or carrier is more commonly employed for the inclusion of the agent in the feed. Suitable excipients, diluents or carriers are liquid or solid, as desired, such as water, various meals such as alfalfa meal, soybean meal, cottonseed oil meal, linseed oil meal, corncob meal and corn meal, molasses, urea, bone meal, and mineral mixes such as are commonly employed in poultry feeds. A particularly effective excipient, diluent or carrier is the respective animal feed itself; that is, a small portion of such feed. The carrier facilitates uniform distribution of the compound in the finished feed with which the premix is blended. Preferably, the compound is thoroughly blended into the premix and, subsequently, the feed. In this respect, the compound may be dispersed or dissolved in a suitable oily vehicle such as soybean oil, corn oil, cottonseed oil, and the like, or in a volatile organic solvent and then blended with the carrier. It will be appreciated that the proportions of compound in the concentrate are capable of wide variation since the amount of the compound in the finished feed may be adjusted by blending the appropriate proportion of premix with the feed to obtain a desired level of compound.

High potency concentrates may be blended by the feed manufacturer with proteinaceous carrier such as soybean oil meal and other meals, as described above, to produce concentrated supplements, which are suitable for direct feeding to animals. In such instances, the animals are permitted to consume the usual diet. Alternatively, such concentrated supplements may be added directly to the feed to produce a nutritionally balanced, finished feed containing a therapeutically effective level of a compound of the invention. The mixtures are thoroughly blended by standard procedures, such as in a twin shell blender, to ensure homogeneity.

If the supplement is used as a top dressing for the feed, it likewise helps to ensure uniformity of distribution of the compound across the top of the dressed feed.

Drinking water and feed effective for increasing lean meat deposition and for improving lean meat to fat ratio are generally prepared by mixing a compound of the invention with a sufficient amount of animal feed to provide from about $10^{-3}$ to about 500 ppm of the compound in the feed or water.

The preferred medicated swine, cattle, sheep and goat feed generally contain from about 1 to about 400 grams of a compound of the invention (or combination) per ton of feed, the optimum amount for these animals usually being about 50 to about 300 grams per ton of feed.

The preferred poultry and domestic pet feeds usually contain about 1 to about 400 grams and preferably about 10 to about 400 grams of a compound of the invention (or combination) per ton of feed.

For parenteral administration in animals, the compounds of the invention (or combination) may be prepared in the form of a paste or a pellet and administered as an implant, usually under the skin of the head or ear of the animal in which increase in lean meat deposition and improvement in lean meat to fat ratio is sought.

Paste Formulations may be prepared by dispersing the drug in a pharmaceutically acceptable oil such as peanut oil, sesame oil, corn oil or the like.

Pellets containing a therapeutically effective amount of Compound A, or a pharmaceutically acceptable salt thereof, in combination with Compound D, or a pharmaceutically acceptable salt thereof, pharmaceutical composition, or combination may be prepared by admixing Compound A, or a pharmaceutically acceptable salt thereof, with Compound D, or a pharmaceutically acceptable salt thereof, with a diluent such as carbowax, carnuba wax, and the like, and a lubricant, such as magnesium or calcium stearate, may be added to improve the pelleting process.

It is, of course, recognized that more than one pellet may be administered to an animal to achieve the desired dose level which will provide the increase in lean meat deposition and improvement in lean meat to fat ratio desired. Moreover, implants may also be made periodically during the animal treatment period in order to maintain the proper drug level in the animal's body.

The invention has several advantageous veterinary features. For the pet owner or veterinarian who wishes to increase leanness and/or trim unwanted fat from pet animals, the instant invention provides the means by which this may be accomplished. For poultry, beef and swine breeders, utilization of the method of the invention yields leaner animals that command higher sale prices from the meat industry.

EXAMPLES

Unless specified otherwise, starting materials are generally available from commercial sources such as Aldrich Chemicals Co. (Milwaukee, WI), Lancaster Synthesis, Inc. (Windham, N. H.), Acros Organics (Fairlawn, NJ), Maybridge Chemical Company, Ltd. (Cornwall, England) and Tyger Scientific (Princeton, NJ). Certain common abbreviations and acronyms have been employed which may include: AcOH (acetic acid), DBU (1,8-diazabicyclo[5.4.0]undec-7-ene), CDI (1,1'-carbonyldiimidazole), DCM (dichloromethane), DEA (diethylamine), DIPEA (N,N-diisopropylethylamine), DMAP (4-dimethylaminopyridine), DMF (N,N'-dimethylformamide), DMSO (dimethylsulfoxide), EDCL (N-(3-dimethylaminopropyl)-N'-ethylcarbodiimide), $Et_2O$ (diethyl ether), EtOAc (ethyl acetate), EtOH (ethanol), G or g (gram), HATU (2-(1H-7-azabenzotriazol-1-yl)-1,1,3,3-tetramethyl uronium hexafluorophosphate methanaminium), HBTU (O-benzotriazol-1-yl-N,N,N'N'-tetramethyluronium hexafluoro phosphate), HOBT (1-hydroxybenzotriazole), H or h (hour), IPA (isopropyl alcohol), KHMDS (potassium hexamethyldisilazane), MeOH (methanol), L or l (liter), mL (milliliter) MTBE (tert-butyl methyl ether), mg (milligram), $NaBH(OAc)_3$ (sodium triacetoxyborohydride), NaHMDS (sodium hexamethyldisilazane), NMP (N-methylpyrrolidone), RH (relative humidity), RT or rt (room temperature which is the same as ambient temperature (about 20 to 25° C.)), SEM ([2-(Trimethylsilyl)ethoxy]methyl), TEA (triethylamine), TFA (trifluoroacetic acid), THF (tetrahydrofuran), and $T_3P$ (propane phosphonic acid anhydride).

$^1$H Nuclear magnetic resonance (NMR) spectra were in all cases consistent with the proposed structures. Characteristic chemical shifts (δ) are given in parts-per-million (ppm) relative to the residual proton signal in the deuterated solvent ($CHCl_3$ at 7.27 ppm; $CD_2HOD$ at 3.31 ppm) and are reported using conventional abbreviations for designation of major peaks: e.g. s, singlet; d, doublet; t, triplet; q, quartet; m, multiplet; br, broad.

ssNMR means solid-state NMR.

PXRD means Powder X-ray Diffraction.

The term "substantially the same" when used to describe X-ray powder diffraction patterns is mean to include patterns in which peaks are within a standard deviation of +/−0.2°2Θ.

As used herein, the term "substantially pure" with reference to a particular crystalline form means that the crystalline form includes less than 10%, preferably less than 5%, preferably less than 3%, preferably less than 1% by weight of any other physical form of Compound A or Compound D.

Reactions were performed in air or, when oxygen- or moisture-sensitive reagents or intermediates were employed, under an inert atmosphere (nitrogen or argon). When appropriate, reaction apparatuses were dried under dynamic vacuum using a heat gun, and anhydrous solvents (Sure-Seal™ products from Aldrich Chemical Company, Milwaukee, Wisconsin or DriSolv™ products from EMD Chemicals, Gibbstown, NJ) were employed. Commercial solvents and reagents were used without further purification. When indicated, reactions were heated by microwave irradiation using Biotage Initiator or Personal Chemistry Emrys Optimizer microwaves. Reaction progress was monitored using thin layer chromatography (TLC), liquid chromatography-mass spectrometry (LCMS), high performance liquid chromatography (HPLC), and/or gas chromatography-mass spectrometry (GCMS) analyses. TLC was performed on pre-coated silica gel plates with a fluorescence indicator (254 nm excitation wavelength) and visualized under UV light and/or with $I_2$, $KMnO_4$, $CoCl_2$, phosphomolybdic acid, and/or ceric ammonium molybdate stains. LCMS data were acquired on an Agilent 1100 Series instrument with a Leap Technologies autosampler, Gemini C18 columns, MeCN/water gradients, and either TFA, formic acid, or ammonium hydroxide modifiers. The column eluent was analyzed using Waters ZQ mass spectrometer scanning in both positive and negative ion modes from 100 to 1200 Da. Other similar instruments were also used. HPLC data were acquired on an Agilent 1100 Series instrument using Gemini or XBridge C18 columns, MeCN/water gradients, and either TFA or ammonium hydroxide modifiers. GCMS data were acquired using a Hewlett Packard 6890 oven with an HP 6890 injector, HP-1 column (12 m×0.2 mm×0.33 μm), and helium carrier gas. The sample was analyzed on an HP 5973 mass selective detector scanning from 50 to 550 Da using electron ionization. Purifications were performed by medium performance liquid chromatography (MPLC) using Isco CombiFlash Companion, AnaLogix IntelliFlash 280, Biotage SP1, or Biotage Isolera One instruments and pre-packed Isco RediSep or Biotage Snap silica cartridges. Chiral purifications were performed by chiral supercritical fluid chromatography (SFC) using Berger or Thar instruments; ChiralPAK-AD, -AS, -IC, Chiralcel-OD, or -OJ columns; and $CO_2$ mixtures with MeOH, EtOH, iPrOH, or MeCN, alone or modified using TFA or $iPrNH_2$. UV detection was used to trigger fraction collection.

Mass spectrometry data are reported from LCMS analyses. Mass spectrometry (MS) was performed via atmospheric pressure chemical ionization (APCI), electrospray Ionization (ESI), electron impact ionization (EI) or electron scatter (ES) ionization sources. Proton nuclear magnetic spectroscopy ($^1$H NMR) chemical shifts are given in parts per million downfield from tetramethylsilane and were recorded on 300, 400, 500, or 600 MHz Varian spectrometers. Chemical shifts are expressed in parts per million (ppm, δ) referenced to the deuterated solvent residual peaks. The peak shapes are described as follows: s, singlet; d, doublet; t, triplet; q, quartet; quin, quintet; m, multiplet; br s, broad singlet; app, apparent. Analytical SFC data were acquired on a Berger analytical instrument as described above. Optical rotation data were acquired on a PerkinElmer model 343 polarimeter using a 1 dm cell. Silica gel chromatography was performed primarily using a medium pressure Biotage or ISCO systems using columns pre-packaged by various commercial vendors including Biotage and ISCO. Microanalyses were performed by Quantitative Technologies Inc. and were within 0.4% of the calculated values.

Unless otherwise noted, chemical reactions were performed at room temperature (about 23 degrees Celsius).

The compounds and intermediates described below were named using the naming convention provided with ChemBioDraw Ultra, Version 12.0 (CambridgeSoft Corp., Cambridge, Massachusetts). The naming convention provided with ChemBioDraw Ultra, Version 12.0 are well known by those skilled in the art and it is believed that the naming convention provided with ChemBioDraw Ultra, Version 12.0 generally comports with the IUPAC (International Union for Pure and Applied Chemistry) recommendations on Nomenclature of Organic Chemistry and the CAS Index rules. Unless noted otherwise, all reactants were obtained commercially without further purifications or were prepared using methods known in the literature.

The terms "concentrated", "evaporated", and "concentrated in vacuo" refer to the removal of solvent at reduced pressure on a rotary evaporator with a bath temperature less than 60° C. The abbreviation "min" and "h" stand for "minutes" and "hours" respectively. The term "TLC" refers to thin layer chromatography, "room temperature or ambient temperature" means a temperature between 18 to 25° C., "GCMS" refers to gas chromatography-mass spectrometry, "LCMS" refers to liquid chromatography-mass spectrometry, "UPLC" refers to ultra performance liquid chromatography and "HPLC" refers to high pressure liquid chromatography, "SFC" refers to supercritical fluid chromatography.

Hydrogenation may be performed in a Parr Shaker under pressurized hydrogen gas, or in Thales-nano H-Cube flow hydrogenation apparatus at full hydrogen and a flow rate between 1-2 mL/min at specified temperature.

HPLC, UPLC, LCMS, GCMS, and SFC retention times were measured using the methods noted in the procedures.

Compounds of the invention may be synthesized by synthetic routes that include processes analogous to those well-known in the chemical arts, particularly in light of the description contained herein. The starting materials are generally available from commercial sources such as Aldrich Chemicals (Milwaukee, WI) or are readily prepared using methods well known to those skilled in the art (e.g., prepared by methods generally described in Louis F. Fieser and Mary Fieser, *Reagents for Organic Synthesis*, v. 1-19, Wiley, New York (1967-1999 ed.), or *Beilsteins Handbuch der orqanischen Chemie.*, 4, Aufl. ed. Springer-Verlag, Berlin, including supplements (also available via the Beilstein online database)). A preparation of (S)-2-(5-((3-ethoxypyridin-2-yl)oxy)pyridin-3-yl)-N-(tetrahydrofuran-3-yl)pyrimidine-5-carboxamide is presented in Example 1 of US 2018-0051012 A1, hereby incorporated herein by reference in its entireties for all purposes. A preparation of 4-(4-(1-Isopropyl-7-oxo-1,4,6,7-tetrahydrospiro[indazole-5,4'-piperidine]-1'-carbonyl)-6-methoxypyridin-2-yl)benzoic acid is in Example 9 of U.S. Pat. No. 8,859,577, hereby incorporated herein by reference in its entireties for all purposes. Preparation of [(1R,5S,6R)-3-{2-[(2S)-2-methylazetidin-1-yl]-6-(trifluoromethyl)pyrimidin-4-yl}-3-azabicyclo[3.1.0]hex-6-yl]acetic acid (including a crystalline free acid form thereof) is described in Example 4 of U.S. Pat. No. 9,809,579. Preparation of GLP-1R agonists are described in U.S. Pat. No. 10,208,019.

Preparation of Intermediates and Examples

Example 1 (DGAT2i Compound/Compound D): (S)-2-(5-((3-ethoxypyridin-2-yl)oxy)pyridin-3-yl)-N-(tetrahydrofuran-3-yl)pyrimidine-5-carboxamide

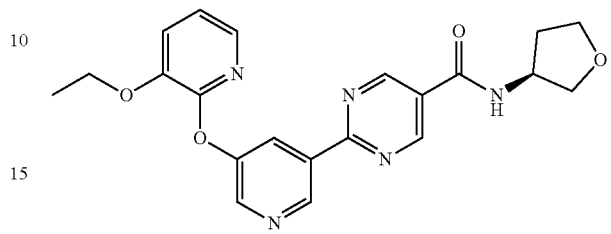

Step 1: 3-Ethoxypyridine

Cesium carbonate (12 mol, 1.5 equiv) and ethyl iodide (9.7 mol, 1.2 equiv) were added to a solution of 3-hydroxypyrdine (8.10 mol, 1.0 equiv) in acetone (12 L) at 15° C. The reaction mixture was stirred at room temperature for 24 hours. The reaction mixture was filtered and the organic layer was concentrated to give crude product. Ethyl acetate (20 L) was added and washed with water (3×5 L). The organic layer was dried over sodium sulfate, filtered and concentrated to give 3-ethoxypyridine (620 g, 62%) as an oil. $^1$H NMR (400 MHz, CDCl$_3$) δ 1.44 (t, 3H), 4.07 (q, 2H), 7.15-7.23 (m, 2H), 8.20 (dd, 1H), 8.30 (d, 1H).

Step 2: 3-Ethoxypyridine-1-oxide m-Chloroperoxybenzoic acid (6.5 mol, 1.3 equiv) was added to a solution of 3-ethoxypyridine (5.0 mol, 1.0 equiv) in dichloromethane (12 L) at 10° C. The reaction mixture was stirred at room temperature for 24 hours. Sodium thiosulfate (4 kg, in 5 L of water) was added. The reaction mixture was stirred at 15° C. for 2 hours. Another portion of sodium thiosulfate (1.5 kg, in 5 L of water) was added. The reaction mixture was stirred at 15° C. for 1 hour. The mixture was extracted with dichloromethane (16×10 L). The combined organic layers were concentrated to give crude product. The crude product was purified by silica gel column chromatography (dichloromethane:methanol; 100:1-10:1) to give the title compound (680 g, 97%) as brown oil. This was further purified by trituration with petroleum ether (4 L) at room temperature for 24 hours to give 3-ethoxypyridine-1-oxide (580 g, 83%) as yellow solid. $^1$H NMR (400 MHz, CDCl$_3$) δ 1.41 (t, 3H), 4.02 (q, 2H), 6.84 (dd, 1H), 7.12 (dd, 1H), 7.85 (d, 1H), 7.91-7.95 (m, 1H).

Step 3: 2-((5-Bromopyridin-3-yl)oxy)-3-ethoxypyridine

This reaction was carried out in five parallel batches. Diisopropylethylamine (2.69 mol, 3.7 equiv) and bromotripyrrolidinophosphonium hexafluorophosphate (0.93 mol, 1.3 equiv) were added to a stirred solution of 3-ethoxypyridine-1-oxide (0.72 mol, 1.0 equiv) and 3-bromo-5-hydroxypyridine (0.72 mol, 1.0 equiv) in tetrahydrofuran (2500 mL) at room temperature. The reaction mixture was stirred at room temperature for 2 days then the separate batches were combined to a single batch. The resulting suspension was concentrated to dryness and dissolved in dichloromethane (25 L). The organic layer was washed with 1N sodium hydroxide (15 L), water (3×20 L), and brine (20 L). The organic layer was dried over sodium sulfate, filtered and concentrated to give an oil. The crude oil was purified by silica gel column chromatography (petroleum ether:ethyl acetate; 10:1-1:1) to give crude product as brown solid. This solid was triturated with methyl tert-butyl ether:petroleum ether (1:10; 11 L) to afford 2-((5-bromopyridin-3-yl)oxy)-3-ethoxypyridine (730 g, 69%) as off yellow solid. $^1$H NMR (400 MHz, CDCl$_3$) δ 1.49 (t, 3H), 4.16 (q, 2H), 7.04 (dd, 1H), 7.25 (dd, 1H), 7.68-7.73 (m, 2H), 8.44 (d, 1H), 8.49 (d, 1H). MS (ES+) 297.1 (M+H).

Step 4: Ethyl 2-(5-((3-ethoxypyridin-2-yl)oxy)pyridin-3-yl)pyrimidine-5-carboxylate A solution of 2-((5-bromopyridin-3-yl)oxy)-3-ethoxypyridine (300 mmol, 1.0 equiv) in tetrahydrofuran (1.3 L) was degassed with nitrogen for 30 minutes. Turbo Grignard (390 mmol, 1.3 equiv, 1.3 M in tetrahydrofuran) was added at room temperature at a rate to maintain the internal temperature below 30° C. The reaction mixture was allowed to cool to room temperature and stirred for 3 hours. The reaction was cooled to 10° C. and zinc chloride (390 mmol, 1.3 equiv, 1.9 M in 2-methyltetrahydrofuran) was added at a rate to maintain the temperature below 15° C. The resulting suspension was warmed to room temperature until all the precipitate was dissolved and then cooled back to 10° C. Ethyl 2-chloropyrimidine-5-carboxylate (360 mmol, 1.2 equiv) and dichloro[bis(2-(diphenylphosphino)phenyl)ether]palladium(II) (6.00 mmol, 0.02 equiv) were added as solids. The resulting suspension was degassed with nitrogen for 30 minutes then heated to 50° C. for 16 hours. The reaction was worked up under aqueous conditions then treated sequentially with ethylenediaminetetraacetic acid disodium salt, thiosilica, and charcoal to remove metal impurities. The crude compound was recrystallized from methanol (450 mL) to yield ethyl 2-(5-((3-ethoxypyridin-2-yl)oxy)pyridin-3-yl)pyrimidine-5-carboxylate (77 g, 70%) as a pale, yellow solid. $^1$H NMR (400 MHz, CDCl$_3$) δ 1.44 (t, 3H), 1.50 (t, 3H), 4.19 (q, 2H), 4.46 (q, 2H), 7.00-7.04 (m, 1H), 7.25 (s, 1H), 7.71 (d, 1H), 8.59 (s, 1H), 8.66 (d, 1H), 9.32 (s, 2H), 9.55 (s, 1H).

Step 5: 2-(5-((3-ethoxypyridin-2-yl)oxy)pyridin-3-yl)pyrimidine-5-carboxylic acid (Intermediate 1)

Sodium hydroxide (307 mmol, 1.5 equiv, 4M aqueous) and methanol (50 mL) were added to a suspension of 2-(5-((3-ethoxypyridin-2-yl)oxy)pyridin-3-yl)pyrimidine-5-carboxylate (205 mmol, 1.0 equiv) in tetrahydrofuran (300 mL). The resulting solution was stirred at room temperature for 3 hours. The reaction mixture was diluted with water (400 mL) and extracted with 2:1 diethyl ether:heptanes (2×300 mL). The aqueous layer was acidified to pH of 4 with 4M hydrochloric acid. The resulting suspension was stirred at room temperature for 1 hour. The solid was filtered, washed with water, and dried to yield 2-(5-((3-ethoxypyridin-2-yl)oxy)pyridin-3-yl)pyrimidine-5-carboxylic acid (69 g, 100%) as a pale, yellow solid. $^1$H NMR (400 MHz, DMSO-d$_6$) δ1.37 (t, 3H), 4.18 (q, 2H), 7.19 (dd, 1H), 7.58 (dd, 1H), 7.70 (dd, 1H), 8.35-8.40 (m, 1H), 8.66 (d, 1H), 9.33 (s, 2H), 9.41 (d, 1H), 13.9 (br. s, 1H).

Step 6: (S)-2-(5-((3-ethoxypyridin-2-yl)oxy)pyridin-3-yl)-N-(tetrahydrofuran-3-yl)pyrimidine-5-carboxamide (Example 1 (DGAT2i Compound))

Oxalyl chloride (13.8 mL, 160 mmol, 1.2 equiv) and dimethylformamide (0.510 mL, 6.65 mmol, 0.05 equiv) were added to a suspension of 2-(5-((3-ethoxypyridin-2-yl)oxy)pyridin-3-yl)pyrimidine-5-carboxylic acid (45.0 g, 133 mmol, 1.0 equiv) in dichloromethane (500 mL). The suspension was stirred for 2 hours when a solution was achieved. The reaction mixture was concentrated to yield crude acid chloride as a red solid. A solution of (S)-tetrahydrofuran-3-amine (12.2 g, 140 mmol, 1.05 equiv) and diisopropylethylamine (51.0 mL, 293 mmol, 2.2 equiv) in tetrahydrofuran (100 mL) was added dropwise to a solution of the crude acid chloride in dichloromethane (200 mL) at 0° C. The reaction was allowed to warm to room temperature and stirred for 16 hours. Water (1.0 L) and ethyl acetate (600 mL) were added and the organic layer was separated, washed with saturated sodium bicarbonate, dried over magnesium sulfate, and filtered. The filtrate was treated with activated charcoal (20 g) was stirred at 65° C. for 20 minutes. The suspension was filtered warm and filtrate was concentrated to a pale, yellow solid which was recrystallized from methanol in ethyl acetate (1:4, 1 L) to yield (S)-2-(5-((3-ethoxypyridin-2-yl)oxy)pyridin-3-yl)-N-(tetrahydrofuran-3-yl)pyrimidine-5-carboxamide (43.5 g, 81%) as a colorless solid. The title compound was combined with previous batches (108.7 g, 266.8 mmol) prepared in the same manner and slurried with ethyl acetate (1.0 L) at 80° C. for 4 hours. The suspension was allowed to cool to room temperature and stirred for 4 days. The solid was filtered, washed with ethyl acetate (3×200 mL) and dried under high vacuum at 50° C. for 24 hours to yield (S)-2-(5-((3-ethoxypyridin-2-yl)oxy)pyridin-3-yl)-N-(tetrahydrofuran-3-yl)pyrimidine-5-carboxamide (100.5 g, 92%) as a colorless solid. $^1$H NMR (300 MHz, DMSO-d$_6$) δ 1.38 (t, 3H), 1.89-1.98 (m, 1H), 2.15-2.26 (m, 1H), 3.65 (dd, 1H), 3.70-3.78 (m, 1H), 3.85-3.92 (m, 2H), 4.18 (q, 2H), 4.46-4.55 (m, 1H), 7.18 (dd, 1H), 7.58 (dd, 1H), 7.69 (dd, 1H), 8.37 (dd, 1H), 8.64 (d, 1H), 8.95 (d, 1H), 9.28 (s, 2H), 9.39 (d, 1H). MS (ES+) 408.4 (M+H). Melting point 177.5° C. Elemental analysis for C$_{21}$H$_{21}$N$_5$O$_4$: calculated C, 61.91; H, 5.20; N, 17.19; found C, 61.86; H, 5.18; N, 17.30.

The solid form from this procedure was characterized by Powder X-ray diffraction (PXRD) analysis and assigned as Form 1 of Compound D.

Alternative Step 6 for preparation of (S)-2-(5-((3-ethoxypyridin-2-yl)oxy)pyridin-3-yl)-N-(tetrahydrofuran-3-yl)pyrimidine-5-carboxamide (Example 1 (Compound D))

A 100 mL reactor was charged with acetonitrile (35 mL), 2-(5-((3-ethoxypyridin-2-yl)oxy)pyridin-3-yl)pyrimidine-5-carboxylic acid (5.0 g, 15 mmol) and (S)-tetrahydrofuran-3-amine hydrochloride (2.2 g, 18 mmol, 1.2 equiv). Diisopropylethylamine (18 mL, 103 mmol, 7.0 equiv) was charged while maintaining the temperature at 20° C. to 30° C. A solution of propane phosphonic acid anhydride (T3P) in acetonitrile (21 mL, 30 mmol, 2.0 equiv) was charged at a rate that maintained the temperature below 45° C. The reactor was heated to 40±5° C. for 1 hour then sampled for reaction completion. The reaction was cooled to 20° C. to 25° C. and tetrahydrofuran (25 mL) was added. A solution of sodium bicarbonate (0.5M, 40 mL) was charged and the mixture was stirred for 1 hour. The pH was checked and measured at 8.5. Ethyl acetate (40 mL) was added and the mixture stirred for 15 minutes. The mixture was settled and the phases split. The aqueous layer was transferred to a separatory funnel and back extracted with ethyl acetate (100 mL). The organic phases were combined and washed with water (40 mL). The organic layer was transferred to a 100 mL reactor in portions and concentrated under vacuum to a low volume. Methyl ethyl ketone (100 mL) was added and the mixture was concentrated to a final volume of approximately 60 mL. Vacuum was removed and the slurry was heated to reflux and held until the solids were washed down the reactor walls. The slurry was cooled to 15° C. over 2 hours and granulated overnight. The solids were isolated by filtration, washing the reactor and cake twice with methyl ethyl ketone (10 mL each). The solids were dried in a vacuum oven at 50° C. to yield 4.86 g (81%) of the desired product. The solid form from this procedure was characterized by PXRD analysis and assigned as Form 2 of Compound D.

Conversion of the Form 2 to the Form 1 of Compound D

To a 100 mL reactor was charged Form 2 of (S)-2-(5-((3-ethoxypyridin-2-yl)oxy)pyridin-3-yl)-N-(tetrahydrofuran-3-yl)pyrimidine-5-carboxamide (Example 1) (10.0 g, 24.6 mmol, 1.00 equiv.), Methyl ethyl ketone (8.8 mL/g, 88.0 mL) and water (1.2 mL/g, 12.0 mL). The reactor was heated to 50° C. over 30 minutes. A complete solution appeared at approximately 44° C. The reactor was cooled to 40° C. over 30 minutes then seed Form 1 of (S)-2-(5-((3-ethoxypyridin-2-yl)oxy)pyridin-3-yl)-N-(tetrahydrofuran-3-yl)pyrimidine-5-carboxamide (Example 1 of Compound D) (0.050 g, 0.123 mmol, 0.0050 equiv.) was charged. After seeding, the hazy slurry was stirred for 1 hour before cooling to 5° C. over 2 hours and then stirred at 5° C. for 12 hours. An in process control sample was pulled and characterized by PXRD analysis to confirm the solids were Form 1 of Compound D. The slurry was filtered, and the reactor and cake was washed with 0° C. methyl ethyl ketone (2.5 mL/g, 25 mL). The solids were dried in a vacuum oven at 50° C. to yield 8.15 g (81.5%) of the desired product. PXRD patterns of the desired product were consistent with Form 1 of Compound D.

Powder X-Ray Diffraction:

Powder X-ray diffraction analysis was conducted using a Bruker AXS D8 Advance diffractometer equipped with a Cu radiation source (Kα-average wavelength of 1.54056 Å), equipped with a twin primary utilizing a gobel mirror. Diffracted radiation was detected by a PSD-Lynx Eye detector. Both primary and secondary equipped with 2.5 soller slits. The X-ray tube voltage and amperage were set at 40 kV and 40 mA respectively. Data was collected in the Theta-Theta goniometer in a locked couple scan from 3.0 to 40.0 degrees 2-Theta with 1000 steps using a scan speed of 6 seconds per step. Samples were prepared by placement in a silicon low background sample holder (C79298 Å3244B261). Data were collected using Bruker DIFFRAC Plus software. Analysis performed by EVA diffract plus software.

The PXRD data file was not processed prior to peak searching. Using the peak search algorithm in the EVA software, peaks were selected with a threshold value of 5 and a width value of 0.2. The output of automated assignments was visually checked to ensure validity and adjustments manually made if necessary. Peaks with relative intensity of 3% were generally chosen. The peaks which were not resolved or were consistent with noise were also discarded. A typical error associated with the peak position from PXRD stated in USP is within +/−0.2° (USP-941).

TABLE 1

| Key PXRD peaks to characterize crystalline material Example 1 (Compound D) ||
| --- | --- |
| Form 1 of Example 1 Angle 2Θ (°) | Form 2 of Example 1 Angle 2Θ (°) |
| 5.3, 7.7, 15.4 | 6.5, 9.3, 13.6 |

FIG. 1 is a characteristic x-ray powder diffraction pattern showing crystalline form 1 of Example 1 (Compound D) (Vertical Axis: Intensity (CPS); Horizontal Axis: Two theta (degrees)).

Figure 2:
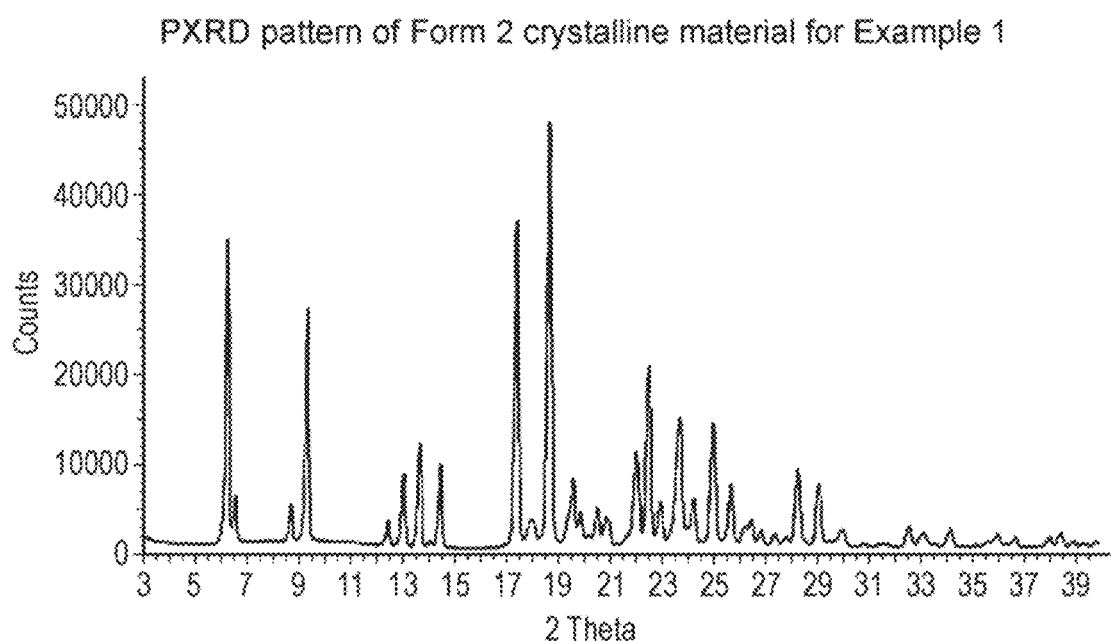
FIG. 2 is a characteristic x-ray powder diffraction pattern showing crystalline Form 2 of Example 1 of the DGAT2i Compound (Compound D) (Vertical Axis: Intensity (CPS); Horizontal Axis: Two theta (degrees)).

FIG. 2 is a characteristic x-ray powder diffraction pattern showing crystalline Form 2 of Example 1 (Compound D) (Vertical Axis: Intensity (CPS); Horizontal Axis: Two theta (degrees)).

Example 2: Preparation of 4-(4-(1-isopropyl-7-oxo-1,4,6,7-tetrahydrospiro[indazole-5,4'-piperidine]-1'-carbonyl)-6-methoxypyridin-2-yl)benzoic acid, Compound A (ACCi Compound)

In the preparation of Compound A, it is noted that some of the preparation methods described herein may require protection of remote functionality (e.g., primary amine, secondary amine, carboxyl in Formula I precursors). The need for such protection will vary depending on the nature of the remote functionality and the conditions of the preparation methods. The need for such protection is readily determined by one skilled in the art. The use of such protection/deprotection methods is also within the skill in the art. For a general description of protecting groups and their use, see T. W. Greene, Protective Groups in Organic Synthesis, John Wiley & Sons, New York, 1991. Furthermore, this invention is not limited to specific synthetic methods provided herein that may vary.

Intermediate A1: 1-Isopropyl-4,6-dihydrospiro[indazole-5,4'-piperidin]-7(1H)-one, Hydrochloride Salt

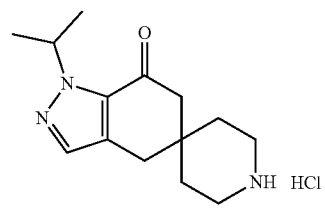 [SMILES: CC(C)n1ncc2c1C(=O)CC1(CCNCC1)C2 ; Cl]

Step 1. tert-Butyl 9-oxo-3-azaspiro[5.5]undec-7-ene-3-carboxylate

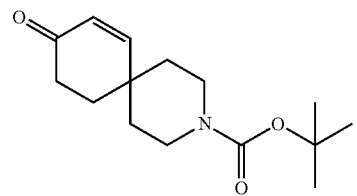 [SMILES: CC(C)(C)OC(=O)N1CCC2(C=CC(=O)CC2)CC1]

A dry reactor was charged with tert-butyl 4-formylpiperidine-1-carboxylate (108 Kg), cyclohexane (1080 L) and pyrrolidine (64.8 Kg) at 25-30° C. The mixture was stirred 5-10 min, and was then heated to reflux for 12-16h, while collecting water using a Dean-Stark trap. The reaction mixture was then cooled to 50-60° C., at which temperature vacuum was applied to distill excess pyrrolidine and cyclohexane. The reaction mixture was then cooled to 25-30° C., and cyclohexane (648 L) was charged, followed by methyl vinyl ketone (49.63 Kg). The mixture was stirred for 12-16 h, then filtered and the filtrate was charged into a clean and dry reactor. The solution was cooled to 10-15° C., then a solution of acetic acid (54.75 Kg) in water (54 L) was slowly added, maintaining the temperature below 15° C. At the end of the addition, the mixture was warmed up to 25-30° C. and stirred for 12-16 h. The layers were separated and the aqueous was extracted with ethyl acetate (324 L). Combined organic layers were washed with a solution of sodium bicarbonate (32.34 Kg) in water (324 L), then dried over sodium sulfate. The solids were washed with ethyl acetate (54 L), and combined filtrates were concentrated under reduced pressure at below 40° C. n-Heptane (216 L) was charged into the reactor and distillation was pursued under reduced pressure and at below 40° C. until dryness. The mixture was cooled to 25-30° C. and n-heptane (216 L) was charged in the reactor. The mixture was stirred for 1-2 h after formation of solids. The solids were then filtered, washed with n-heptane (54 L) and dried at 40-50° C. for 10-12 h to generate the desired material (90.1 Kg, 67% yield).

Step 2. (E)-tert-Butyl 10-((dimethylamino)methylene)-9-oxo-3-azaspiro[5.5]undec-7-ene-3-carboxylate

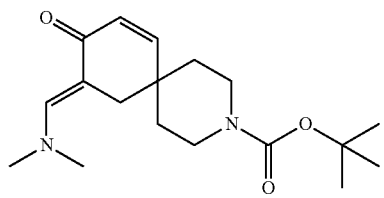 [SMILES: CN(C)/C=C1\CC2(C=CC1=O)CCN(C(=O)OC(C)(C)C)CC2]

A clean and dry reactor was charged with tert-butyl 9-oxo-3-azaspiro[5.5]undec-7-ene-3-carboxylate (50 Kg), N,N-dimethylformamide (500 L) and N,N-dimethylformamide dimethyl acetal (135 Kg) at 25-30° C. under nitrogen atmosphere. The reaction mixture was stirred 5-10 min then heated to 120-130° C. for 20 h. the mixture was then cooled to 50-60° C., and the solvent was distilled under high vacuum at below 60° C. Mix-xylenes (200 L) was charged at below 45° C. and the solvent was distilled under high vacuum at below 60° C. This operation was repeated with another lot of mix-xylenes (200 L). Toluene (200 L) was then charged into the reactor and the solvent was distilled under high vacuum at below 60° C. This operation was repeated with a second lot of toluene (200 L). Methyl tert-butyl ether (100 L) was then charged at below 30° C. and the solvent was distill under high vacuum at below 40° C. The mixture was cooled down to 15-20° C. and methyl tert-butyl ether (100 L) was charged at below 20° C. The mixture was stirred for 20-30 min and the solids were filtered, washed with methyl tert-butyl ether (50 L) and dried without vacuum at 50-55° C. for 10 h to provide the desired compound (52.1 Kg, 87% yield). $^1$H NMR (400 MHz, CDCl$_3$) δ ppm 7.48 (s, 1H), 6.57 (d, J=9.97 Hz, 1H), 5.99 (d, J=10.16 Hz, 1H), 3.32-3.51 (m, 4H), 3.06 (s, 6H), 2.72 (s, 2H), 1.57-1.66 (m, 2H), 1.41-1.53 (m, 11H).

Step 3. tert-Butyl 1-isopropyl-1,4-dihydrospiro[indazole-5,4'-piperidine]-1'-carboxylate

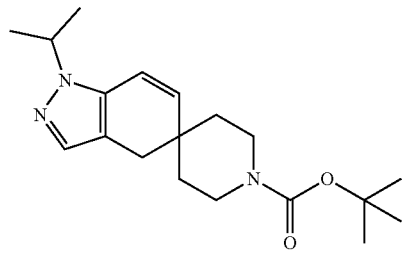 [SMILES: CC(C)n1ncc2c1C=CC1(CCN(C(=O)OC(C)(C)C)CC1)C2]

A clean and dry reactor was charged with (E)-tert-butyl 10-((dimethylamino)methylene)-9-oxo-3-azaspiro[5.5]undec-7-ene-3-carboxylate (80 Kg), toluene (704 L) and trimethylamine (16 L) at 25-30° C. The reaction mixture was warmed up to 70-80° C., and a solution of isopropyl hydrazine hydrochloride salt in methanol (1.25 equiv., 141 Kg total) was added over 4-5 h. The reaction mixture was then stirred for 8-10 h at 70-80° C., prior cooling to 15-25° C. A solution of citric acid (48 Kg) in water (480 L) was then slowly added, maintaining internal temperature below 25° C. Ethyl acetate (208 L) was added and the mixture was stirred for 10 min. Layers were separated and the organic layer was successively washed with a solution of citric acid (48 Kg) in water (480 L), then with only water (320 L). Combined aqueous layers were extracted with ethyl acetate (320 L). Combined organic layers were then dried over sodium sulfate (8 Kg) and the solvents were evaporated to dryness under reduce pressure and at below 40° C. Dichloromethane (240 L) was charged into the reactor and the mixture was stirred at 25-30° C. until clear. Activated carbon (1.84 Kg), magnesium silicate (1.84 Kg) and silica gel (32 Kg, 100-200 mesh) were successively charged at 25-30° C. and the heterogeneous mixture was stirred for 1 h. The slurry was then filter on a Hyflow bed, prepared by mixing Hyflow supercell (8 Kg) and dichloromethane (40 L). The cake was washed with dichloromethane (three times 120 L). The combined filtrates were charged back in the reactor and the solvent was evaporated under reduced pressure at below 40° C. n-Heptane (160 L) was then charged and distilled under reduced pressure at below 40° C. n-Heptane (200 L) was charged in the reactor and the mixture was cooled down to 0-5° C. After stirring for 12-15 h, the solids were filtered at 0° C., washed with chilled (0-5° C.) n-heptane (160 L) and dried under vacuum at 40-50° C. to provide the title compound (82.4 Kg, 75%). $^1$H NMR (400 MHz, CDCl$_3$) b ppm 7.25 (s, 1H), 6.42 (dd, J=10.05, 0.49 Hz, 1H) 5.84 (d, J=9.95 Hz, 1H), 4.42-4.52 (m, 1H), 3.36-3.53 (m, 4H), 2.62 (s, 2H) 1.56-1.68 (m, 2H) 1.45-1.55 (m, 17H).

Step 4. 1-Isopropyl-4,6-dihydrospiro[indazole-5,4'-piperidin]-7(1H)-one, Hydrochloride Salt

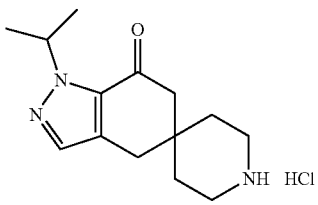 [SMILES: CC(C)n1ncc2c1C(=O)CC1(CCNCC1)C2 ; Cl]

A clean and dry reactor was charged with tert-butyl 1-isopropyl-1,4-dihydrospiro[indazole-5,4'-piperidine]-1'-carboxylate (60 Kg) and methanol (600 L) at 25-30° C. N-Bromosuccinimide (32.4 Kg) was added in 5 portions over 30-40 min at 25-30° C. and stirring was continued for 30-60 min. A solution of sodium thiosulfate pentahydrate (5.4 Kg) in water (102 L) was slowly added, maintaining internal temperature below 30° C. The mixture was stirred for 20-30 min then the solvent was evaporated under reduced pressure at below 45° C. The residue was cooled down to 25-30° C. and 2-methyltetrahydrofuan (420 L) was charged in the reactor, along with water (90 L). The mixture was stirred for 15-20 min, then the layers were separated, the aqueous layer was further extracted with 2-methyltetrahydrofuran (120 L). Combined organic extracts were treated for 15-20 min at 25-30° C. with a solution of sodium hydroxide (4.8 Kg) in water (120 L). Layers were separated and the organic layer was washed with water (120 L), followed by a solution of sodium chloride (12 Kg) in water (120 L) and then dried over sodium sulfate (6 Kg). After filtration, the cake was washed with 2-methyltetrahydrofuran (30 L) and combined filtrate were charged back into the reactor. The solvent was completely distilled at below 45° C. under reduced pressure and the residue was solubilized in tetrahydrofuran (201 L). In another clean and dry reactor was charged potassium tert-butoxide (60.6 Kg) and tetrahydrofuran (360 L) at 25-30° C. To that mixture was slowly added the solution of the residue in tetrahydrofuran maintaining a temperature below 30° C. The reaction mixture was then warmed up to 60-65° C. and kept at this temperature for 1-2 h. Upon completion, the mixture was cooled to 0-10° C., and slowly quenched with a solution of hydrochloric acid (1 N, 196 L), maintaining internal temperature below 10° C. The reaction mixture was allowed to warm up to 25-30° C., and ethyl acetate (798 L) was charged. After stirring for 15-20 min, the layers were separated, and the aqueous layer was further extracted with ethyl acetate (160 L). Combined organic layers were washed with water (160 L), dried over sodium sulfate (8 Kg), filtered, and the cake was washed with ethyl acetate (300 L). The solvents were entirely distilled under reduced pressure at below 45° C., and ethyl acetate (540 L) was charged into the reactor at 25-30° C., followed by methanol (156 L). The mixture was cooled to 0-5° C., at which point acetyl chloride (79.8 Kg) was slowly added, maintaining the temperature in the specified range. The mixture was then allowed to warm up to 20-25° C. and was kept at this temperature for 4-5 h with stirring. The resulting slurry was filtered and the solids were washed with ethyl acetate (120 L), then dried at 40-45° C. for 8-10 h to furnish the desired crude product (33.5 Kg, 65%).

A final purification step was performed by solubilizing this crude solid (56.8 Kg) in methanol (454.4 L) in a clean a dried reactor at 25-30° C. The solution was stirred for 30-45 min, then passed through a 0.2 micron cartridge filter into a clean and dry reactor at 25-30° C. Methanol was distilled under reduced pressure at below 50° C. until ~1 vol solvent remains. The reaction mixture was cooled to 25-30° C. and fresh acetonitrile (113.6 L) was charged through a 0.2 micron cartridge filter. The solvents were distilled under reduced pressure at below 50° C. until ~1 vol solvent remains. The reaction mixture was cooled to 25-30° C. and fresh acetonitrile (190 L) was charged into the reactor through a 0.2 micron cartridge filter. The mixture was warmed up to 65-70° C. and stirred for 45 min, then cooled down to 25-30° C. and stirred for 1 h. the resulting slurry was filtered, and the cake was washed with chilled (15° C.) acetonitrile (56.8 L). The solids were dried under reduced pressure at 40-50° C. for 8 h to afford Intermediate A1 (36.4 Kg, 64%). $^1$H NMR (400 MHz, CD$_3$OD) δ ppm 7.43 (s, 1H), 5.32-5.42 (m, 1H), 3.15-3.25 (m, 4H), 2.89 (s, 2H), 2.64 (s, 2H), 1.69-1.90 (m, 4H), 1.37-1.45 (m, 6H); ESI [M+H]$^+$ =248.

Intermediate A2: 2-(4-(tert-Butoxycarbonyl)phenyl)-6-methoxyisonicotinic acid

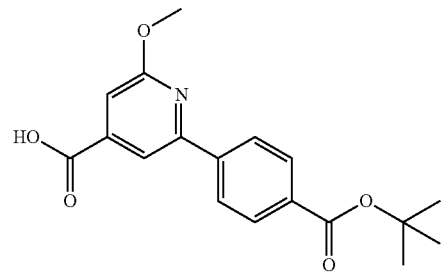 [SMILES: COc1cc(C(=O)O)cc(-c2ccc(C(=O)OC(C)(C)C)cc2)n1]

A clean and dried reactor was charged with 2,6-dichloroisonicotinic acid (30 Kg) and methanol (120 L) at 20-25° C. The slurry was stirred for 5 min then heated up to 65° C. (reflux). A solution of sodium methoxide in methanol (30%, 87.2 Kg) was then slowly charged over at least 4 h via addition funnel. The funnel was rinsed with methanol (15 L), and stirring was pursued at 65° C. for at least 15 h. the mixture was then cooled down to 45° C. and distilled under reduced pressure until a residual volume of ~90 L. A solution of potassium bicarbonate (28.2 Kg) and potassium carbonate (21.6 Kg) in water (180 L) was then charged into the reactor at 40-45° C. The reactor containing the aqueous solution was rinsed with water (21 L) and the wash was charged into the reaction mixture. The mixture was distilled under reduced pressure at below 80° C. until a residual volume of ~240 L, then cooled down to 20-25° C.

Another clean and dry reactor was charged with tert-butyl 4-(4,4,5,5-tetramethyl-1,3,2-dioxoborolan-2-yl)benzoate (52.3 Kg) and dioxane (340 Kg), and stirred at 2-25° C. until complete dissolution. The content of the former reactor was then heated at 40° C. to ensure complete solubility and transferred into this new reactor. The reaction mixture was cooled down to 20-25° C., and a deoxygenation step was performed via vacuum/nitrogen cycles. The mixture was further cooled down to 0-10° C. and palladium acetate (0.65 Kg) was charged into the reactor followed by triphenylphosphine (2.46 Kg) under nitrogen flow. The mixture was warmed up to 20-25° C. and another deoxygenation step was performed via vacuum/nitrogen cycles. The mixture was then heated to 80° C. and maintained at this temperature for at least 18 h. the mixture was cooled down to 20-25° C., then methyl tert-butyl ether (133.2 Kg) and water (30 L) were successively charged into the reactor. The layers were separated, and the aqueous was diluted with water (110 L), then extracted with methyl tert-butyl ether (110 L). Combined organic extracts were washed with a solution of citric acid (52 Kg) in water (84 L), and the layers were separated. The aqueous layer was further extracted with methyl tert-butyl ether (88.8 Kg) and organic layers were combined, then washed three times with a third of a solution of sodium chloride (43 Kg) in water (80 L). After final layer separation, the organic layer was filtered through pall filter containing a charcoal cartridge, and the cake was washed with methyl tert-butyl ether (11.2 Kg). The filtrate was distilled under reduced pressure at below 50° C. down to ~90 L, and was then successively co-distilled with heptane (120 L), at below 50° C. and down to ~120 L. the mixture was then cooled down to 20-25° C. over 1 h, then stirred at this temperature for another 1 h. The slurry was filtered and the cake was washed three times with heptane (3×18 L), then three times with acetonitrile (3×18 L). The resulting wet solid was dried under vacuum and nitrogen flow at below 45° C. for at least 15 h to afford Intermediate A2 (44.6 Kg, 87% yield). $^1$H NMR (400 MHz, CDCl$_3$) δ ppm 8.13 (s, 2H), 8.09 (s, 2H), 7.97 (d, J=1.17 Hz, 1H), 7.34 (d, J=0.98 Hz, 1H), 4.08 (s, 3H), 1.61 (s, 9H); ESI [M+H]$^+$=330.

Intermediate A3: tert-Butyl 4-(4-(1-isopropyl-7-oxo-1,4,6,7-tetrahydrospiro[indazole-5,4'-piperidine]-1'-carbonyl)-6-methoxypyridin-2-yl)benzoate

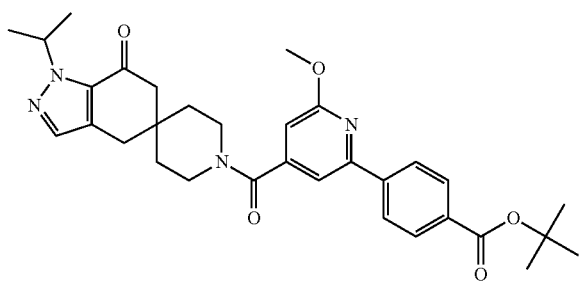 [SMILES: COc1cc(C(=O)N2CCC3(CC2)CC(=O)c2c(cnn2C(C)C)C3)cc(-c2ccc(C(=O)OC(C)(C)C)cc2)n1]

A round bottomed flask was charged with 2-(4-(tert-butoxycarbonyl)phenyl)-6-methoxyisonicotinic acid (Intermediate A2, 15.2 g, 46.2 mmol) and ethyl acetate (140 mL). 1,1'-Carbonyldiimidazole (8.98 g, 55.4 mmol) was added in one portion and stirred for 1 h at rt. 1-isopropyl-4,6-dihydrospiro[indazole-5,4'-piperidin]-7(1H)-one hydrochloride (Intermediate A1, 14.8 g, 52.2 mmol) was added followed by N,N-diisopropylethylamine (9.1 mL, 52.2 mL) and the reaction stirred for 18 h at rt. Aqueous 2 M HCl (40 mL) was added, followed by 1 M potassium hydrogensulfate (40 mL) and 50 mL of heptane. The obtained mixture was stirred for 1 h at rt. The mixture was transferred to separation funnel. The organic phase was separated, washed successively with water (20 mL), saturated sodium bicarbonate (30 mL), water (20 mL), brine (20 mL), dried over 20 g of magnesium sulfate and 10 g of silica gel, filtered, and concentrated in vacuo. Solid began to form towards the end of concentration. The residue was stirred in 40 mL of ethyl acetate at 80° C. and heptane (120 mL) was added slowly dropwise. The mixture was stirred at 80° C. for 1 h, then slowly cooled to room temperature with stirring over 1 h and stirred for 18 h at rt. The solid was collected via filtration, washed with water and ethyl acetate-heptane (1:3), and dried under vacuum at 50° C. for 18 h to obtain Intermediate A3 (19.64 g, 76% yield).

Alternative Preparation of Intermediate A3:

A clean and dry reactor was charged with acetonitrile (219 Kg) and 2-(4-(tert-butoxycarbonyl)phenyl)-6-methoxyisonicotinic acid (Intermediate A2, 34.8 Kg) at 20-25° C. The mixture was stirred for 5 min, then 1,1-carbodiimidazole (18.9 Kg) was charged in three successive portions. The slurry was further stirred at 20-25° C. for at least 1 h, then 1-isopropyl-4,6-dihydrospiro[indazole-5,4'-piperidin]-7(1H)-one hydrochloride salt (Intermediate A1, 33.0 Kg) was charged into the reactor, followed by N,N-diisopropylethylamine (20.5 Kg) via pump. The reagent pump as well as the walls of the reactor were washed with acetonitrile (13.7 Kg), and stirring was pursued at 20-25° C. for at least 2 h. Upon completion, the mixture was seeded with tert-butyl 4-(4-(1-isopropyl-7-oxo-1,4,6,7-tetrahydrospiro[indazole-5,4'-piperidine]-1'-carbonyl)-6-methoxypyridin-2-yl)benzoate (Intermediate A3, 209 g) and stirred for at least 30 min. After confirmation of crystallization start, a solution of citric acid monohydrate (58.5 Kg) in water (257 L) was charged over 1 h. The resulting slurry was further stirred at 20-25° C. for at least 2 h, then filtered and the cake was washed with a mixture of acetonitrile (68.4 Kg) and water (87 L). This wash was used to rinse the reactor as well. The solids were dried under reduced pressure at below 55° C., affording Intermediate A3 (43.44 Kg, 73% yield).

Compound A (as the free acid): 4-(4-(1-isopropyl-7-oxo-1,4,6,7-tetrahydrospiro[indazole-5,4'-piperidine]-1'-carbonyl)-6-methoxypyridin-2-yl)benzoic acid

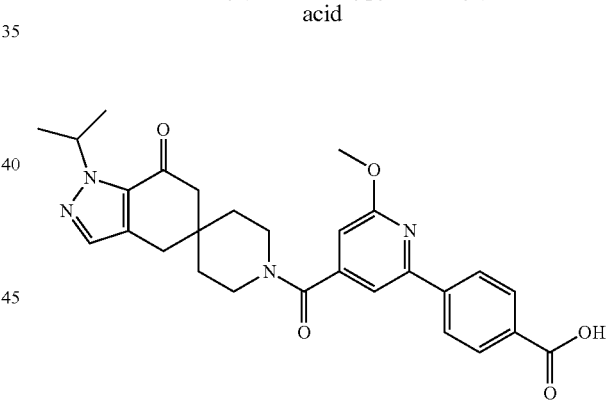

A round bottomed flask was charged with tert-butyl 4-(4-(1-isopropyl-7-oxo-1,4,6,7-tetrahydrospiro[indazole-5,4'-piperidine]-1'-carbonyl)-6-methoxypyridin-2-yl)benzoate (3.7 g, 6.6 mmol) and toluene (25 mL). 85% Phosphoric acid (3.0 mL) was added dropwise with stirring and the reaction was heated to 60° C. for 4 hours. A colorless thick gum formed. The reaction was cooled to rt and water was added. White solids were observed. The toluene organic layer was discarded, reserving the aqueous layer and solids. Ethyl acetate was added (60 mL) and 4N NaOH solution was added to adjust pH to ~7. The layers were separated and the aqueous was extracted with ethyl acetate (50 mL). The combined ethyl acetate organic layers were dried over sodium sulfate, filtered, and concentrated in vacuo to provide white solids. These were dissolved in ethyl acetate (80 mL) at 50° C. and heptane (90 mL) was added slowly. The heat was removed and the mixture was cooled to rt and stirred for 16 h. The resultant solids were collected via filtration, rinsed with the mother liquor, and dried to provide the title compound (Compound A free form, 2.15 g, 65% yield) as a white solid.

Alternative Preparation of Compound a (as the Free Acid):

A clean a dry reactor was charged with acetonitrile (130.4 Kg) and tert-butyl 4-(4-(1-isopropyl-7-oxo-1,4,6,7-tetrahydrospiro[indazole-5,4'-piperidine]-1'-carbonyl)-6-methoxypyridin-2-yl)benzoate (Intermediate A3, 20.72 Kg) at 20-25° C. The mixture was stirred for 5 min, then p-toluenesulfonic acid (8.5 Kg) was charged under a gentle nitrogen sweep. The reaction mixture was warmed up to 70° C. and maintained at this temperature for at least 6.5 h. Upon completion, the mixture was cooled down to 40° C., seeded with Compound A (104 g) and water (83 L) was slowly charged over at least 1 h. the mixture was further stirred at 40° C. for a minimum of 4 h, then cooled down to 20-25° C. over 2 h. Further stirring for at least 2 h was followed by filtration, and the cake was rinsed with a solution of acetonitrile (33 Kg) and water (41 L). This wash was used to rinse the reactor as well. The resulting solids were dried under reduced pressure at below 55° C. to afford Compound A (16.5 Kg, 89% yield).

Preparation of Form 1 of Compound a—Anhydrous Mono-Tris of Compound A:

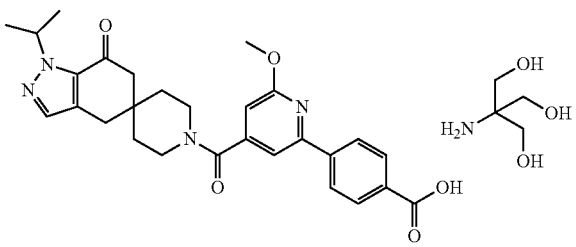 [SMILES: COc1cc(C(=O)N2CCC3(CC2)CC(=O)c2c(cnn2C(C)C)C3)cc(-c2ccc(C(=O)O)cc2)n1 ; NC(CO)(CO)CO]

A vial was charged with 4-(4-(1-isopropyl-7-oxo-1,4,6,7-tetrahydrospiro[indazole-5,4'-piperidine]-1'-carbonyl)-6-methoxypyridin-2-yl)benzoic acid (151 mg, 0.300 mmol) and 3 mL of ethanol. The mixture was heated to 80° C. for 5 minutes to dissolve the solid and then cooled to rt. Tris(hydroxymethyl)aminomethane (39 mg, 0.32 mmol) was added, and the mixture was stirred overnight at rt. Heptane (2.25 mL) was added dropwise to produce a slurry that was heated to 50° C. to produce a clear solution. The mixture was cooled to rt overnight with stirring. White solids were observed, and the mixture was stirred for an additional 3 days. The material was filtered and dried in a vacuum oven at 50° C. overnight to produce Form 1 (151 mg, 0.242 mmol, 81% yield).

Alternative Preparation of Form 1 of Compound A: Anhydrous Mono-Tris of Compound A:

To a clean and dry reactor was charged ethanol (83 L), followed by the addition of Compound A (9.43 Kg) and tris (2.55 kg) while the mixture was maintained at a temperature of 20-25° C. The tank walls were rinsed with ethanol (2 L), and the resulting mixture was heated at 65-70° C., maintained at this temperature for at least 30 min until all solids dissolved, then cooled down to 45-50° C. A warm filtration through a 10 μm in-line polypropylene filter was performed, and the reactor as well as the filter were washed with ethanol (9 L). n-Heptane (24 L) was charged into the warm solution through the same in-line filter, and the mixture was seeded with 4-(4-(1-isopropyl-7-oxo-1,4,6,7-tetrahydrospiro[indazole-5,4'-piperidine]-1'-carbonyl)-6-methoxypyridin-2-yl) benzoic acid anhydrous tris salt (100 g) in ethanol (0.5 L) at 45-50° C. The temperature was held for at least 2 h before cooling down to 20-25° C. over at least 2 h. Stirring was pursued for at least 5 days. The slurry was then filtered, and the cake was washed with a mixture of ethanol (13 L) and n-heptane (6 L). The solids were dried under reduced pressure at below 45° C. for at least 12 h, affording example 1 (11.7 Kg, 77%).

Preparation of Form 2 of Compound A—Trihydrate of the Mono-Tris Salt of Compound A:

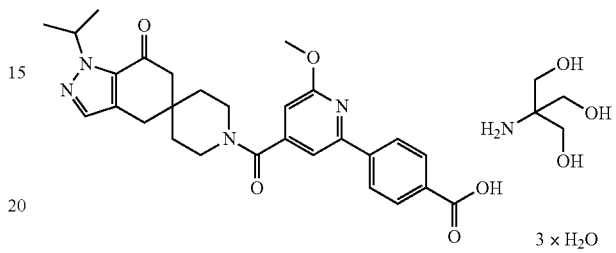

Form 2 of Compound A was obtained from conversion from Form 1 of Compound A. Into a 50 mL EasyMax reactor was added Form 1 (1.7214 g, 2.760 mmol), Isopropanol (16.50 mL, 215.8 mmol), and Water (688 μL, 38.190 mmol). The mixture was stirred (300 rpm) for about 72 hr with a reactor jacket temperature of 25° C. The reaction mixture was then warmed to 40° C. over 15 min and held at 40° C. for about 24 hours, cooling once to 20° C. to remove a sample for testing. A mixture of forms was seen by PXRD; therefore, additional water Water (688 μL, 38.190 mmol) was added. The stir rate was increased to 400 rpm and the slurry was allowed to stir for 6 hours and was then cooled to 15° C. The solids were isolated on a 60 mL/40 M filter and washed with 96/4 isopropanol/water. The resulting material was consistent with Form 2 of Compound A by PXRD.

Alternative Preparation of Form 2 of Compound A—Trihydrate of the Mono-Tris Salt of Compound A:

A clean and dry reactor was charged with isopropanol (60.4 Kg), and Compound A (16.68 Kg) and tris (4.42 kg) were added while the mixture was maintained at a temperature of 20-25° C. The mixture was stirred for 5 min, then water (6.7 Kg) was charged and the slurry was warmed up to 55° C. The now clear solution was filtered into a prewarmed clean and dry reactor (50-55° C.) through an in-line 10 μm polypropylene filter. The solution was then seeded with the mono-tris salt of Compound A as a trihydrate (167 g). After verification that the seed persisted, the mixture was cooled down to 15° C. over at least 2 h, then maintained at 15° C. for a minimum of 16 h. The slurry was filtered and the cake washed with chilled isopropanol (13.1 Kg). The solids were then dried under reduced pressure at below 25° C. to afford only Form 2 of Compound A (22.1 Kg, 98% yield).

Figure 3:
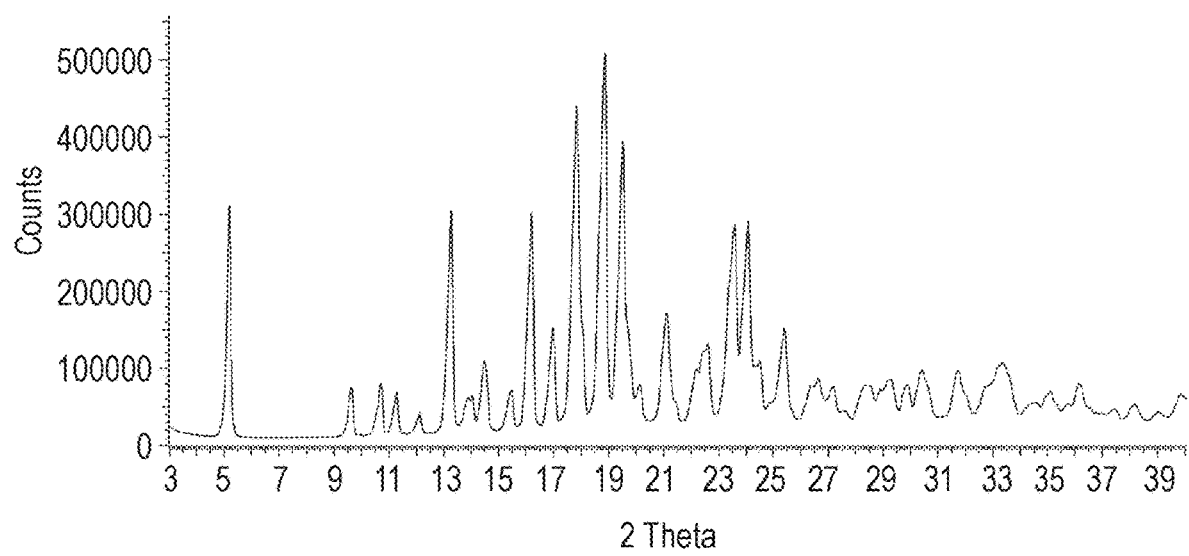
FIG. 3 shows an illustrative PXRD pattern of Form 1 of Example 2 (Compound A) carried out on a Bruker AXS D4 Endeavor diffractometer equipped with a Cu radiation source.

Form 1 of Compound A is anhydrous and is thermodynamically stable below a water activity of about 0.2 (20% RH) at ambient temperature. Form 1 of Compound A has a PXRD pattern substantially the same as that shown in FIG. 3 of Compound A. Characteristic PXRD peaks of Form 1 of Compound A, expressed as 2Θ±0.2° 2Θ are at 9.6, 10.7, and 11.3. Peak locations and intensities for the PXRD pattern in FIG. 3 are provided in Table 2.

TABLE 2

PXRD Peaks and Relative
Intensities of Form 1 of Compound A

| Degrees 2Θ ± 0.2° 2Θ | Relative Intensity (%) |
|---|---|
| 5.2 | 62 |
| 9.6 | 13 |
| 10.7 | 14 |
| 11.3 | 11 |
| 12.1 | 6 |
| 13.3 | 60 |
| 13.9 | 9 |
| 14.0 | 10 |
| 15.5 | 11 |
| 16.2 | 58 |
| 17.0 | 27 |
| 17.8 | 86 |
| 18.9 | 100 |
| 19.5 | 77 |
| 20.1 | 11 |
| 21.1 | 29 |
| 22.2 | 15 |
| 22.4 | 19 |
| 22.6 | 21 |
| 23.6 | 53 |
| 24.1 | 54 |
| 24.5 | 16 |
| 25.4 | 25 |
| 26.4 | 9 |
| 26.6 | 11 |
| 27.2 | 9 |
| 28.3 | 9 |
| 29.3 | 10 |
| 29.9 | 9 |
| 30.4 | 13 |
| 31.7 | 13 |
| 33.4 | 15 |

Figure 4:
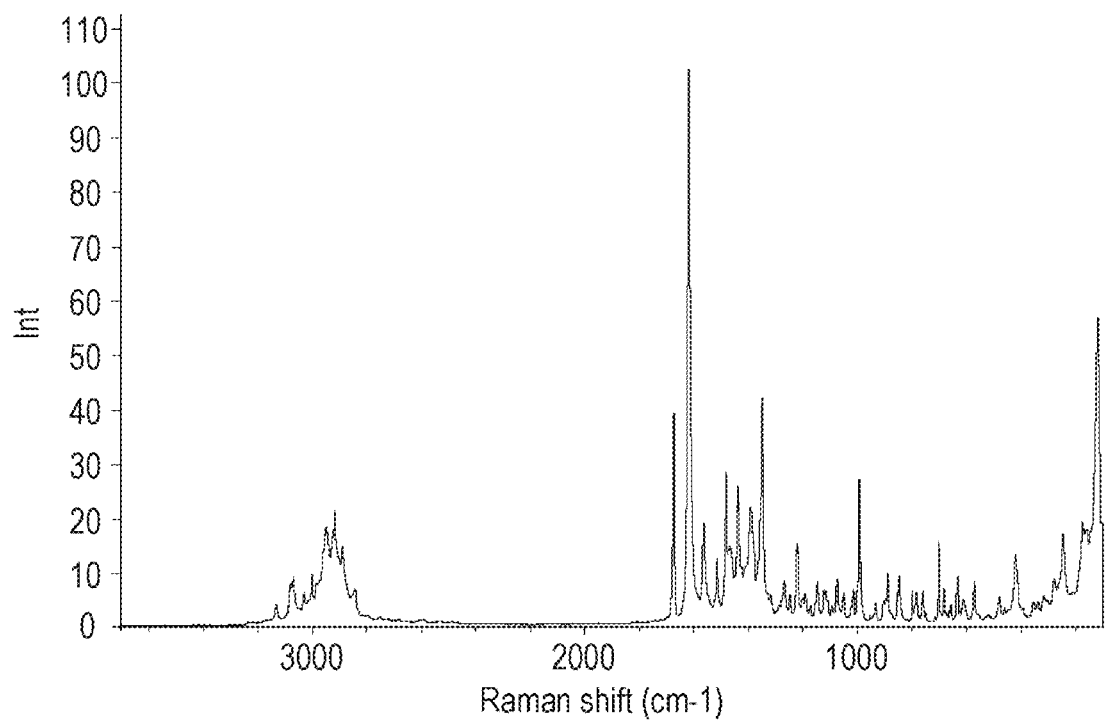
FIG. 4 shows an illustrative Raman spectra of Form 1 of Example 2 (Compound A) collected using a Nicolet NXR FT-Raman accessory attached to the FT-IR bench.

Form 1 of Compound A has a Raman spectrum substantially the same as that shown in FIG. 4. Form 1 of Compound A has characteristic Raman peak shifts, expressed as cm$^{-1}$, at 568, 698, 989, 1218, 1511, 1561, and 1615, +2 cm$^{-1}$. Peak positions (±2 cm$^{-1}$) and normalized intensity (W=weak, M=medium, S=strong) of Form 1 of Compound A in FIG. 4 are listed in Table 3.

TABLE 3

Raman Peaks and Normalized
Intensity of Form 1 of Compound A

| Raman Peak Position (cm$^{-1}$) | Normalized Intensity |
|---|---|
| 115 | M |
| 156 | W |
| 170 | W |
| 241 | W |
| 274 | W |
| 311 | W |
| 334 | W |
| 350 | W |
| 417 | W |
| 456 | W |
| 476 | W |
| 568 | W |
| 608 | W |
| 628 | W |
| 653 | W |
| 678 | W |
| 698 | W |
| 755 | W |
| 779 | W |
| 794 | W |
| 842 | W |
| 885 | W |
| 929 | W |
| 989 | W |
| 1011 | W |
| 1047 | W |
| 1071 | W |
| 1090 | W |
| 1119 | W |
| 1143 | W |
| 1169 | W |
| 1187 | W |
| 1196 | W |
| 1218 | W |
| 1244 | W |
| 1265 | W |
| 1315 | W |
| 1345 | M |
| 1363 | W |
| 1388 | W |
| 1435 | W |
| 1466 | W |
| 1478 | W |
| 1511 | W |
| 1561 | W |
| 1615 | S |
| 1671 | M |
| 2840 | W |
| 2885 | W |
| 2914 | W |
| 2945 | W |
| 2998 | W |
| 3027 | W |
| 3066 | W |
| 3129 | W |

Figure 5:
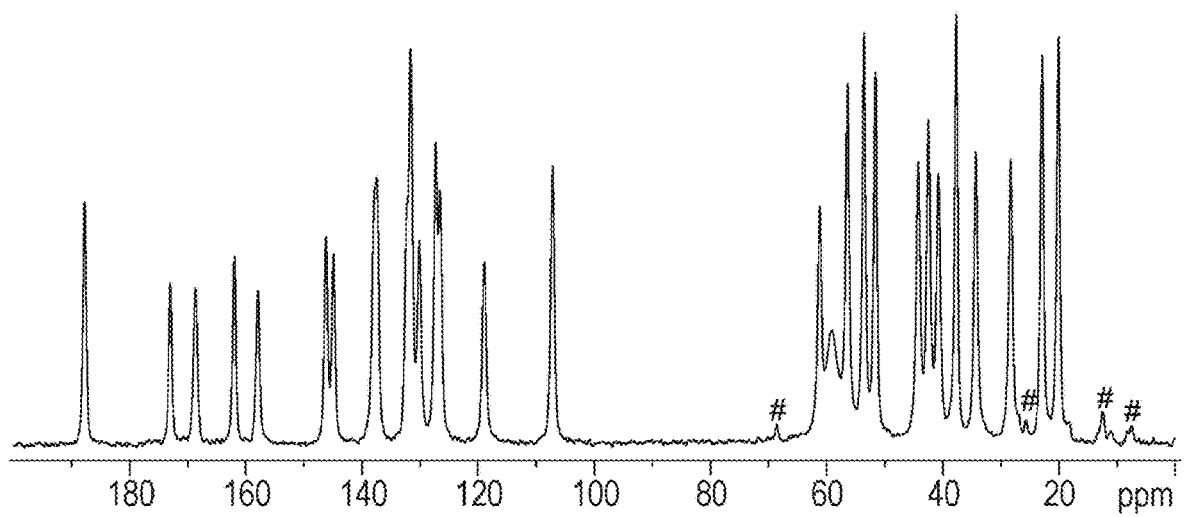
FIG. 5 shows an illustrative $^{13}C$ ssNMR pattern of Form 1 of Example 2 (Compound A) conducted on a Bruker-BioSpin CPMAS probe positioned into a Bruker-BioSpin Avance III 500 MHz ($^{1}H$ frequency) NMR spectrometer.

Form 1 of Compound A has a $^{13}$C ssNMR spectrum substantially the same as that shown in FIG. 5. Form 1 of Compound A has characteristic $^{13}$C ssNMR chemical shifts, expressed as ppm, at 22.9, 146.2, 157.9, 161.9, and 172.9, ±0.2 ppm. $^{13}$C chemical shifts (±0.2 ppm) of Form 1 of Compound A as shown in FIG. 5 are listed in Table 4.

TABLE 4

$^{13}$C chemical shifts and
Intensity of Form 1 of Compound A

| $^{13}$C chemical shifts (ppm) | Intensity |
|---|---|
| 20.1 | 95 |
| 22.9 | 90 |
| 28.4 | 66 |
| 34.3 | 68 |
| 37.7 | 100 |
| 40.8 | 63 |
| 42.5 | 76 |
| 44.3 | 66 |
| 51.6 | 87 |
| 53.6 | 96 |
| 56.4 | 84 |
| 59.1 | 27 |
| 61.2 | 55 |
| 107.1 | 65 |
| 118.9 | 42 |
| 126.6 | 59 |
| 127.3 | 70 |
| 130.2 | 47 |
| 131.7 | 92 |
| 132.3 | 56 |
| 137.5 | 62 |
| 137.9 | 59 |
| 144.9 | 44 |
| 146.2 | 48 |
| 157.9 | 36 |
| 161.9 | 44 |

TABLE 4-continued $^{13}$C chemical shifts and Intensity of Form 1 of Compound A

| $^{13}$C chemical shifts (ppm) | Intensity |
|---|---|
| 168.6 | 36 |
| 172.9 | 38 |
| 187.7 | 56 |

Figure 6:
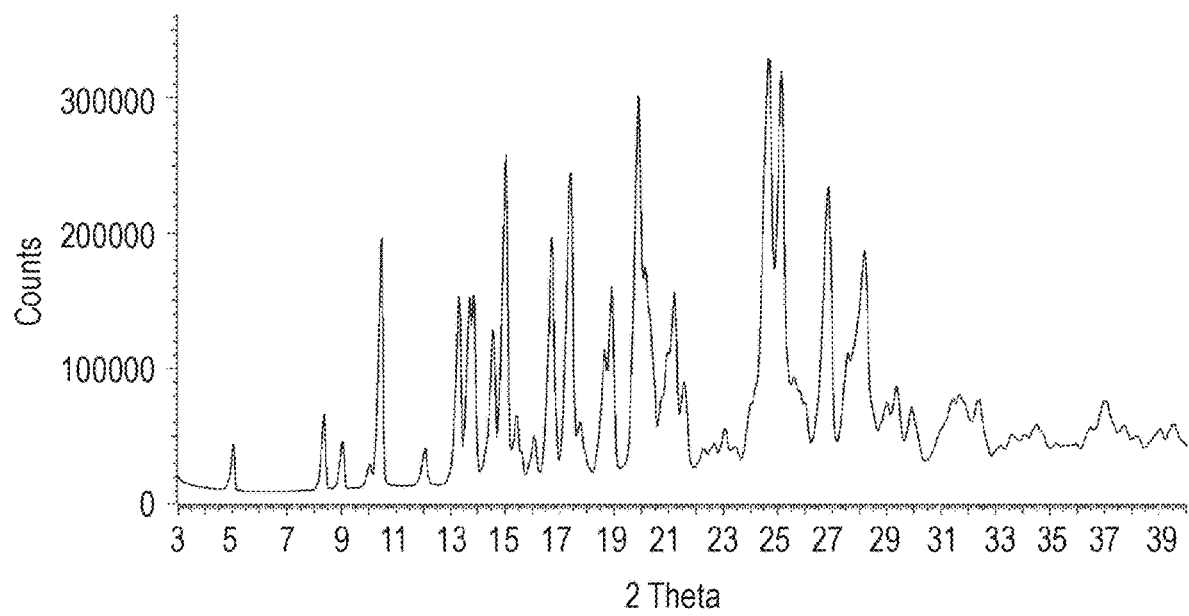
FIG. 6 shows an illustrative PXRD pattern of Form 2 of Example 2 (Compound A) carried out on a Bruker AXS D4 Endeavor diffractometer equipped with a Cu radiation source.

Form 2 of Compound A is a trihydrate and is thermodynamically stable above a water activity of about 0.2 at ambient temperature and 20% RH. Form 2 of Compound A has a PXRD pattern substantially the same as that shown in FIG. 6. Characteristic PXRD peaks of Form 2 of Compound A, expressed as 2Θ±0.2° 2Θ are at 8.4, 9.0, 10.5, 15.0, and 24.7. Peak locations and intensities for the PXRD pattern in FIG. 6 are provided in Table 5.

TABLE 5

PXRD Peaks and Relative Intensities of Form 2 of Compound A

| Degrees 2Θ ± 0.2° 2Θ | Relative Intensity (%) |
|---|---|
| 5.0 | 11 |
| 8.4 | 18 |
| 9.0 | 12 |
| 10.0 | 6 |
| 10.5 | 62 |
| 12.1 | 9 |
| 13.3 | 46 |
| 13.7 | 45 |
| 13.9 | 46 |
| 14.6 | 37 |
| 15.0 | 80 |
| 15.4 | 15 |
| 16.1 | 10 |
| 16.7 | 59 |
| 17.4 | 74 |
| 17.8 | 13 |
| 18.6 | 30 |
| 18.9 | 45 |
| 19.9 | 93 |
| 20.1 | 50 |
| 21.2 | 46 |
| 21.5 | 21 |
| 24.7 | 100 |
| 25.2 | 97 |
| 26.9 | 71 |
| 28.2 | 52 |
| 29.0 | 15 |
| 29.4 | 18 |
| 29.9 | 13 |
| 31.4 | 15 |
| 31.7 | 16 |
| 32.4 | 14 |
| 33.6 | 5 |
| 34.5 | 7 |
| 37.0 | 12 |

Figure 7:
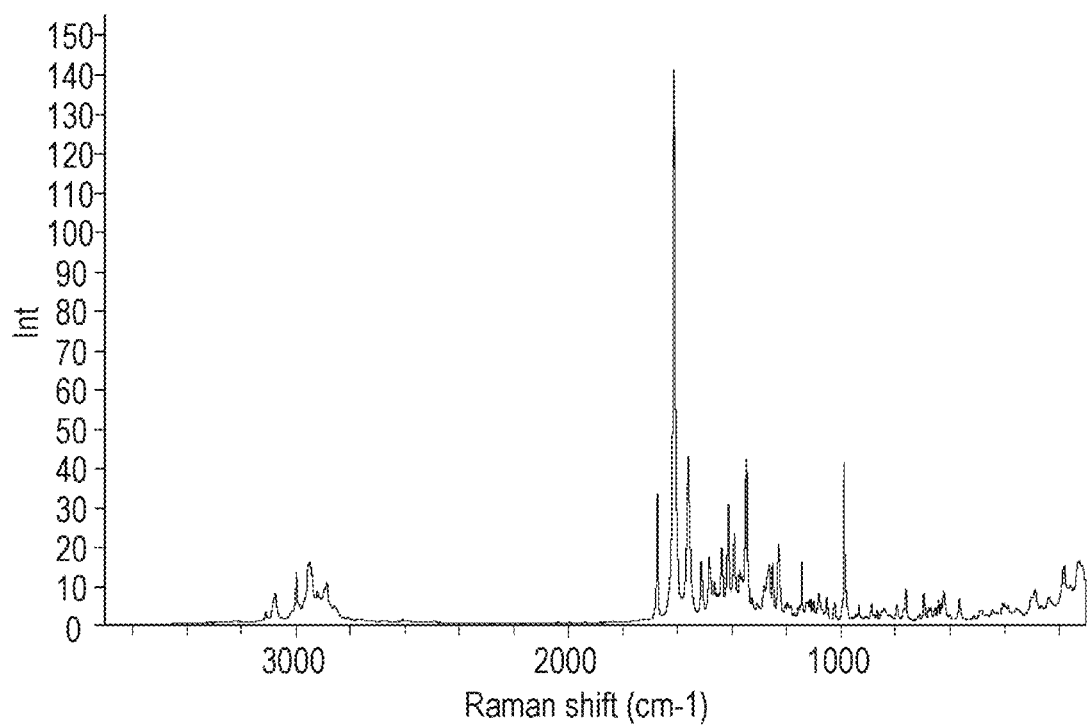
FIG. 7 shows an illustrative Raman spectra of Form 2 of Example 2 (Compound A) collected using a Nicolet NXR FT-Raman accessory attached to the FT-IR bench.

Form 2 of Compound A has a Raman spectrum substantially the same as that shown in FIG. 7. Form 2 of Compound A has characteristic Raman peak shift, expressed as cm$^{-1}$, at 562, 692, 984, 1225, 1507, 1557, and 1610±2 cm$^{-1}$. Peak positions (±2 cm$^{-1}$) and normalized intensity (W=weak, M=medium, S=strong) of Form 2 of Compound A in FIG. 7 are listed in Table 6.

TABLE 6

Raman Peaks and Normalized Intensity of Form 2 of Compound A

| Raman Peak Position (cm$^{-1}$) | Normalized Intensity |
|---|---|
| 123 | W |
| 179 | W |
| 232 | W |
| 284 | W |
| 405 | W |
| 441 | W |
| 481 | W |
| 562 | W |
| 620 | W |
| 628 | W |
| 639 | W |
| 650 | W |
| 667 | W |
| 692 | W |
| 710 | W |
| 758 | W |
| 790 | W |
| 839 | W |
| 864 | W |
| 884 | W |
| 931 | W |
| 984 | W |
| 1019 | W |
| 1048 | W |
| 1077 | W |
| 1097 | W |
| 1109 | W |
| 1118 | W |
| 1140 | W |
| 1194 | W |
| 1225 | W |
| 1246 | W |
| 1261 | W |
| 1277 | W |
| 1305 | W |
| 1321 | W |
| 1344 | W |
| 1369 | W |
| 1387 | W |
| 1410 | W |
| 1433 | W |
| 1460 | W |
| 1480 | W |
| 1507 | W |
| 1557 | M |
| 1610 | S |
| 1670 | W |
| 2884 | W |
| 2916 | W |
| 2946 | W |
| 2995 | W |
| 3073 | W |
| 3108 | W |

Figure 8:
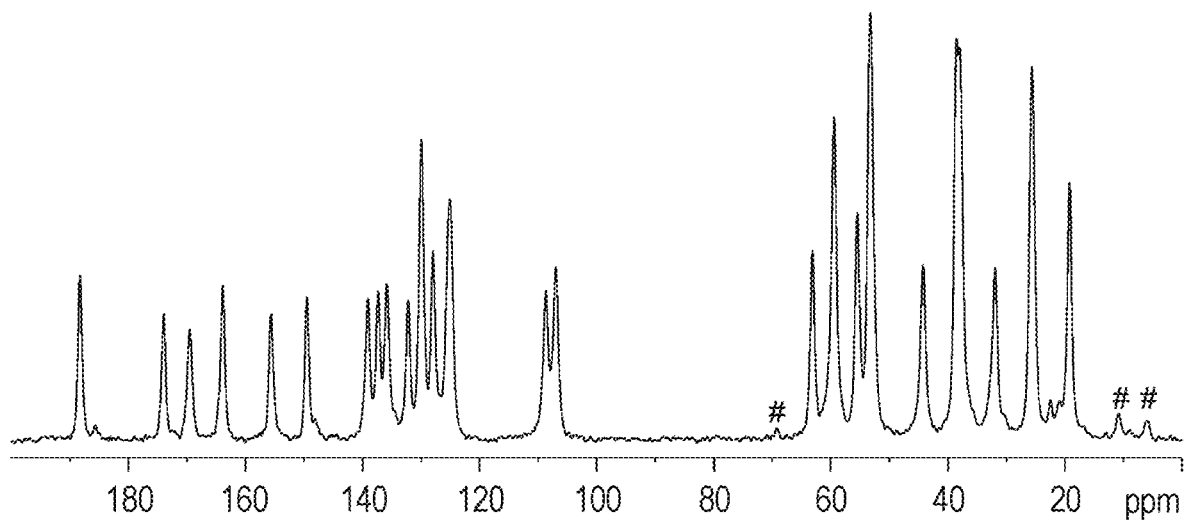
FIG. 8 shows an illustrative $^{13}C$ ssNMR pattern of Form 2 of Example 2 (Compound A) conducted on a Bruker-BioSpin CPMAS probe positioned into a Bruker-BioSpin Avance III 500 MHz ($^{1}H$ frequency) NMR spectrometer.

Form 2 of Compound A has a $^{13}$C ssNMR spectrum substantially the same as that shown in FIG. 8. Form 2 of Compound A has characteristic $^{13}$C ssNMR chemical shifts, expressed as ppm, at 19.2, 149.5, 155.6, 163.8, and 188.3, ±0.2 ppm. $^{13}$C chemical shifts (±0.2 ppm) of Form 2 of Compound A as shown in FIG. 8 are listed in Table 7.

TABLE 7

$^{13}$C chemical shifts and Intensity of Form 2 of Compound A

| $^{13}$C chemical shifts (ppm) | Intensity |
|---|---|
| 19.2 | 60 |
| 25.7 | 87 |
| 32.0 | 40 |
| 38.0 | 92 |

TABLE 7-continued

<sup>13</sup>C chemical shifts and Intensity of Form 2 of Compound A

| $^{13}$C chemical shifts (ppm) | Intensity |
|---|---|
| 38.5 | 94 |
| 44.2 | 41 |
| 53.2 | 100 |
| 55.5 | 53 |
| 59.4 | 76 |
| 63.1 | 44 |
| 107.0 | 40 |
| 108.7 | 35 |
| 125.1 | 56 |
| 128.0 | 44 |
| 130.0 | 70 |
| 132.3 | 33 |
| 135.9 | 37 |
| 137.4 | 35 |
| 139.1 | 33 |
| 149.5 | 33 |
| 155.6 | 30 |
| 163.8 | 36 |
| 169.5 | 26 |
| 174.0 | 29 |
| 188.3 | 39 |

Based on the disclosure provided herein, one of ordinary skill in the art would appreciate that each Form 1 and Form 2 of Compound A can be uniquely identified by several different spectral peaks or patterns in varying combinations. Described below are exemplary combinations of characteristic peak values that can be used to separately identify Form 1 and Form 2 of Compound A but in no way should these exemplary combinations be viewed as limiting other peak value combinations disclosed herein.

Figure 9:
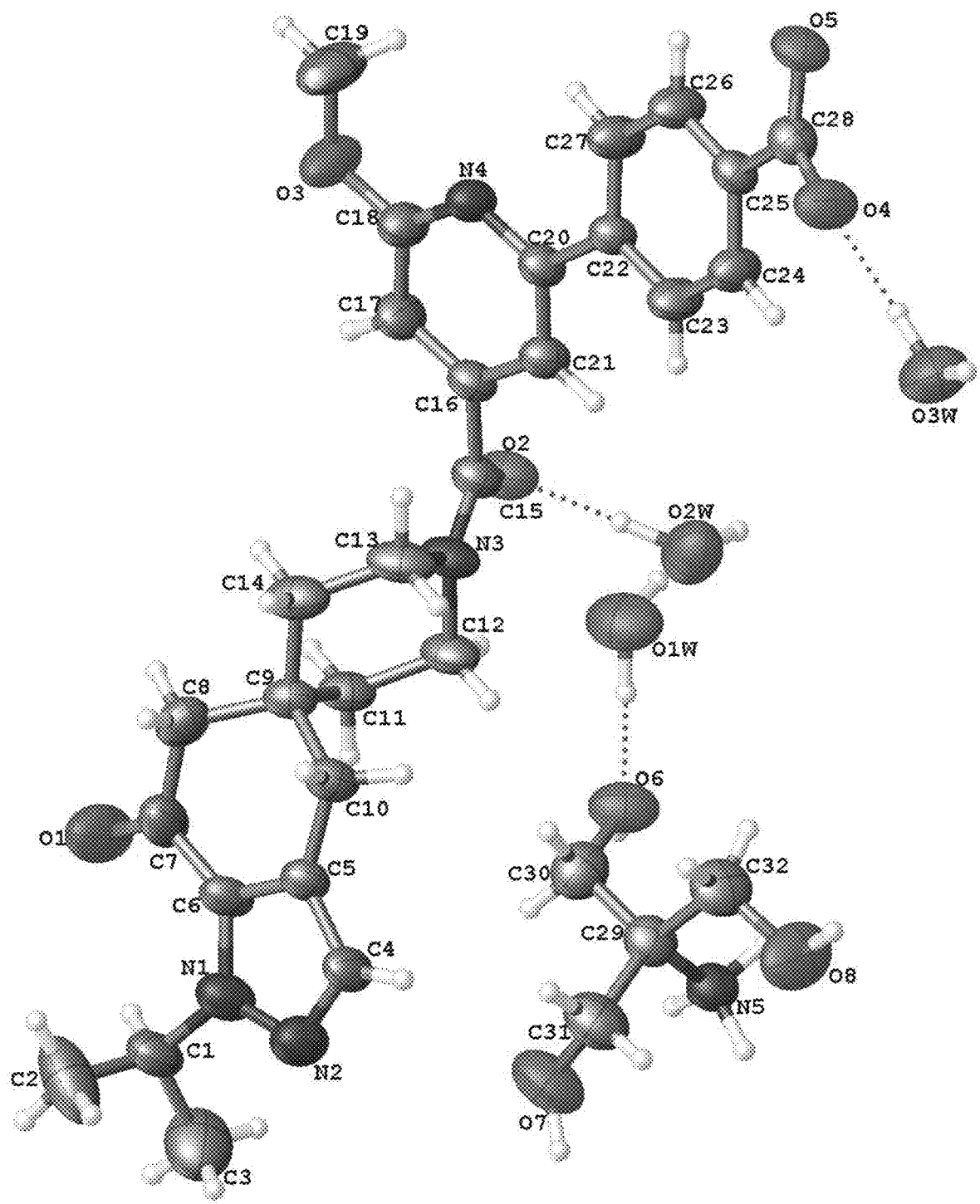
FIG. 9 shows an illustrative single crystal structure of Form 2 of Example 2 (Compound A).

To confirm the presence of three water molecules in Form 2 of Compound A, data was collected using a Bruker D8 Venture diffractometer at room temperature. See FIG. 9. The structure was solved by intrinsic phasing using SHELX software suite in the Monoclinic class space group P2$_1$/c (Version 5.1, Bruker AXS, 1997). The structure was subsequently refined by the full-matrix least squares method. All non-hydrogen atoms were found and refined using anisotropic displacement parameters.

The hydrogen atoms located on nitrogen and oxygen were found from the Fourier difference map and refined with distances restrained. The remaining hydrogen atoms were placed in calculated positions and were allowed to ride on their carrier atoms.

The final R-index was 7.2%. A final difference Fourier revealed no missing or misplaced electron density.

Table 8 provides data collected with regard to Form 2 of Compound A:

TABLE 8

| Empirical formula | C$_{28}$H$_{30}$N$_4$O$_5$•C$_4$H$_{11}$NO$_3$•3H$_2$O |
|---|---|
| Formula weight | 677.74 |
| Temperature | RT |
| Wavelength | 1.54178 Å |
| Crystal system | Monoclinic |
| Space group | P2$_1$/c |
| Unit cell dimensions | a = 17.6927(9) Å  α = 90°. |
| | b = 13.2753(7) Å  β = 92.451 (3)°. |
| | c = 14.6480(8) Å  α = 90°. |
| Volume | 3437.3(3) Å$^3$ |
| Z | 4 |

TABLE 8-continued

| Density (calculated) | 1.310 Mg/m$^3$ |
|---|---|
| Goodness-of-fit on F$^2$ | 1.053 |
| Final R indices [I > 2sigma(I)] | R1 = 0.0723, wR2 = 0.1835 |
| R indices (all data) | R1 = 0.1244, wR2 = 0.2110 |

A crystalline 2-amino-2-(hydroxymethyl)propane-1,3-diol salt of is 4-(4-(1-isopropyl-7-oxo-1,4,6,7-tetrahydrospiro[indazole-5,4'-piperidine]-1'-carbonyl)-6-methoxy-pyridin-2-yl)benzoic acid. This crystalline salt is generally referred to as the tris salt of Compound A.

The crystalline tris salt of Compound A, wherein the ratio of 4-(4-(1-isopropyl-7-oxo-1,4,6,7-tetrahydrospiro[indazole-5,4'-piperidine]-1'-carbonyl)-6-methoxypyridin-2-yl) benzoic acid and the salt is 1:1.

The crystalline tris salt of Compound A, wherein the crystalline salt is an anhydrous crystalline salt.

The anhydrous crystalline tris salt of Compound A, wherein said anhydrous crystalline salt has a PXRD pattern comprising peaks at diffraction angles of 9.6, 10.7, and 11.3 2Θ, ±0.2°2Θ.

The anhydrous crystalline tris salt of Compound A, wherein said anhydrous crystalline salt has a Raman spectrum comprising peak shifts at 1511, 1561, and 1615 cm$^{-1}$, ±2 cm$^{-1}$.

The anhydrous crystalline tris salt of Compound A, wherein said anhydrous crystalline salt has a $^{13}$C ssNMR spectrum comprising chemical shifts at 22.9, 146.2, and 161.9 ppm, ±0.2 ppm.

The anhydrous crystalline tris salt of Compound A, wherein said anhydrous crystalline salt has an analytical parameter selected from the group consisting of a Raman spectrum comprising peak shifts at 1511 and 1615 cm$^{-1}$, ±2 cm$^{-1}$, and a $^{13}$C ssNMR spectrum comprising at least one chemical shift at 22.9, 146.2, or 161.9 ppm, ±0.2 ppm.

The anhydrous crystalline tris salt of Compound A, where said anhydrous crystalline salt is substantially pure.

The crystalline tris salt of Compound A, wherein the crystalline salt is a trihydrate crystalline salt.

The trihydrate crystalline tris salt of Compound A, wherein said trihydrate crystalline salt has a PXRD pattern comprising peaks at diffraction angles of 8.4, 9.0, and 10.5 2Θ, ±0.2° 2Θ.

The trihydrate crystalline tris salt of Compound A, wherein said trihydrate crystalline salt has a Raman spectrum comprising peak shifts at 1507, 1557, and 1610 cm$^{-1}$, ±2 cm$^{-1}$.

The trihydrate crystalline tris salt of Compound A, wherein said trihydrate crystalline salt has a $^{13}$C ssNMR spectrum comprising chemical shifts at 19.2, 149.5, and 163.8 ppm, ±0.2 ppm.

The trihydrate crystalline tris salt of Compound A, wherein said trihydrate crystalline salt has an analytical parameter selected from the group consisting of
 a PXRD pattern comprising peaks at diffraction angles of 8.4 and 9.0 2Θ, ±0.2° 2Θ,
 a Raman spectrum comprising peak shifts at 1557 and 1610 cm$^{-1}$, ±2 cm$^{-1}$, and
 a $^{13}$C ssNMR spectrum comprising at least one chemical shift at 19.2, 149.5, or 163.8 ppm, ±0.2 ppm.

The trihydrate crystalline tris salt of Compound A, wherein said trihydrate crystalline salt has an analytical parameter selected from the group consisting of a PXRD pattern comprising peaks at diffraction angles of 8.4 and 9.0 2Θ, ±0.2Θ 2Θ, and a Raman spectrum comprising at least one peak shift at 1507, 1557, or 1610 cm$^{-1}$, ±2 cm$^{-1}$.

The trihydrate crystalline tris salt of Compound A, wherein said trihydrate crystalline salt has an analytical parameter selected from the group consisting of a PXRD pattern comprising peaks at diffraction angles of 8.4 and 9.0 2Θ, 0.2° 2Θ, and a $^{13}$C ssNMR spectrum comprising at least one chemical shift at 19.2, 149.5, or 163.8 ppm, ±0.2 ppm.

Pharmacological Data

The following protocols may of course be varied by those skilled in the art.

A randomized, vehicle-controlled, 8-parallel arm study was conducted in male Sprague-Dawley rats (Charles River (Boston, MA)) to obtain circulating and hepatic TG levels. Standard laboratory conditions were used to house 96 rats (~200 g); they were double housed and kept under 12:12-hour reverse light-dark schedule (lights off at 8:00 AM). Rats were randomized into chow or Western diet groups and dose groups upon arrival and were given a 14-day lead-in period on either standard rat chow or Western diet prior to the start of the study. Standard Laboratory Rodent chow diet, 5053, was from LabDiet (PMI, St Louis, Missouri). Western Diet, D12079Bi, was from Research Diets (New Brunswick, NJ).

For these studies, vehicle was prepared to make a 0.5% (wt/volume) of methyl cellulose (MC, Sigma Aldrich; 274429) in deionized water. The stock solutions with either Compound A (prepared from the tris salt) or Compound D were prepared with the respective compound to provide a concentration such that 10 ml of the solution would deliver the desired mg/kg dosage amount, where the average weight of the rats used was about 200 g.

Starting on Day 1 of the study, rats were dosed orally (10 mL/kg) with either vehicle control (0.5% MC (wt/volume %) in dionized water), low or high doses of Compound A (1 mg/kg or 10 mg/kg QD, respectively), low or high doses of Compound D (5 mg/kg or 30 mg/kg BID respectively), or co-administration of low doses (Compound A at 1 mg/kg QD and Compound D at 5 mg/kg BID), or co-administration of high doses (Compound A at 10 mg/kg QD and Compound D at 30 mg/kg BID)

Fed plasma analytes: Blood for determining fed plasma TG concentrations was collected 2 hours post dose (2 hours into the dark cycle) via lateral tail vein, transferred to BD Microtainer tubes coated with dipotassium ethylenediaminetetraacetic acid ($K_2$EDTA) (PN365974), and centrifuged at 4° C. The resulting plasma samples were then analyzed on a Siemens Chemistry XPT clinical analyzer (Malven, PA) using Siemens triglycerides_2 assay reagents (ref 10335892).

Fasted plasma analytes: Blood for determining fasted plasma TG was collected after a 4 hour fast, 2 hours post-dose (2 hours into the dark cycle) via lateral tail vein, transferred to BD Microtainer tubes coated with $K_2$EDTA (PN365974), and centrifuged at 4° C. The resulting plasma samples were then analyzed on a Siemens Chemistry XPT clinical analyzer (Malven, PA) using Siemens triglycerides 2 assay reagents (ref 10335892).

On the last day of the study (Day 28), rats were sacrificed for tissue collection after a 4 hour fast, 2 hours post-dose: two hours post-dose, blood for determining plasma analytes was collected via lateral tail vein and then the animals were sacrificed by $CO_2$ asphyxiation. Blood was transferred to BD Microtainer tubes coated with $K_2$EDTA (PN365974), centrifuged at 4° C. and the plasma transferred to a 96-well microtitre plate and stored at −20° C. Livers were rapidly removed, freeze-clamped in a Wollenberg clamp pre-cooled in liquid $N_2$ individually wrapped in aluminum foil and subsequently stored at −80° C.

Tissue pulverization: Frozen livers were rapidly pulverized on an aluminum block cooled in liquid $N_2$, ensuring the tissue remained frozen throughout the pulverization. The pulverized tissues were transferred and stored in 7 mL polypropylene conical tubes at −80° C. until analysis.

Extraction for hepatic triglyceride: Approximately 50 to 100 mg of pulverized tissue was added to a 2 mL lysing matrix D tube (MP Bio) containing 800 µL ice cold 1:1 $CHCl_3$:MEOH. Samples were immediately extracted at 4° C. using Qiagen Tissue Lyser II (Qiagen Cat No. 85300) for 4 minutes at 30 Hz. The homogenate was then transferred to 13×100 mm glass tubes and placed on ice. The lysis tubes were then rinsed with 800 µL of 1:1 $CHCl_3$:MeOH, vortexed for 30 seconds and added to the 13×100 mm glass tubes. While on ice, 2.4 ml of 100% $CHCl_3$ was added to all glass vials to bring the ratio of $CHCl_3$:MeOH to 4:2. Samples were then placed in the −20° C. freezer overnight. On the following day, 1.75 mL 1M KCl $H_2O$ was added to bring the ratio to 4:2:1.75 ratio $CHCl_3$:MeOH:$H_2O$. Samples were then vortexed for 30 seconds and centrifuged at 1500 rpm×15 min., at 4° C. After centrifugation, the organic phase was transferred to a fresh 13×100 mm extraction tube, dried down at 37° C. under $N_2$ and re-suspended in 750 µL $CHCl_3$. Aminopropyl solid phase extraction (SPE) cartridges (Waters Cat No. 054560, 6 mL, 500 mg) were wetted and washed with 5 mL hexane. After the wash, 200 µL of sample extract in $CHCl_3$ was applied to the cartridge and removed by vacuum without drying the column. The neutral lipids were then eluted with 5 ml 2:1 $CHCl_3$: isopropanol/50 µM butylated hydroxytoluene. Samples were then dried down at 37° C. under $N_2$ and re-suspended with 1.75 ml of 98:2 Isooctane:Isopropanol. Samples were filtered through 0.2 µM syringe filter, before injection onto an HPLC Cyanopropy column (3.5 µM particle size-4.6×150 mm column Agilent Zorbax Eclipse XBD-CN). Running method was a 4 µL injection with a 27 minutes run time using solvent A (1000:1:2, isooctane:isopropanol:acetic acid) and solvent B (50:50 isopropanol:methyl tert-butyl ether). From minute 0-3, solvent composition was held at 100% solvent A. From minute 3-8, solvent composition was changed from 100% solvent A to 95% solvent A and 5% solvent B. From minute 8-18, solvent composition was changed to a 50:50 ratio. From minute 18-19, solvent composition was changed back to 100% solvent A and held at that composition from minutes 19-27.

Nuclear and Membrane fractions were prepared by ultracentrifugation using standard methods from a portion of the pulverized liver samples, that were pooled per treatment group. Samples from the nuclear extract and the membrane fractions were analyzed by Western blotting for SREBP1. Western blots for Calnexin was used as a marker for the membrane fraction, actin as a marker for total sample loading, and Histone 2B as a marker for the nuclear fraction. Nuclear SREBP1 levels were quantified using relative units and normalized to Histone 2B to control for sample loss during the nuclear fractionation and gel loading.

Another portion of the pulverized liver was processed and analyzed for lipogenic gene expression. Rat taqman probes against ACC1, FASN, SCD1, PCSK9 and SREBP-1c were all assessed using Actb as housekeeping gene on qPCR.

Administration of (S)-2-(5-((3-ethoxypyridin-2-yl)oxy) pyridin-3-yl)-N-(tetrahydrofuran-3-yl)pyrimidine-5-carboxamide (Compound D), or pharmaceutically acceptable salt thereof, in combination with 4-(4-(1-isopropyl-7-oxo-1,4,6, 7-tetrahydrospiro[indazole-5,4'-piperidine]-1'-carbonyl)-6- methoxypyridin-2-yl)benzoic acid (Compound A), or pharmaceutically acceptable salt thereof, has resulted in significantly decreased plasma (FIG. 10, 11) and liver TG (FIG. 18) levels compared to the plasma and liver TG levels when administering with Compound A as monotherapy.

Figure 10:
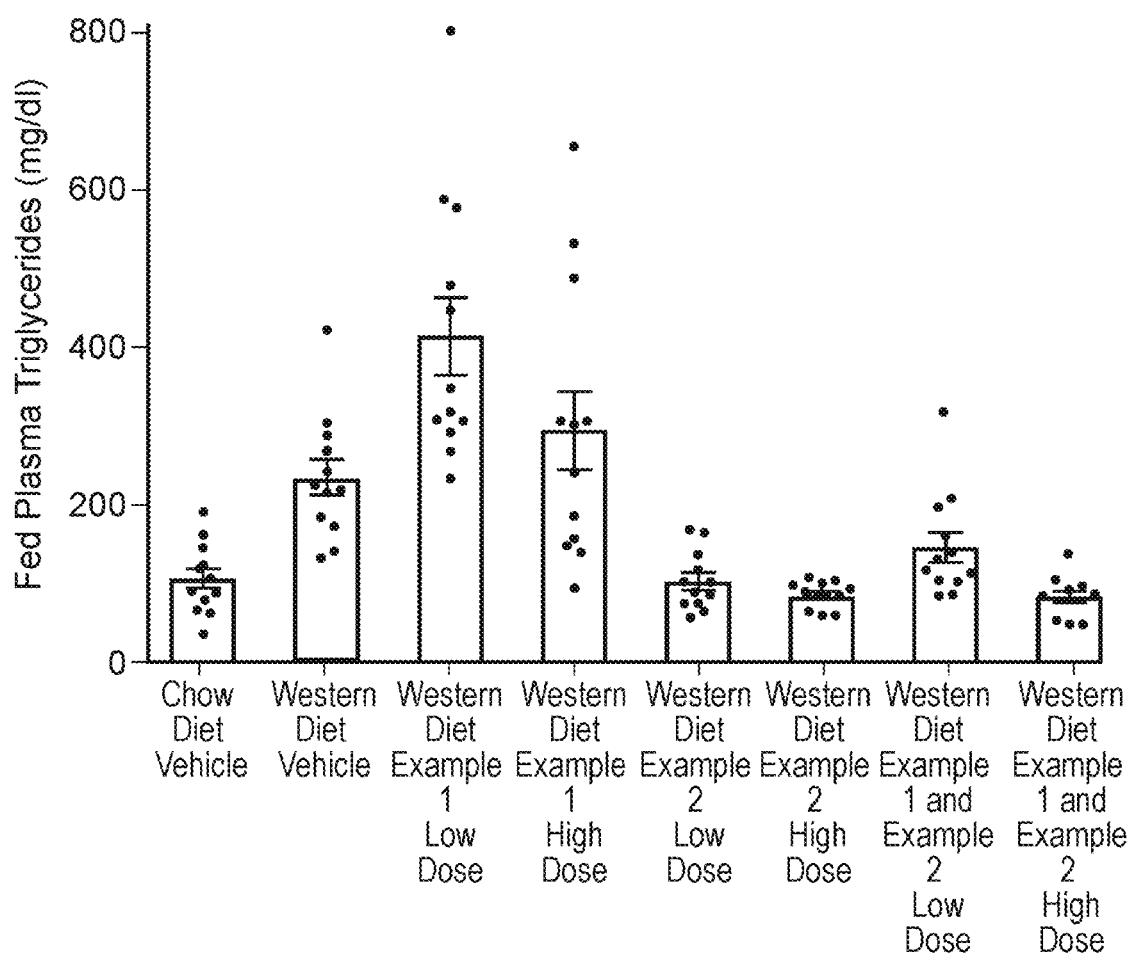
FIG. 10 summarizes the effects of oral administration as monotherapy and in combination of Compound A and Compound D on plasma triglyceride levels in Western diet fed Sprague Dawley rats, measured at the fed state.

Western diet feeding resulted in a 2.2 fold increase in fed-state plasma TG, relative to chow fed rats (FIG. 10). Oral administration of either the low dose (1 mg/kg QD) or the high dose (10 mg/kg QD) of only Compound A (monotherapy) resulted in a 1.7 fold and 1.3 fold increase, respectively, in plasma TG in the fed state, relative to vehicle-administered Western diet fed rats. Conversely, oral administration of either the low dose (5 mg/kg BID) or the high dose (30 mg/kg BID) of only Compound D (monotherapy) reduced plasma TG in the fed state by 55% and 63%, respectively, relative to vehicle-administered Western diet fed rats. Co-administration of Compound A and Compound D resulted in complete blockade of the Compound A mediated increases plasma TG in the fed state. Oral co-administration of Compound A and Compound D at either both at the low dose or both at the high dose reduced fed-state plasma TG levels by 37% and 64%, relative to vehicle-administered Western diet fed rats.

Figure 11:
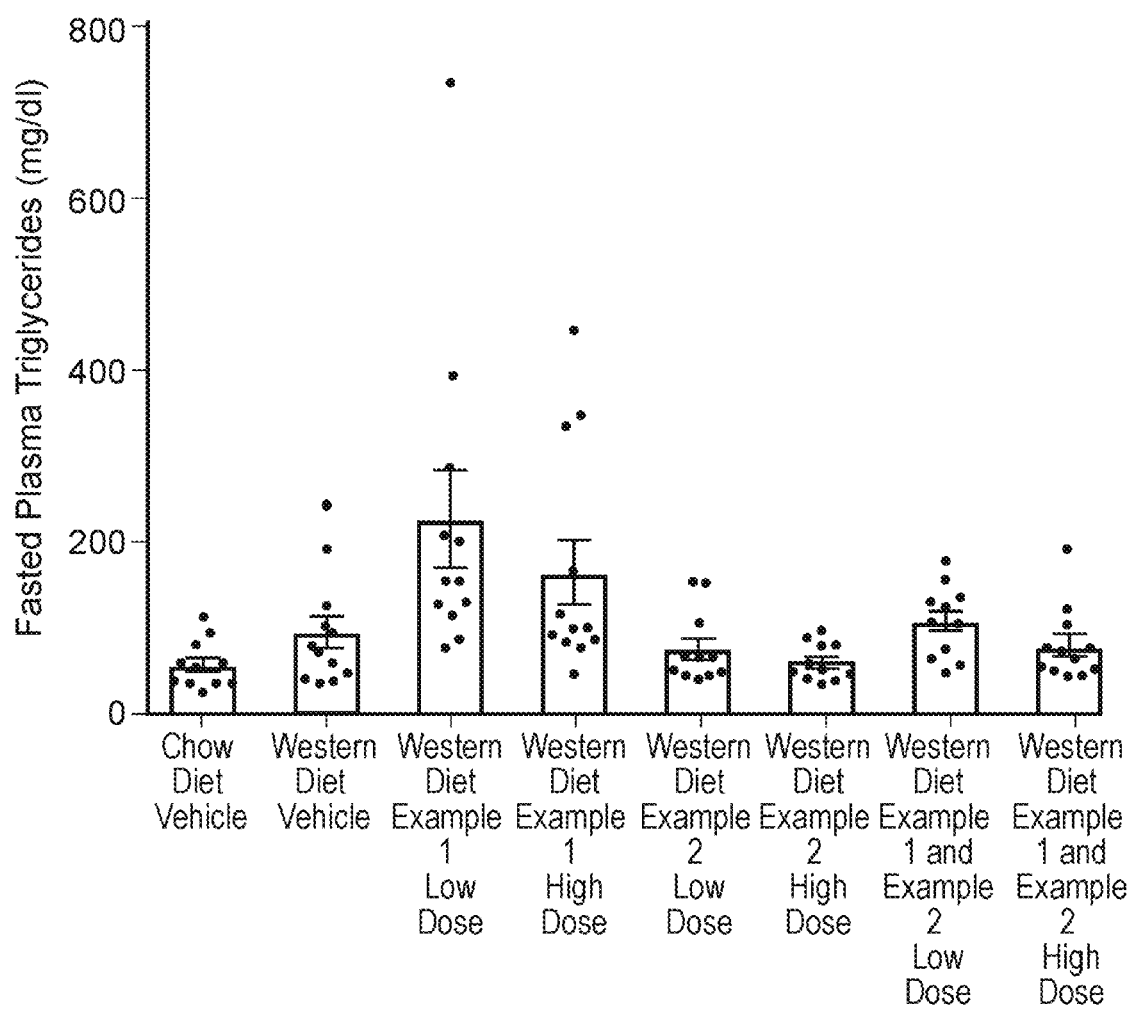
FIG. 11 summarizes the effects of oral administration as monotherapy and in combination Compound A and Compound D on plasma triglyceride levels in Western diet fed Sprague Dawley rats measured at the fasted state.

Western diet feeding resulted in a 1.6 fold increase in fasted plasma TG, relative to chow fed rats (FIG. 11). Oral administration of the low and high doses of Compound A as a monotherapy resulted in a 2.4 fold and 1.7 fold increase, respectively, in fasted plasma TG, relative to vehicle administered Western diet fed rats. Conversely, oral administration of the low and high doses of Compound D as a monotherapy reduced fasted plasma TG by 20% and 35%, respectively, relative to vehicle administered Western diet fed rats. Oral co-administration of Compound A and Compound D at both the low dose of each or the high dose of each fully mitigated the Compound A mediated increase in fasted plasma TG observed when administering only Compound A. Fasted plasma TG levels for both the low dose group (109 mg/dl) and high dose group (81 mg/dl) of the co-administered Compound A and Compound D were similar to vehicle administered Western diet fed rats (96 mg/dl).

Nuclear SREBP-1 localization was compared in samples from Western diet fed rats administered vehicle, high dose Compound A monotherapy, high dose Compound D monotherapy, or co-administered high dose Compound A and high dose Compound D (FIG. 12). Relative to vehicle treated Western diet fed rats, administration of Compound A produced increased nuclear localization of SREBP-1 indicative of increased SREBP-1 activation. Conversely, administration of Compound D reduced SREBP-1 nuclear localization and SREBP-1 activation. Co-administration of Compound A and Compound D blocked the Compound A mediated increase in nuclear SREBP-1 localization producing a 50% decrease compared with monotherapy of only Compound A.

Figure 13:
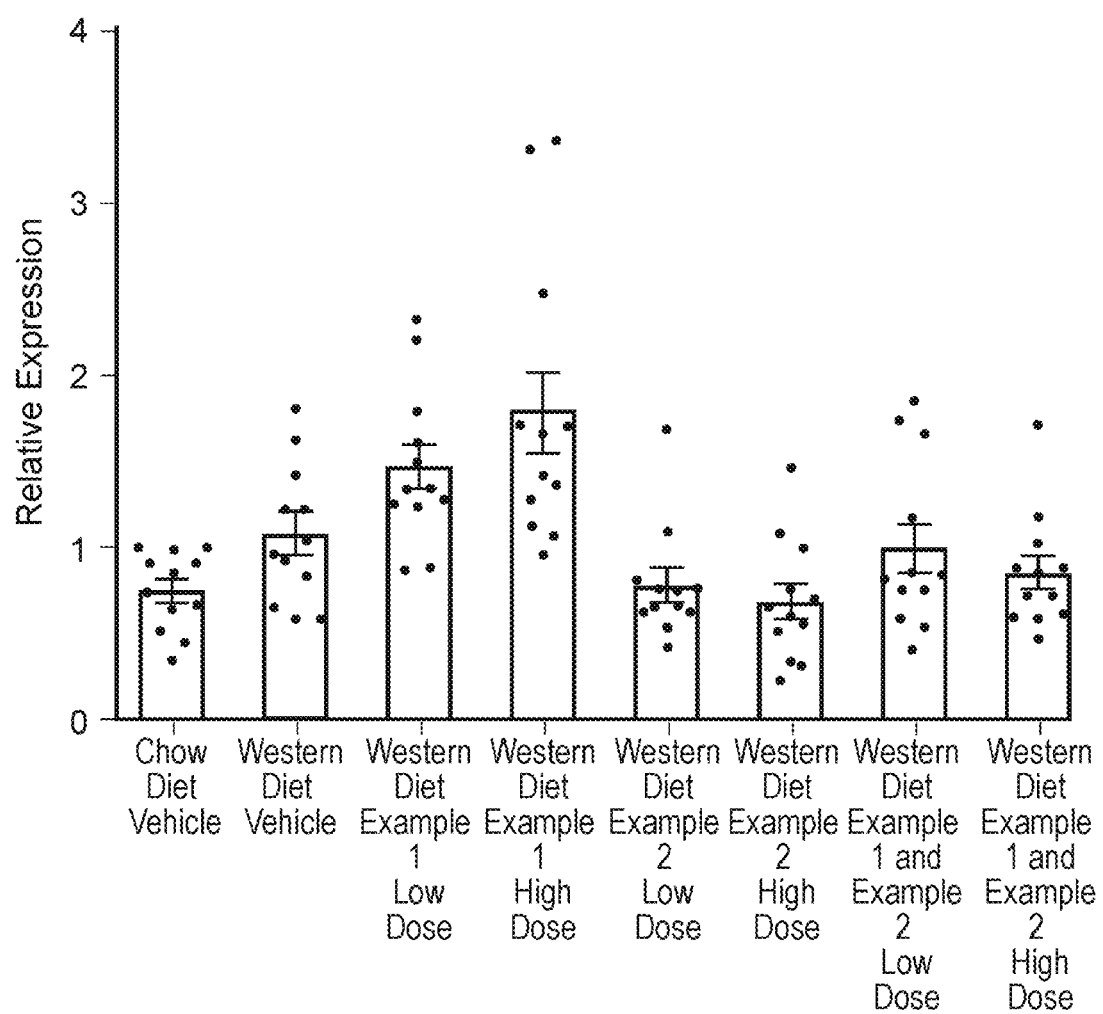
FIG. 13 summarizes the effect of administration of Compound A and Compound D as monotherapy and in combination on hepatic lipogenic gene expression in Western diet fed rats, specifically acetyl-CoA carboxylase (ACC1).
Figure 14:
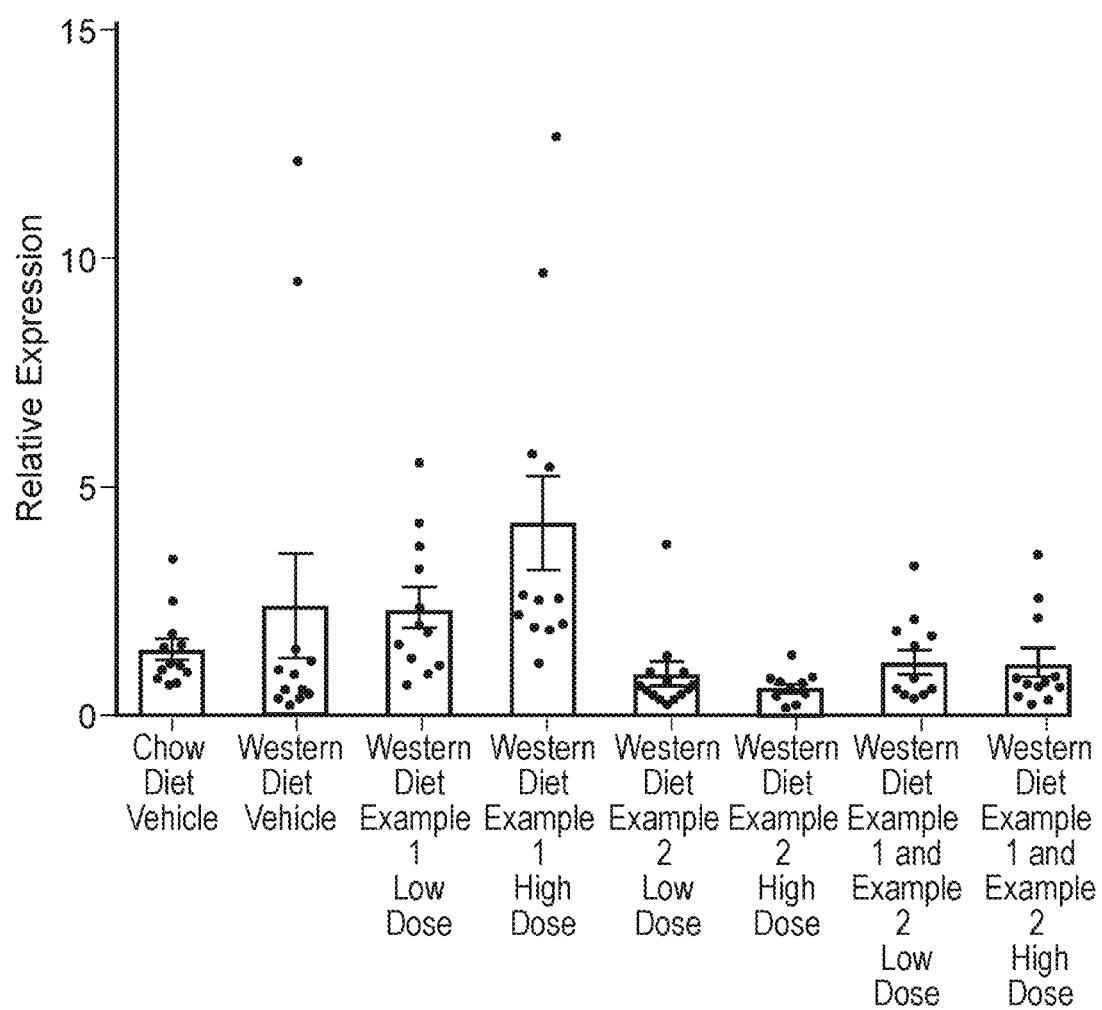
FIG. 14 summarizes the effect of administration of Compound A and Compound D as monotherapy and in combination on hepatic lipogenic gene expression in Western diet fed rats, specifically fatty acid synthase (FASN).
Figure 15:
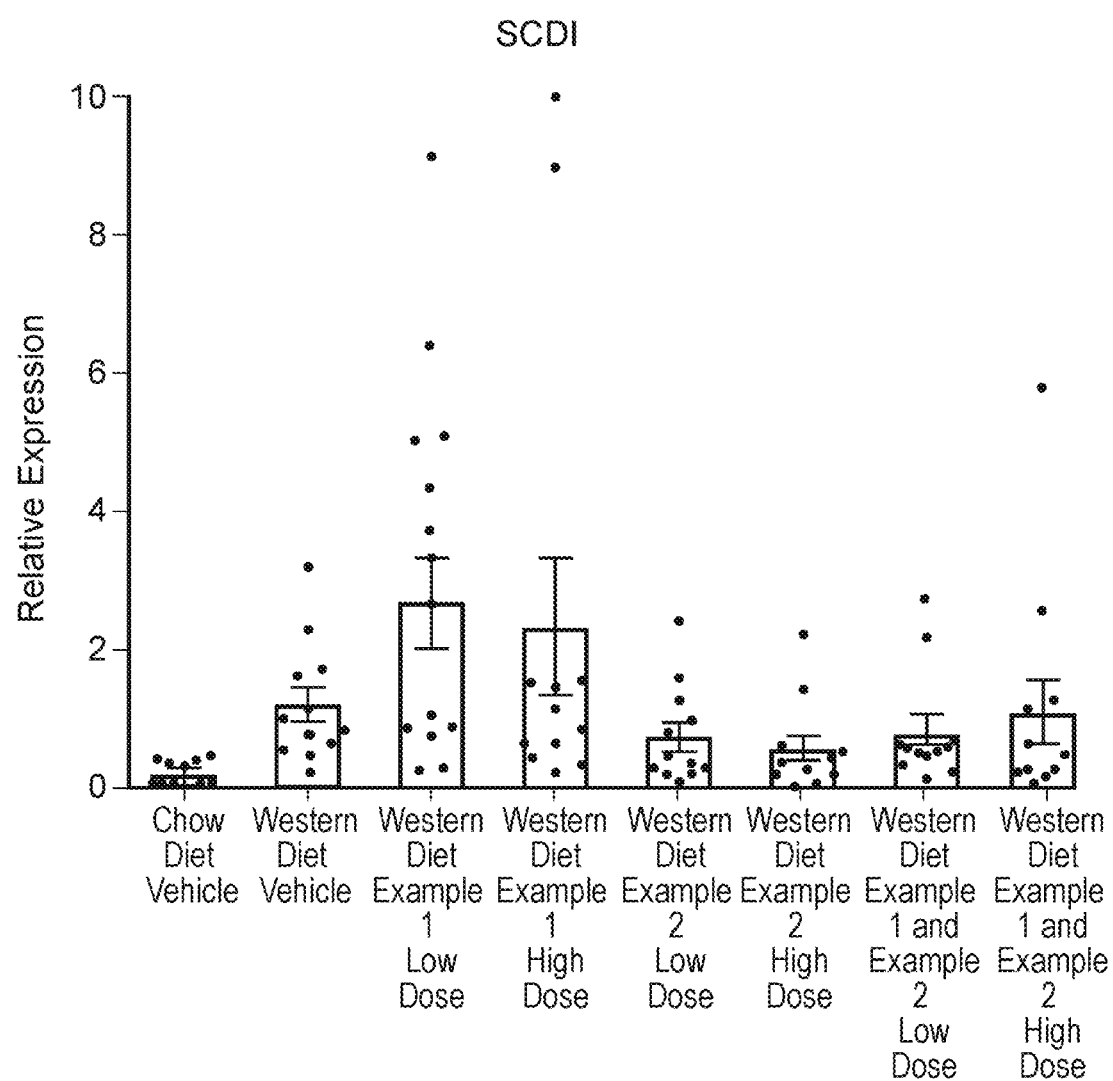
FIG. 15 summarizes the effect of administration of Compound A and Compound D as monotherapy and in combination on hepatic lipogenic gene expression in Western diet fed rats, specifically sterol-CoA desaturase (SCD1).
Figure 16:
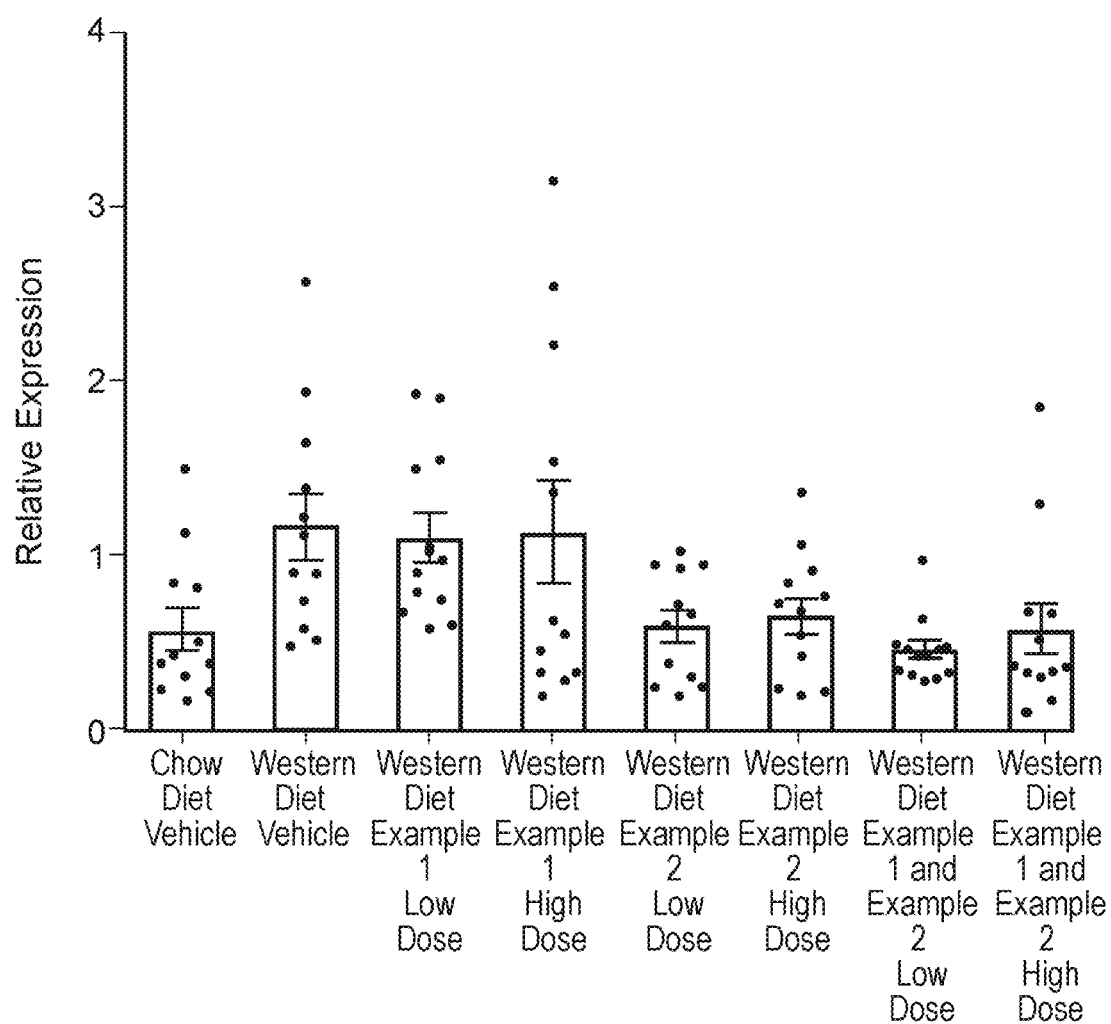
FIG. 16 summarizes the effect of administration of Compound A and Compound D as monotherapy and in combination on hepatic lipogenic gene expression in Western diet fed rats, specifically sterol regulatory element-binding protein 1c (SREBP-1c).
Figure 17:
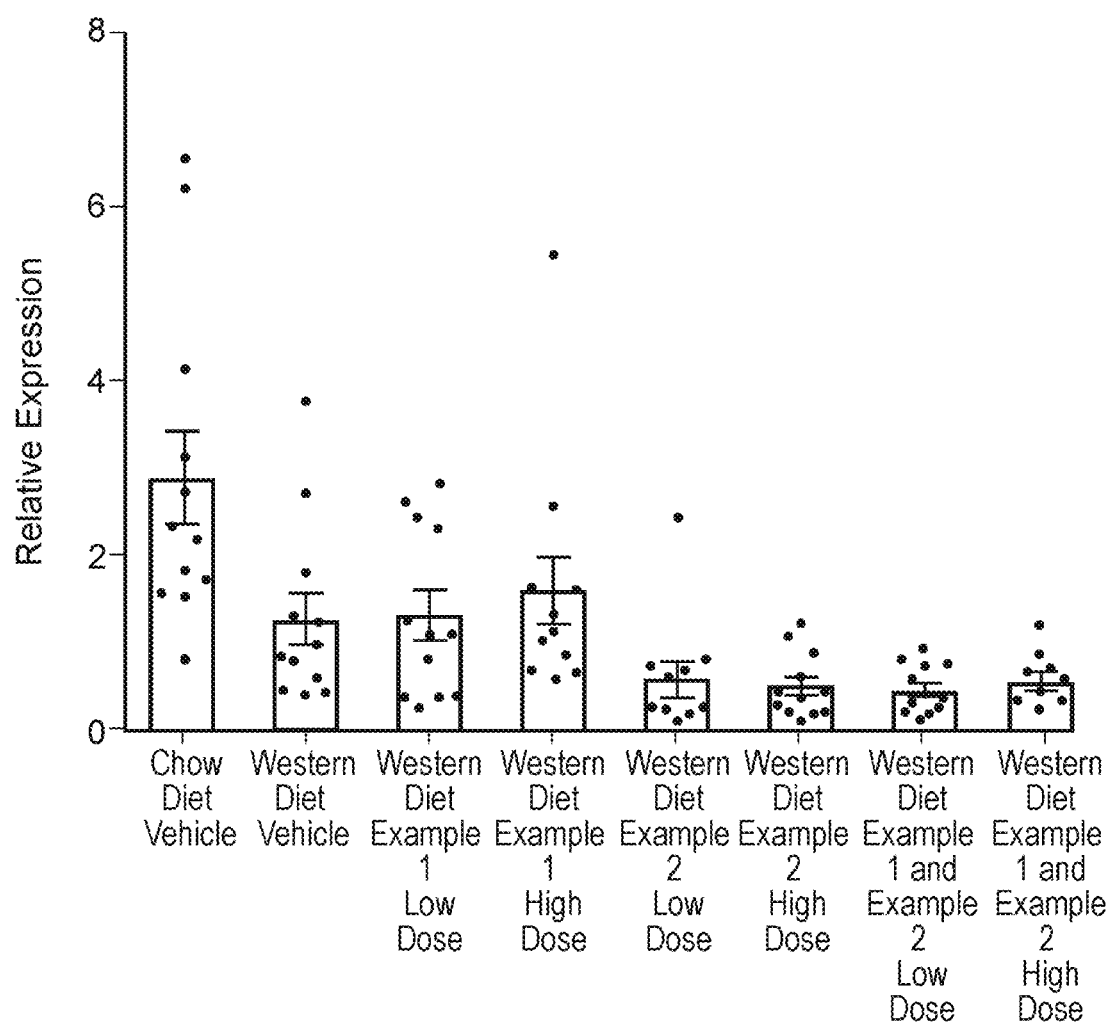
FIG. 17 summarizes the effect of administration of Compound A and Compound D as monotherapy and in combination on hepatic lipogenic gene expression in Western diet fed rats, specifically proprotein convertase subtilisin/kexin type 9 (PCSK9).

Relative to chow fed vehicle treated rats, animals fed a Western diet and treated with vehicle trended to show increased expression of the lipogenic genes: ACC1 (FIG. 13), FASN (FIG. 14), SCD1 (FIG. 15) and SREBP1 (FIG. 16), but not PCSK9 (FIG. 17), which was lower in the Western diet fed rats. Administration of Compound A trended to further increase relative to Western Diet fed and vehicle treated animals, the expression of ACC1, FASN (Compound A high dose only), SCD, but not PCSK9 and SREBP1. Conversely, administration of Compound D decreased expression of all of the lipogenic genes. Co-administration of Compound A and Compound D resulted in expression levels being comparable or lower than those observed in vehicle treated Western diet fed rats.

Figure 18:
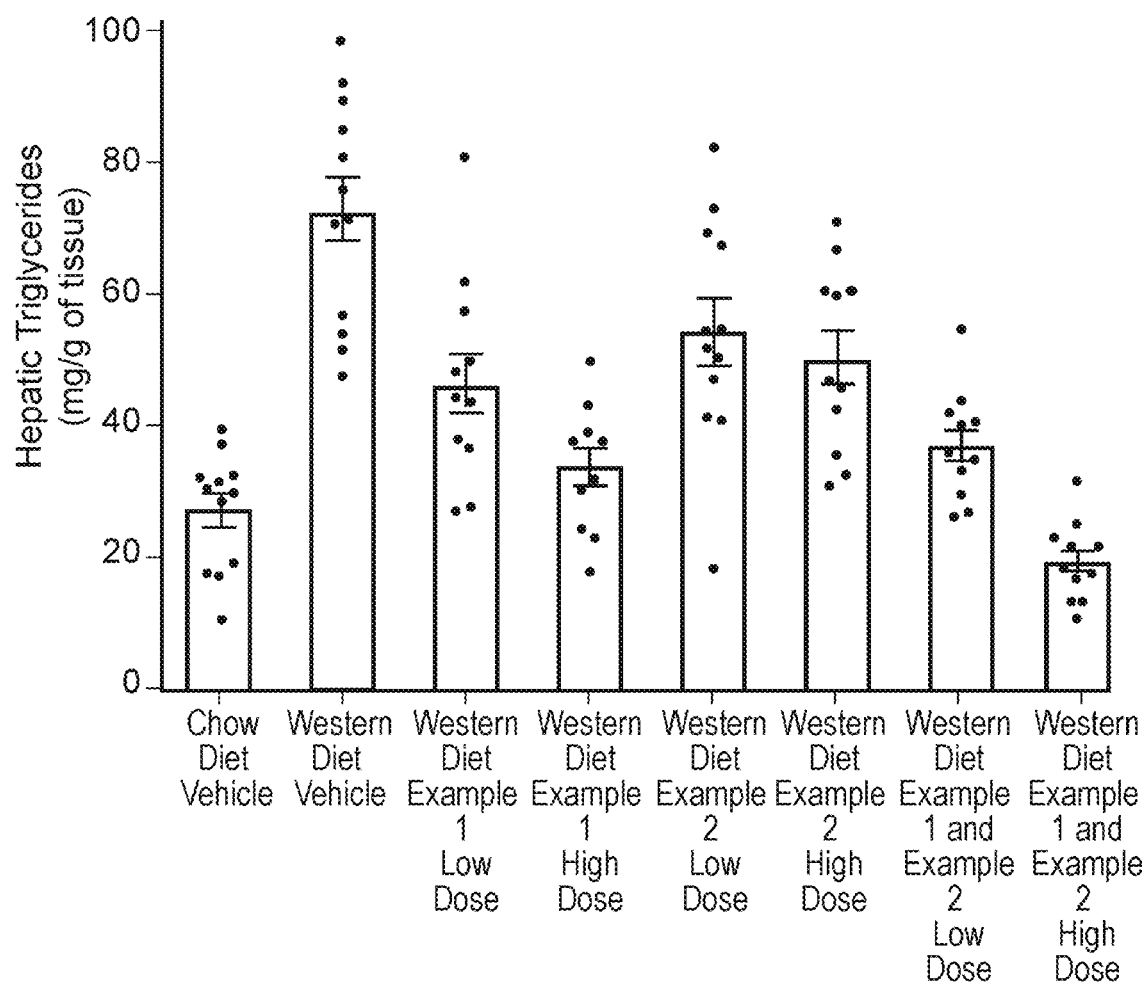
FIG. 18 summarizes the effects of oral administration as monotherapy and in combination of Compound A and Compound D on hepatic triglyceride levels in Western diet fed Sprague Dawley rats.

Relative to chow fed rats, vehicle administered Western diet fed rats showed about a 2.7-fold increase in hepatic triglyceride accumulation (FIG. 18). Oral administration of the low dose and high dose of Compound A produced a 36% and 53% reduction, respectively, in steatosis, relative to vehicle administered Western diet fed rats. Similarly, oral administration of the low dose and high dose of Compound D reduced steatosis by 25% and 30%, respectively, relative to vehicle administered Western diet fed rats. Oral co-administration of either the low or high dose of both Compound A and Compound D reduced steatosis by 50% and 73%, respectively, relative to vehicle administered Western diet fed rats. Oral administration of either the low dose or high dose combination of Compound A and Compound D produced greater reductions in steatosis than that observed with administration of either Compound A or Compound D as monotherapy at the same dose levels.

A randomized, vehicle-controlled, 5-parallel arm study was conducted in male Wistar-Han rats (Charles River (Boston, MA)) fed a choline-deficient and high fat diet (CDAHFD) (Research diets; A16092003) to identify differences in improvements in markers of hepatic inflammation and fibrosis when administering either Compound A or Compound D alone as monotherapy or in combination. Standard laboratory conditions were used to house 60 rats (~200 g); they were double housed and kept under 12:12-hour reverse light-dark schedule (lights off at 8:00 AM). Rats were fed choline deficient and high fat diet (CDAHFD) beginning 6-weeks prior to initiation of the study. Rats, randomized into 4 dosing groups (n=12/group), received twice daily administration of vehicle, Compound A (5 mg/kg) monotherapy, Compound D (30 mg/kg) monotherapy, or co-administration Compound A (5 mg/kg) and Compound D (30 mg/kg) for a period of 6-weeks. Animals (n=12) remaining on normal chow throughout the study and administered twice-daily vehicle were used as a control group. Blood samples were collected prior to starting compound administration and 3- and 6-week post compound administration for the assessment of circulating markers. Shearwave elastography (Aixplorer Ultimate imager, Supersoinc imagine) measurements were made at Week −3, Week 0 (prior to 1$^{st}$ dose), Week 3 and Week 6 to assess inflammation and fibrosis progression over time. Histology was assessed following 6-weeks of drug administration which corresponded to 12 weeks on the CDAHFD. Results are provided as an average of animals per each dosing group.

Following the 12-weeks on CDAHFD, the animals were sacrificed by $CO_2$ asphyxiation. The right lateral, medial and left lateral lobes of the liver were harvested. Sections were taken from the left lateral, right medial and right lateral lobes and fixed in formalin and processed to paraffin blocks per animal. One section of left lateral lobe per animal was cryopreserved in optimal cutting temperature (OCT) compound. The remainder of the liver from each animal was frozen and rapidly pulverized on an aluminum block cooled in liquid $N_2$, ensuring the tissue remained frozen throughout the pulverization. The pulverized tissue was transferred and stored at −80° C. until analysis. A portion of the pulverized liver sample from each animal was processed and analyzed for gene expression markers of fibrogenesis. Rat taqman probes against αSMA and COL1A1 were all assessed using Actb as housekeeping gene on qPCR.

The following endpoints were evaluated by qualitative histologic evaluation by a board certified veterinary pathologist and quantitative histomorphometry: hepatic stellate cell activation and differentiation into myofibroblasts by αSMA immunohistochemistry (IHC); Collagen as a correlate of fibrosis by Picrosirius Red stain. Images were analyzed using Visiopharm software. Visiopharm applications with threshold parameters were applied uniformly to identify tissue sections and to quantify the targets on each IHC (DAB (3,3'-diaminobenzidine) positive) or histochemically stained slides as percent area: stain area of interest/Total tissue ROI—whitespace)×100%. Non-parametric statistics were used to analyze data from this study. Group values were reported as mean +/−the standard error of the mean.

Figure 19:
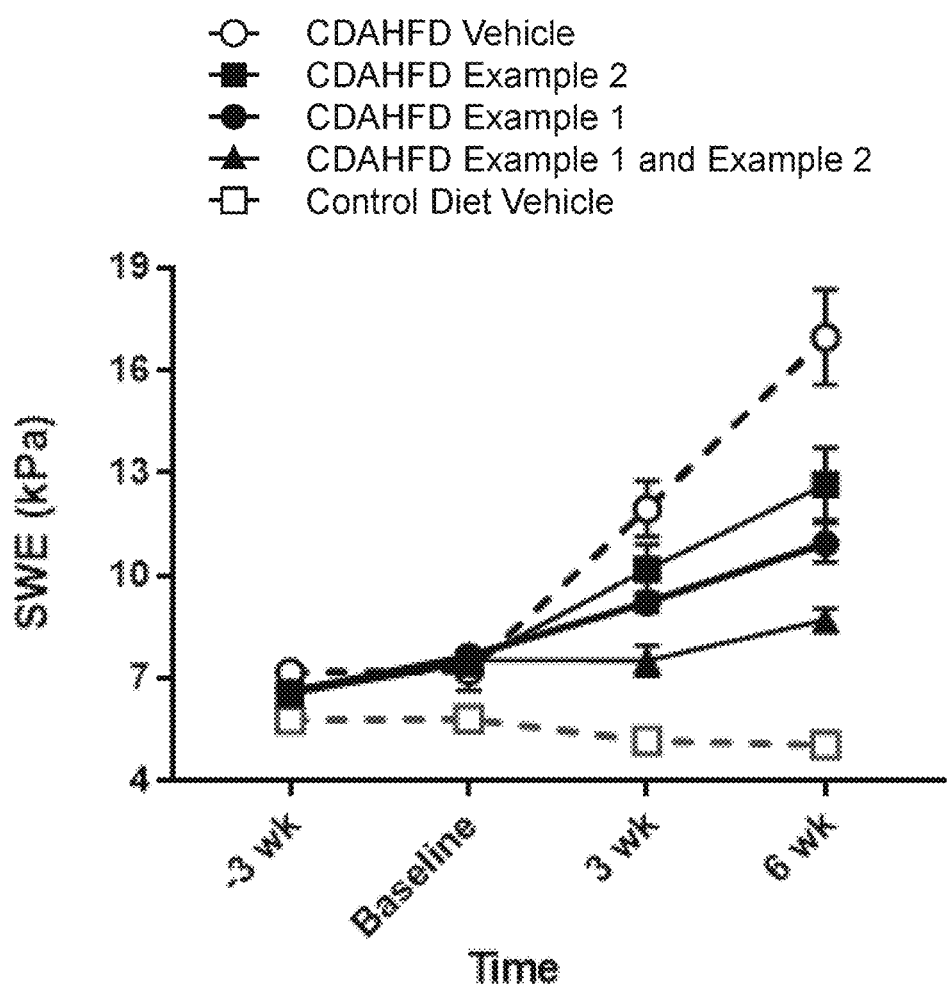
FIG. 19 summarizes the effects of oral administration as monotherapy and in combination of Compound A and Compound D on elasticity of the liver, a marker of hepatic inflammation and fibrosis, in choline deficient and high fat diet (CDAHFD) fed Male Wistar Hann rats.

Relative to control animals fed a chow diet and administered vehicle, animals that received CDAHFD and administered vehicle showed a marked increase in liver stiffness (assessed using shearwave elastography (SWE), measured in kilopascals (kPa)) over the duration of the study, indicative of progressive hepatic inflammation and fibrosis (FIG. 19). Administration of Compound A or Compound D as monotherapy each reduced liver stiffness suggestive of reduced hepatic inflammation and/or fibrosis. Co-administration of Compound A and Compound D produced greater reductions in liver stiffness than either agent as monotherapy (FIG. 19).

Figure 20:
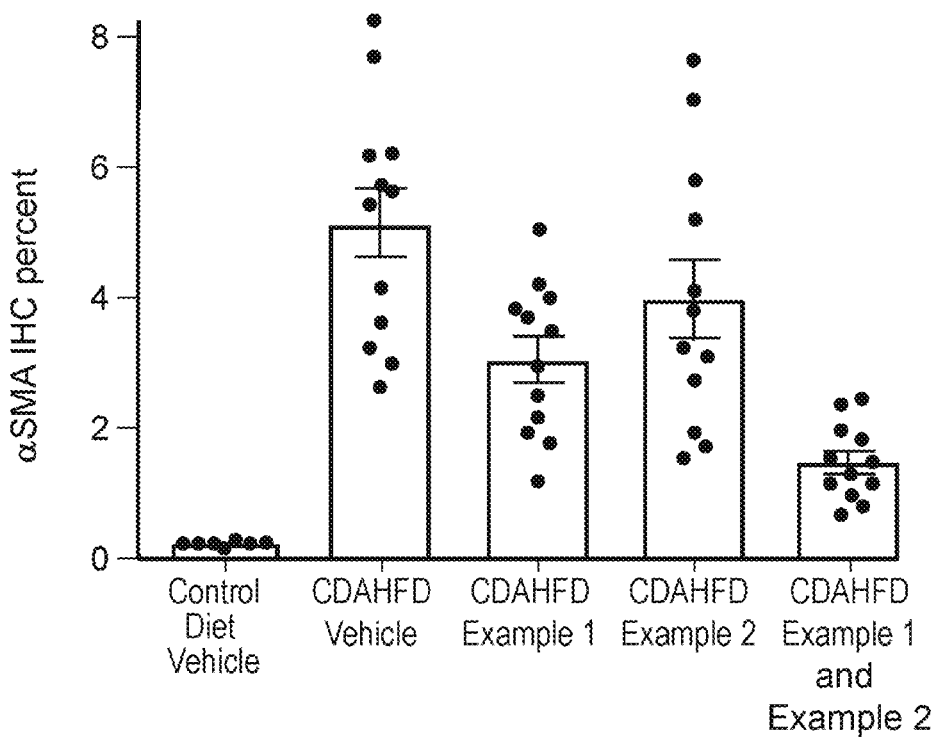
FIG. 20 summarizes the effects of oral administration as monotherapy and in combination of Compound A and Compound D on hepatic alpha smooth actin (αSMA) immunohistochemistry, a marker of myofibroblast activation and fibrogenesis, in CDAHFD fed Male Wistar Hann rats.

Relative to control animals fed a chow diet and administered vehicle, animals that received CDAHFD and administered vehicle showed a marked increase in liver alpha smooth muscle actin (αSMA) staining, indicative of myofibroblast activation and fibrogenesis (FIG. 20). Administration of Compound A or Compound D as monotherapy each reduced αSMA staining by 41% and 23%, respectively, suggestive of reduced hepatic myofibroblast activation and fibrogenesis. Co-administration of Compound A and Compound D produced greater reductions in αSMA staining than either agent as monotherapy, reducing staining by 72% (FIG. 20).

Figure 21:
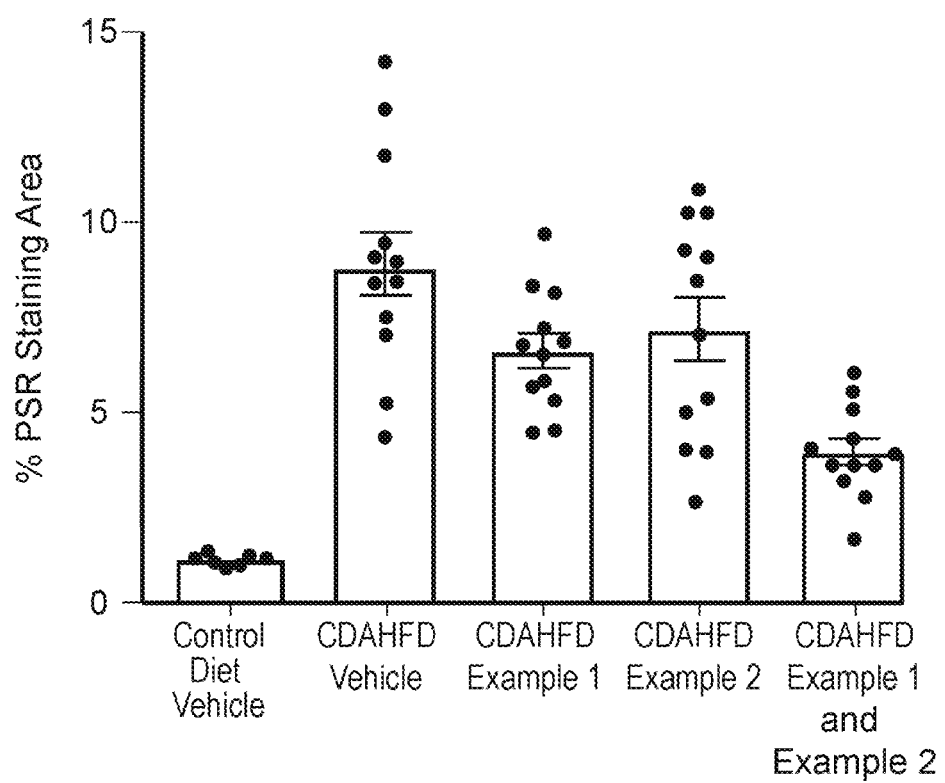
FIG. 21 summarizes the effects of oral administration as monotherapy and in combination of Compound A and Compound D on hepatic Picosirius red staining in CDAHFD fed Male Wistar Hann rats.

Relative to control, animals fed a chow diet and administered vehicle, animals that received CDAHFD and administered vehicle showed a marked increase in Picosrius red (PSR) staining, indicative of collagen deposition and fibrosis (FIG. 21). Administration of Compound A or Compound D as monotherapy each reduced PSR staining by 26% and 20%, respectively, suggestive of reduced collagen deposition and fibrosis. Co-administration of Compound A and Compound D produced greater reductions in PSR staining than either agent as monotherapy, reducing staining by 56% (FIG. 21).

Figure 24:
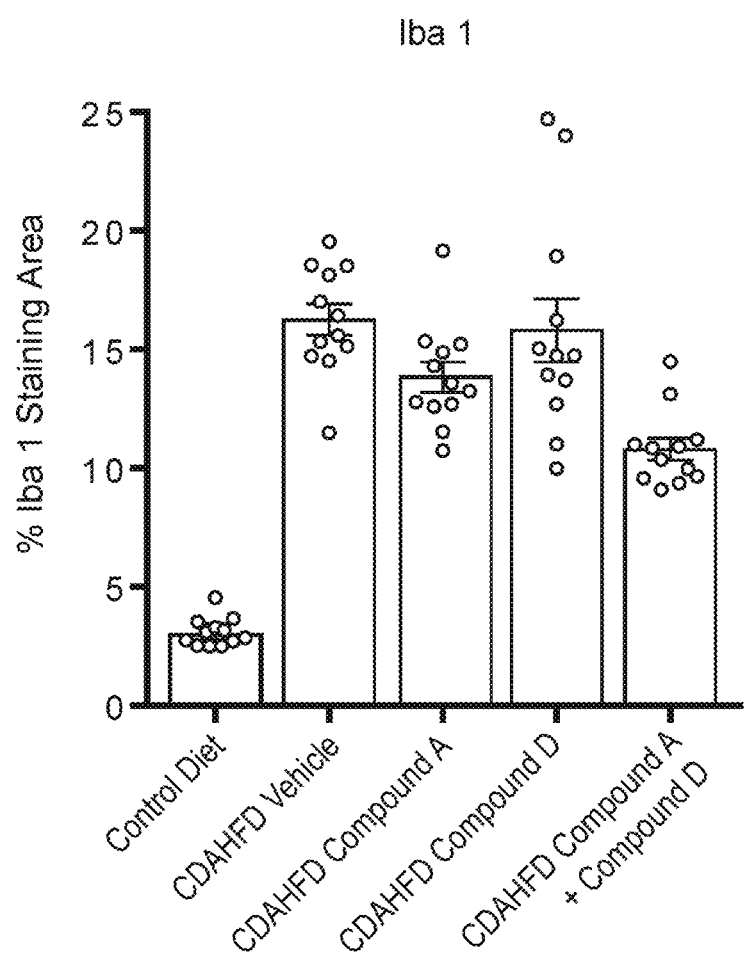
FIG. 24 summarizes the effects of oral administration as monotherapy and in combination of Compound A and Compound D on Ionized Calcium-Binding Adapter Molecule 1 Staining in CDAHFD fed Male Wistar Hann rats.

Relative to control animals fed a chow diet and administered vehicle, animals that received CDAHFD and administered vehicle showed a marked increase in Ionized calcium binding adaptor molecule 1 (Iba1) staining, indicative of hepatic macrophage activation (FIG. 24). Administration of Compound A as monotherapy reduced Iba1 staining by 15%, suggestive of reduced hepatic inflammatory tone. While administration of D as monotherapy did not alter Iba1 staining, co-administration of A and D produced greater reductions in Iba1 staining than Compound A administered as monotherapy, decreasing staining by 33% (FIG. 24)

Figure 22:
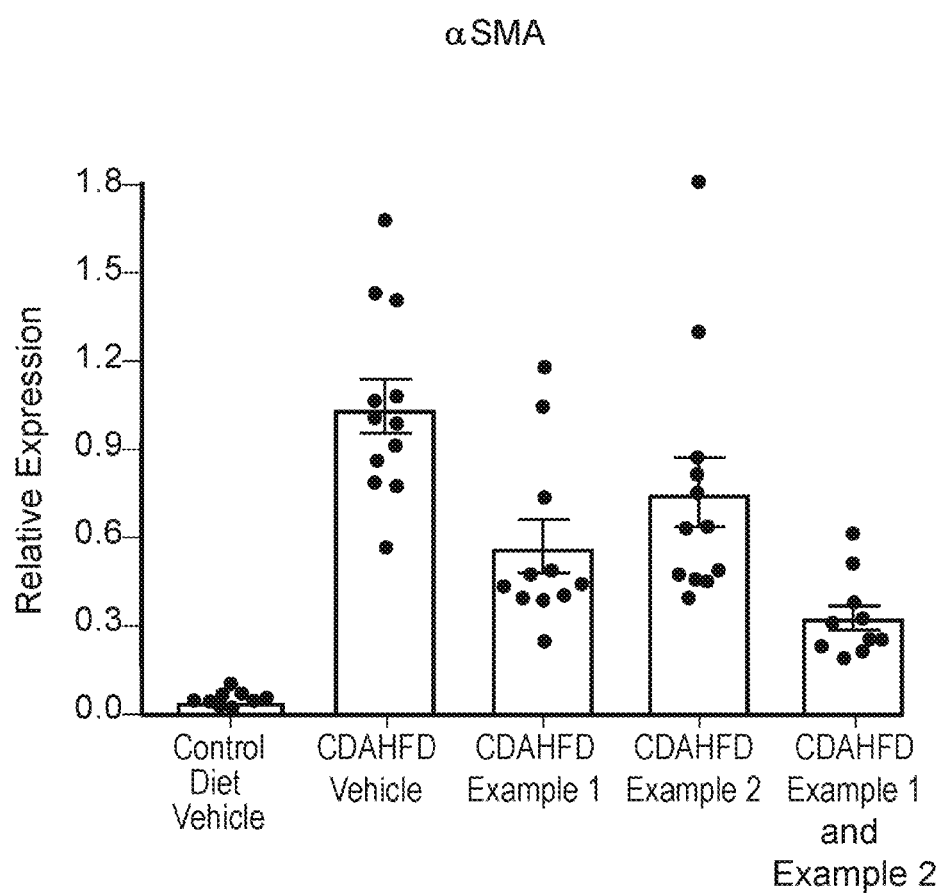
FIG. 22 summarizes the effects of oral administration as monotherapy and in combination of Compound A and Compound D on hepatic alpha smooth actin (αSMA) gene expression in CDAHFD fed Male Wistar Hann rats.
Figure 23:
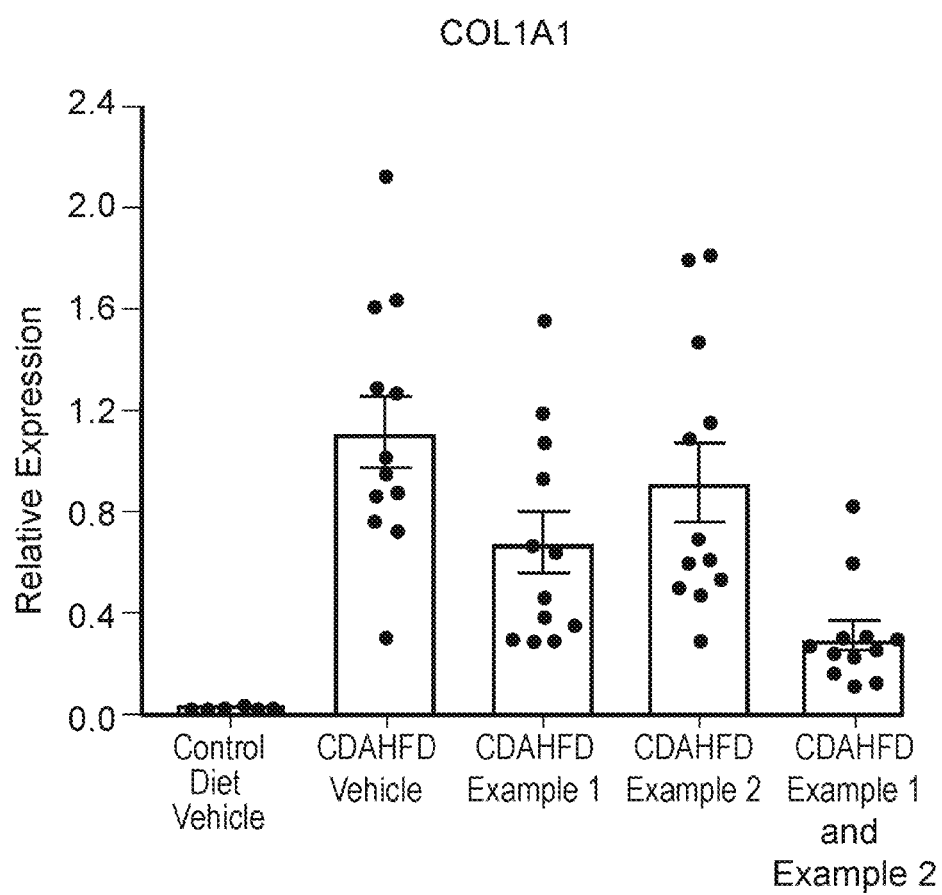
FIG. 23 summarizes the effects of oral administration as monotherapy and in combination of Compound A and Compound D on hepatic collagen 1A1 gene expression in CDAHFD fed Male Wistar Hann rats.

Relative to control animals fed a chow diet and administered vehicle, animals that received CDAHFD and administered vehicle showed a marked increase in liver alpha smooth muscle actin (αSMA) (FIG. 22) and collagen A1A (COL1A1) (FIG. 23) gene expression, indicative of myofibroblast activation and fibrogenesis. Administration of Compound A or Compound D as monotherapy each reduced hepatic αSMA and COL1A1 gene expression, suggestive of reduced hepatic myofibroblast activation and fibrogenesis. Co-administration of Compound A and Compound D produced greater reductions in hepatic αSMA (FIG. 22) and COL1A1 (FIG. 23) gene expression than either agent as monotherapy.

Phase II Pharmacodynamic, Safety and Tolerability Study

A Phase 2A, randomized, double blind, placebo controlled, parallel group study was conducted to assess the pharmacodynamics, safety and tolerability of the compound of Example 2 (Compound A) and the compound of Example 1 (Compound D) co-administered for six weeks in adults with non-alcoholic fatty liver disease (NAFLD). The co-administration of the compounds included oral administration of Compound D as a 300 mg dose (3 tablets of 100 mg each) every 12 hours and oral administration of Compound A was administered as a 15 mg dose (3 tablets of 5 mg each) every 12 hours.

It was hypothesized that inhibition of acetyl-CoA (coenzyme A) carboxylase 1 and 2 by Compound A and inhibition of diacylglycerol acyltransferase 2 by Compound D would modulate lipid metabolism in distinct and complementary ways, suggesting that co-administration of the two compounds may lead to an improved benefit-risk profile compared with either agent administered alone. The results for the primary PD endpoint of whole liver fat (WLF), key secondary endpoints regarding safety (platelets) and tolerability, and key tertiary/exploratory PD and biomarker endpoints including lipids (e.g. triglycerides, TG) and liver function tests (LFTs) are summarized in Table 9 below:

Table 9: Summary of Treatment Effects of Whole Liver Fat, Triglycerides and Platelets (Change from Baseline to Day 42, Placeb-adjusted).

TABLE 9

| | | Placebo-adjusted % Change from Baseline (N = 12) on Day 42 | | |
|---|---|---|---|---|
| Treatment | N | Liver Fat PDFF LS Mean (90% CI) | Triglycerides LS Mean (90% CI) | Platelets LS Mean (90% CI) |
| Cmpd A 15 mg Q12H | 22 | −44.52 (−54.97, −31.65) | 47.30 (21.77, 78.19) | −7.12 (−14.51, 0.91) |
| Cmpd D 300 mg Q12H | 24 | −35.40 (−47.40, −20.68) | −8.63 (−24.37, 10.38) | 7.50 (−0.99, 16.71) |
| Cmpd A 15 mg Q12H + CmpdD 300 mg Q12H | 26 | −44.64 (−54.80, −32.19) | 6.00 (−12.21, 27.99) | 1.23 (−6.75, 9.91) |

CI = Confidence Interval

Key findings for whole liver fat (WLF) and triglycerides on day 42 show: i) all treatment arms met the prespecified decision criteria for WLF (i.e. ≥95% confidence that the treatment arm is better than placebo; and observed placebo-adjusted reductions greater than the target value of 30%); ii) monotherapy with Compound A induced a marked triglyceride elevation, and monotherapy with Compound D led to a modest decrease in triglycerides; and iii) co-administration of Compound A and Compound D led to triglyceride values minimally changed compared with placebo, resulting in robust mitigation of the triglyceride elevation seen with the Compound A monotherapy.

Key safety and tolerability findings show: i) all treatment arms were generally safe and well tolerated over the course of the study; and ii) no clinically meaningful change in platelets was observed in any treatment arm. Compared with placebo, a decrease in platelets was observed with Compound A monotherapy arm. This was not apparent with Compound D. Surprising, the decrease in platelets was ameliorated in the Compound A/Compound D co-administration arms.

In summary, co-administration of Compound A/Compound D was generally safe and well tolerated, provided greater WLF reduction than administration of Compound D alone and substantially mitigated induced triglyceride elevation associated with monotherapy with Compound A.

Baseline Characteristics

Table 10 below provides information on the key demographic and baseline characteristics of the stud population.

TABLE 10

|  | Placebo Q12H | Compound A (15 mg Q12H) | Compound D (300 mg Q12H) | Compound A (15 mg Q12H) + Compound D (300 mg) |
|---|---|---|---|---|
| N | 14 | 29 | 29 | 28 |
| Age | 56.9 (13.3) | 55.3 (10.6) | 53.5 (11.0) | 53.2 (9.6) |
| Gender: Male | 7 (50.0) | 15 (51.7) | 13 (46.4) | 18 (64.3) |
| Race:     White | 13 | 25 | 26 | 25 |
|                Other | 1 | 4 | 2 | 3 |
| Weight (kg) | 95.94 | 99.68 | 100.48 | 104.69 |
| BMI (kg/m$^2$) | 34.69 | 35.01 | 36.16 | 36.96 |
| Hemoglobin A1c (%) | 5.7 (0.4) | 6.1 (0.5) | 5.8 (0.5) | 5.8 (0.6) |
| Platelets (10$^3$/mm$^3$) [130-394] | 271.4 (40.2) | 269.8 (57.2) | 263.4 (55.7) | 250.5 (49.4) |
| Fasting Glucose (mg/dL) | 99.1 (10.3) | 115.1 (29.3) | 109.4 (22.0) | 105.9 (22.3) |
| Whole liver fat (%) | 15.6 (7.6) | 16.0 (6.6) | 17.7 (8.2) | 16.1 (6.9) |
| Liver Function Tests | | | | |
| ALT (U/L) | 35.0 (23.0) | 31.9 (15.7) | 36.0 (18.5) | 32.8 (16.1) |
| AST (U/L) | 25.9 (9.5) | 24.0 (8.1) | 26.0 (8.5) | 23.5 (7.4) |
| Alkaline Phosphatase (U/L) | 91.9 (37.4) | 85.8 (32.3) | 82.4 (15.8) | 84.0 (18.3) |
| GGT (U/L) | 38.0 (25.0) | 32.9 (17.0) | 37.2 (17.7) | 34.6 (19.3) |
| Lipids & Apolipoproteins | | | | |
| Triglycerides (mg/dL) | 164.2 (82.1) | 214.2 (134.9) | 173.3 (90.5) | 175.3 (66.8) |
| Total Cholesterol | 193.4 (57.5) | 182.7 (41.4) | 193.9 (29.1) | 194.5 (36.6) |
| HDL-Cholesterol (mg/dL) | 46.3 (8.4) | 43.4 (9.7) | 47.6 (11.1) | 43.1 (8.7) |
| Direct LDL-Cholesterol (mg/dL) | 129.8 (50.6) | 112.8 (39.8) | 126.9 (24.6) | 129.3 (31.7) |
| Apolipoproteins C3 | 13.6 (4.5) | 15.2 (5.9) | 14.2 (5.6) | 13.9 (7.0) |

Figure 25A:
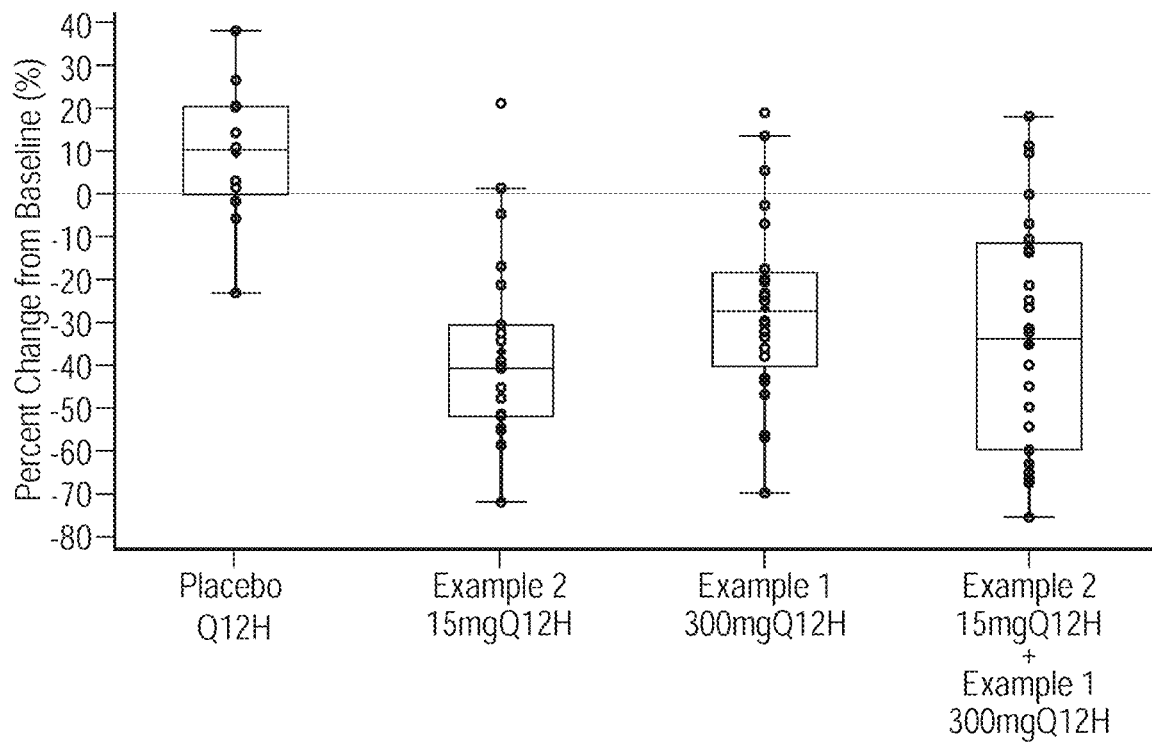
FIG. 25a shows a Box-and-Whisker plot of the WLF data by treatment arm for the Phase 2A study described herein.

Mean (SD) is presented for continuous variables; count (%) is presented for gender Primary Whole Liver Fat by MRI-PDFF Log-transformed relative change from baseline to Day 42 in WLF by MRI-PDFF was analyzed using the analysis of covariance (ANCOVA). The model included log-transformed baseline WLF by MRI-PDFF as a covariate. Model-derived estimates were back-transformed from the log scale and converted to percent change. FIG. 25a shows a Box-and-Whisker plot of the WLF data by treatment arm and Table 11 provides the results from the ANCOVA model.

TABLE 11

| Treatment | N | % Change from Baseline LS Mean (90% CI) | % Change from Placebo LS Mean (90% CI) | 2-sided P-value | % Change of Combination vs Each Monotherapy LS Mean (50% CI)* (90% CI) | 2-sided P-value |
|---|---|---|---|---|---|---|
| Placebo | 12 | 8.14 (−8.56, 27.89) | | | | |
| Cmpd A 15 mg | 22 | −40.01 (−47.00, −32.09) | −44.52 (−54.97, −31.65) | <0.0001 | −0.21 (−6.82, 6.87) (−15.66, 18.08) | 0.9836 |
| Cmpd D 300 mg | 24 | −30.14 (−37.97, −21.33) | −35.40 (−47.40, −20.68) | 0.0007 | −14.30 (−19.86, −8.35) (−27.32, 1.06) | 0.1233 |
| Cmpd A 15 mg + Cmpd D 300 mg | 26 | −40.13 (−46.58, −32.90) | −44.64 (−54.80, −32.19) | <0.0001 | | |

All treatment arms lead to a reduction in WLF from baseline on Day 42, as compared to placebo which showed a numerical increase. Each treatment arm met the prespecified decision criteria for WLF versus placebo (i.e. ≥95% confidence that the treatment arm is better than placebo; and observed placebo-adjusted reductions greater than the target value of 30%). Furthermore, comparison of the magnitude of reduction in WLF across arms showed evidence that the Compound A and the Compound D co-administration leads to a numerically greater reduction than monotherapy with Compound D and comparable reduction to monotherapy with Compound A [−0.21% (50% CI −6.82, 6.87)] (see Table 11).

Figure 25B:
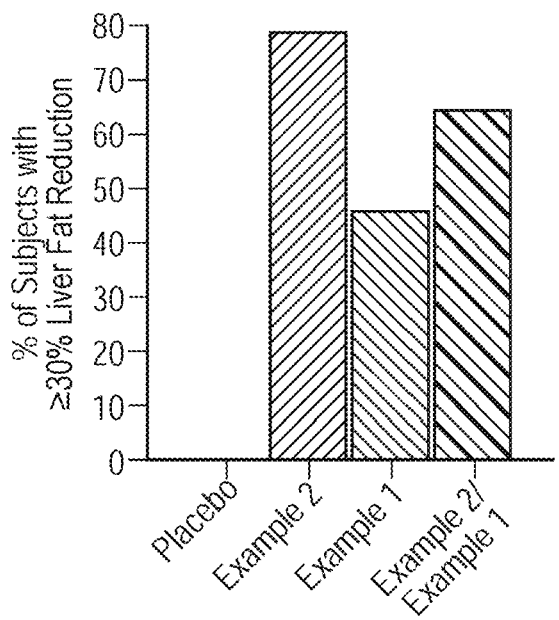
FIG. 25b shows % of subjects with greater than or equal to 30% liver fat reduction.
Figure 25C:
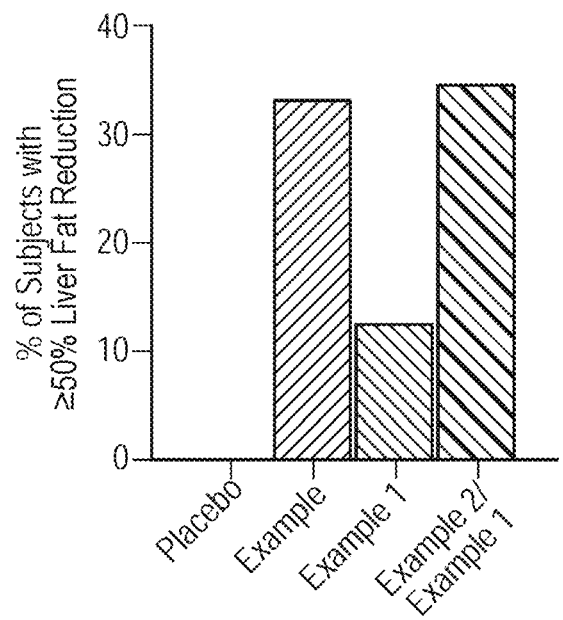
FIG. 25c shows % of subjects with greater than or equal to 50% liver fat reduction.

FIGS. 25b and 25c demonstrate the proportion of participants that meet liver fat reduction thresholds of ≥30% or ≥50% relative reduction in liver fat.

Serum Triglycerides

Figure 26:
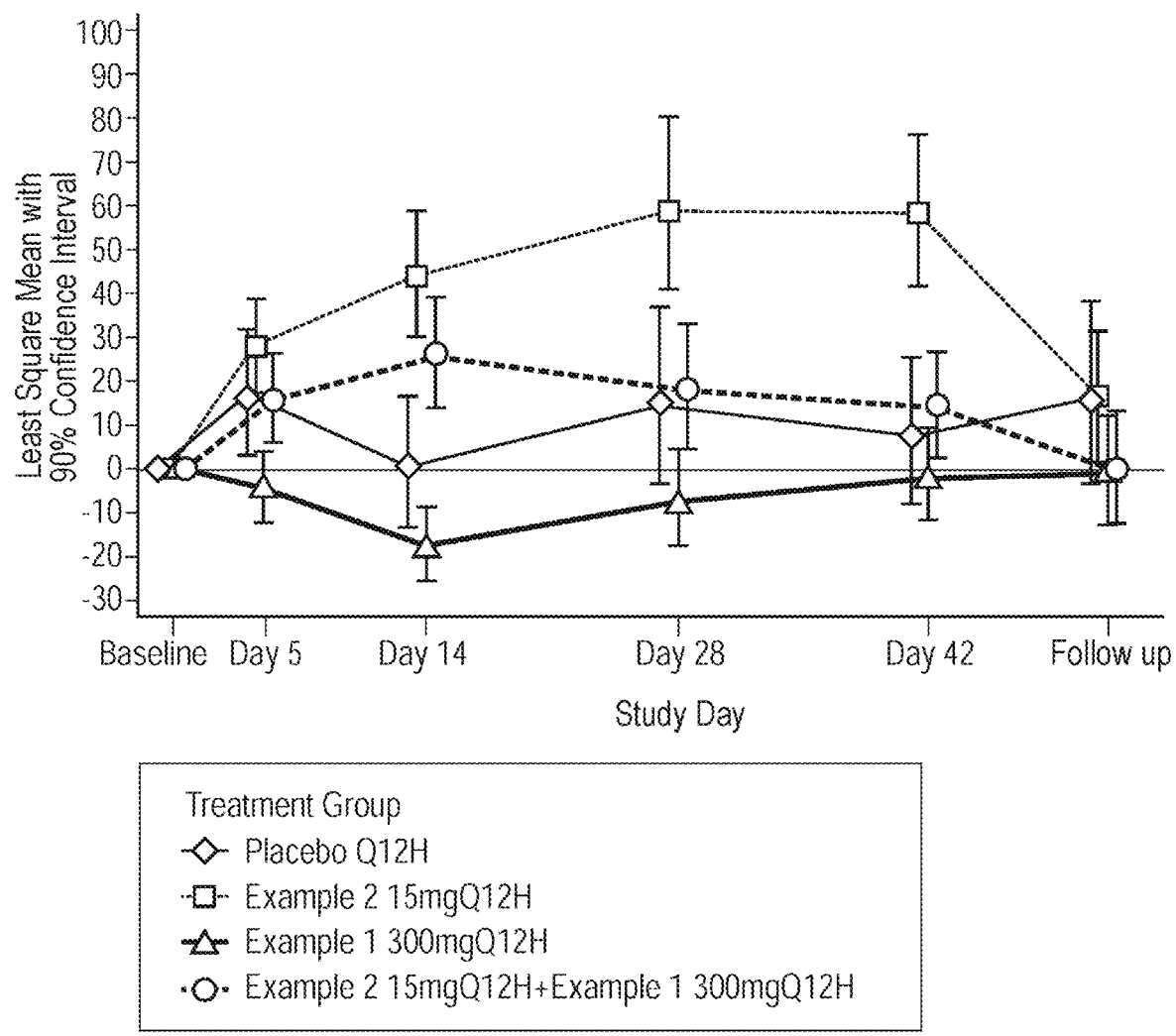
FIG. 26 shows a plot of least square means and 90% CIs for percent change from baseline in serum triglycerides for the Phase 2A study described herein.

Log-transformed relative change from baseline in serum triglycerides were analyzed using a mixed model for repeated measurements (MMRM). The model included log-transformed baseline TG and baseline whole liver fat as covariates. Model-derived estimates were back-transformed from the log scale and converted to percent change. Table 12a provides a statistical analysis of the percent change from baseline in serum triglycerides—FAS. FIG. 26 is a plot of least square means and 90% CIs for percent change from baseline in serum triglycerides—FAS.

Table 12a shows the results from the MMRM model at each time-point. The data shows that an ACCi-induced triglyceride elevation was observed with monotherapy administration with Compound A. However, consistent with the study hypothesis, co-administration of Compound A/Compound 0 led to mitigation of the triglyceride elevation. The placebo-adjusted increase in triglycerides at Day 42 was 47.30% (21.77%, 78.19%) on Compound A treatment arm but only 6.00% (−12.21%, 27.99%) on the Compound A/Compound 0 combination arm. This equates to a statistically significant reduction of 28.03% (23.40%, 32.39%) in triglyceride levels on the combination arm relative to Compound A monotherapy arm. Triglyceride elevation at Day 5 and Day 14 in the combination arm was of lower magnitude than that seen in Compound A monotherapy arm, with values at Day 28 and Day 42 similar to placebo (see FIG. 26).

In addition, Table 12b provides a summary of triglyceride abnormalities in NAFLD patients. Data is presented as the total number (%) of subjects exceeding triglyceride threshold values. The data set shows mitigation of Compound A-mediated triglyceride abnormalities at >400 mg/dl; >600 mg/dl; and >800 mg/dl. Specifically, the data shows complete blockade of the Compound A-mediated triglyceride abnormalities (>600 mg/dl; and >800 mg/dl) by the co-administration of Compound A and Compound D.

TABLE 12a

| | Treatment | N | % Change from Baseline LS Mean (90% CI) | % Change from Placebo LS Mean (90% CI) | 2-sided P-value | % Change of Combination vs Each Monotherapy LS Mean (90% CI) | 2-sided P-value |
|---|---|---|---|---|---|---|---|
| Study Day 5 | Placebo | 13 | 16.72 (3.18, 32.03) | | | | |
| | Cmpd A 15 mg | 29 | 27.89 (17.67, 38.99) | 9.57 (−5.63, 27.22) | 0.3117 | −9.53 (−13.87, −4.98) | 0.1706 |
| | Cmpd D 300 mg | 26 | −4.59 (−12.52, 4.05) | −13.26 (−29.69, −4.97) | 0.0286 | 21.26 (15.34, 27.50) | 0.0107 |
| | Cmpd A 15 mg + Cmpd D 300 mg | 26 | 15.70 (6.05, 26.22) | −0.87 (−14.76, 15.27) | 0.9231 | | |
| 14 | Placebo | 12 | 0.42 (−13.37, 16.40) | | | | |
| | Cmpd A 15 mg | 27 | 43.67 (30.12, 58.62) | 43.06 (19.72, 70.96) | 0.0012 | −12.58 (−17.47, −7.39) | 0.1176 |
| | Cmpd D 300 mg | 27 | −17.53 (−25.31, −8.93) | −17.87 (−31.25, −1.90) | 0.0689 | 52.29 (43.76, 61.32) | <0.0001 |
| | Cmpd A 15 mg + Cmpd D 300 mg | 26 | 25.60 (13.54, 38.93) | 25.07 (4.59, 49.56) | 0.0405 | | |
| 28 | Placeb | 12 | 14.74 (−3.60, 36.57) | | | | |
| | Cmpd A 15 mg | 24 | 59.36 (41.06, 80.03) | 38.89 (12.25, 71.85) | 0.0121 | −25.99 (−30.96, −20.67) | 0.0043 |
| | Cmpd D 300 mg | 26 | −7.35 (−17.72, 4.33) | −19.25 (−34.59, −0.31) | 0.0951 | 27.29 (18.86, 36.31) | 0.0193 |
| | Cmpd A 15 mg + Cmpd D 300 mg | 26 | 17.93 (4.69, 32.86) | 2.79 (−16.77, 26.93) | 0.8290 | | |
| 42 | Placebo | 12 | 7.38 (−8.06, 25.41) | | | | |
| | Cmpd A 15 mg | 22 | 58.17 (41.76, 76.48) | 47.30 (21.77, 78.19) | 0.0011 | −28.03 (−32.39, −23.40) | 0.0006 |
| | Cmpd D 300 mg | 24 | −1.89 (−11.94, 9.32) | −8.63 (−24.37, 10.38) | 0.4290 | 16.02 (9.05, 23.43) | 0.1081 |
| | Cmpd A 15 mg + Cmpd D 300 mg | 26 | 13.83 (2.27, 26.69) | 6.00 (−12.21, 27.99) | 0.6080 | | |

TABLE 12b

|  | Placebo (BID) | ACCi (15 mg BID) | DGAT2i (300 mg BID) | ACCi: DGAT2i (15 mg: 300 mg BID) |
|---|---|---|---|---|
| Number of subjects evaluable | 14 | 29 | 27 | 26 |
| >400 mg/dl | 2 (14.3) | 11 (37.9) | 2 (7.4) | 3 (11.5) |
| >600 mg/dl | 1 (7.1) | 4 (13.8) | 1 (3.7) | 0 |
| >800 mg/dl | 0 | 3 (10.3) | 0 | 0 |

Other Lipids and Apolipoproteins

A summary of the statistical analysis of percent change from baseline in other fasting serum lipid parameters on day 42—FAS is provided in Table 13.

Compound A/Compound D co-administration arm[−9.58% (−16.26, −2.38)]. No statistically significant difference was observed when comparing each monotherapy arm with the combination arm. HDL-cholesterol decreased with similar magnitude in all treatment arms, as compared to placebo. Co-administration of Compound A/Compound D did not significantly decrease HDL-Cholesterol lower than each monotherapy. LDL-cholesterol was statistically significantly decreased in the Compound A monotherapy arm, with numerical lowering trends in the Compound D monotherapy and Compound A/Compound D co-administration arms that were not statistically significant. Non-HDL cholesterol was not significantly different from placebo in any treatment arm.

TABLE 13

| Day 42 | Treatment | N | % Change from Baseline LS Mean (90% CI) | % Change from Placebo LS Mean (90% CI) | 2-sided P-value | % Change of Combination vs Each Monotherapy LS Mean (90% CI) | 2-sided P-value |
|---|---|---|---|---|---|---|---|
| Total Cholesterol | Placebo | 12 | 1.98 (−4.27, 8.63) | | | | |
| | Cmpd A 15 mg | 22 | −2.72 (−7.02, 1.77) | −4.61 (−11.73, 3.09) | 0.3153 | −5.22 (−10.97, 0.91) | 0.1583 |
| | Cmpd D 300 mg | 24 | −5.87 (−9.93, −1.63) | −7.70 (−14.55, −0.30) | 0.0878 | −2.05 (−7.92, 4.20) | 0.5795 |
| | Cmpd A 15 mg + Cmpd D 300 mg | 26 | −7.80 (−11.71, −3.71) | −9.58 (−16.26, −2.38) | 0.0317 | | |
| HDL-Cholesterol | Placebo | 12 | −3.19 (−9.87, 3.98) | | | | |
| | Cmpd A 15 mg | 22 | −15.56 (−19.70, −11.20) | −12.77 (−20.08, −4.80) | 0.0110 | −3.14 (−9.70, 3.90) | 0.4517 |
| | Cmpd D 300 mg | 24 | −13.43 (−17.62, −9.03) | −10.58 (−18.02, −2.45) | 0.0354 | −5.52 (−11.91, 1.33) | 0.1890 |
| | Cmpd A 15 mg + Cmpd D 300 mg | 26 | −18.21 (−22.13, −14.09) | −15.51 (−22.53, −7.85) | 0.0018 | | |
| LDL-Cholesterol | Placebo | 12 | 2.04 (−9.52, 15.09) | | | | |
| | Cmpd A 15 mg | 22 | −19.74 (−26.24, −12.67) | −21.35 (−32.09, −8.92) | 0.0081 | 12.81 (0.17, 27.07) | 0.0953 |
| | Cmpd D 300 mg | 24 | −5.22 (−12.81, 3.02) | −7.12 (−19.77, 7.52) | 0.4030 | −4.46 (−15.08, 7.47) | 0.5198 |
| | Cmpd A 15 mg + Cmpd D 300 mg | 26 | −9.45 (−16.68, −1.59) | −11.27 (−23.34, 2.72) | 0.1775 | | |
| Non-HDL Cholesterol | Placebo | 12 | 2.17 (−5.74, 10.74) | | | | |
| | Cmpd A 15 mg | 22 | 1.86 (−3.82, 7.87) | −0.30 (−9.68, 10.06) | 0.9600 | −5.94 (−13.15, 1.86) | 0.2046 |
| | Cmpd D 300 mg | 24 | −3.51 (−8.78, 2.05) | −5.56 (−14.40, 4.19) | 0.3355 | −0.70 (−8.22, 7.43) | 0.8819 |
| | Cmpd A 15 mg + Cmpd D 300 mg | 26 | −4.19 (−9.34, 1.25) | −6.22 (−14.96, 3.41) | 0.2775 | | |

The impact of the three treatment arms (Compound A monotherapy, Compound D monotherapy, and Compound A/Compound D co-administration) on key lipid parameters (Total Cholesterol, HDL-Cholesterol, LDL-Cholesterol, Non-HDL-Cholesterol) is shown above in Table 13 for Day 42, comparing each arm to placebo and Compound A/Compound D co-administration arm to each monotherapy arm. For total cholesterol, all treatment arms trended lower than placebo with a statistically significant decrease seen in the The impact of the three treatment arms (Compound A, Compound D, and Compound A/Compound D co-administration) on ApoA1, ApoB and ApoC3 was measured. The results for the statistical analysis of percent change from baseline in apolipoproteins C3 (ApoC3) on Day 42—FAS is shown in Table 14, comparing each arm to placebo and the Compound A/Compound D co-administration arm to each monotherapy arm. The LS Mean (and 90% CIs) percent change from placebo on Day 42 are given.

TABLE 14

| Day 42 | Treatment | N | % Change from Baseline LS Mean (90% CI) | % Change from Placebo LS Mean (90% CI) | % Change from Placebo 2-sided P-value | % Change of Combination vs Each Monotherapy LS Mean (90% CI) | % Change of Combination vs Each Monotherapy 2-sided P-value |
|---|---|---|---|---|---|---|---|
| ApoC3 | Placebo | 12 | 1.82 (−9.64, 14.72) | | | | |
| | Cmpd A 15 mg | 21 | 45.31 (32.75, 59.05) | 42.71 (22.86, 65.77) | 0.0002 | −24.66 (−33.31, −14.88) | 0.0002 |
| | Cmpd D 300 mg | 23 | −6.52 (−14.25, 1.90) | −8.19 (−20.75, 6.36) | 0.3365 | 17.11 (3.96, 31.93) | 0.0302 |
| | Cmpd A 15 mg + Cmpd D 300 mg | 26 | 9.48 (0.91, 18.77) | 7.52 (−6.96, 24.26) | 0.4064 | | |

ApoC3 increased in a statistically significant manner in the Compound A monotherapy arm [42.71% (22.86, 65.77)]. Surprisingly, ApoC3 did not increase with Compound D monotherapy arm [−8.19% (−20.75, 6.36)], where it remained similar to placebo. Also surpsingly, in the Compound A/Compound D co-administration arm, ApoC3 levels were also similar to placebo [7.52% (−6.96, 24.26)]; thus, Compound A-induced elevation in ApoC3 was mitigated by co-administration with Compound 0.

Other Endpoints of Interest—Liver Function Tests

Figure 27A:
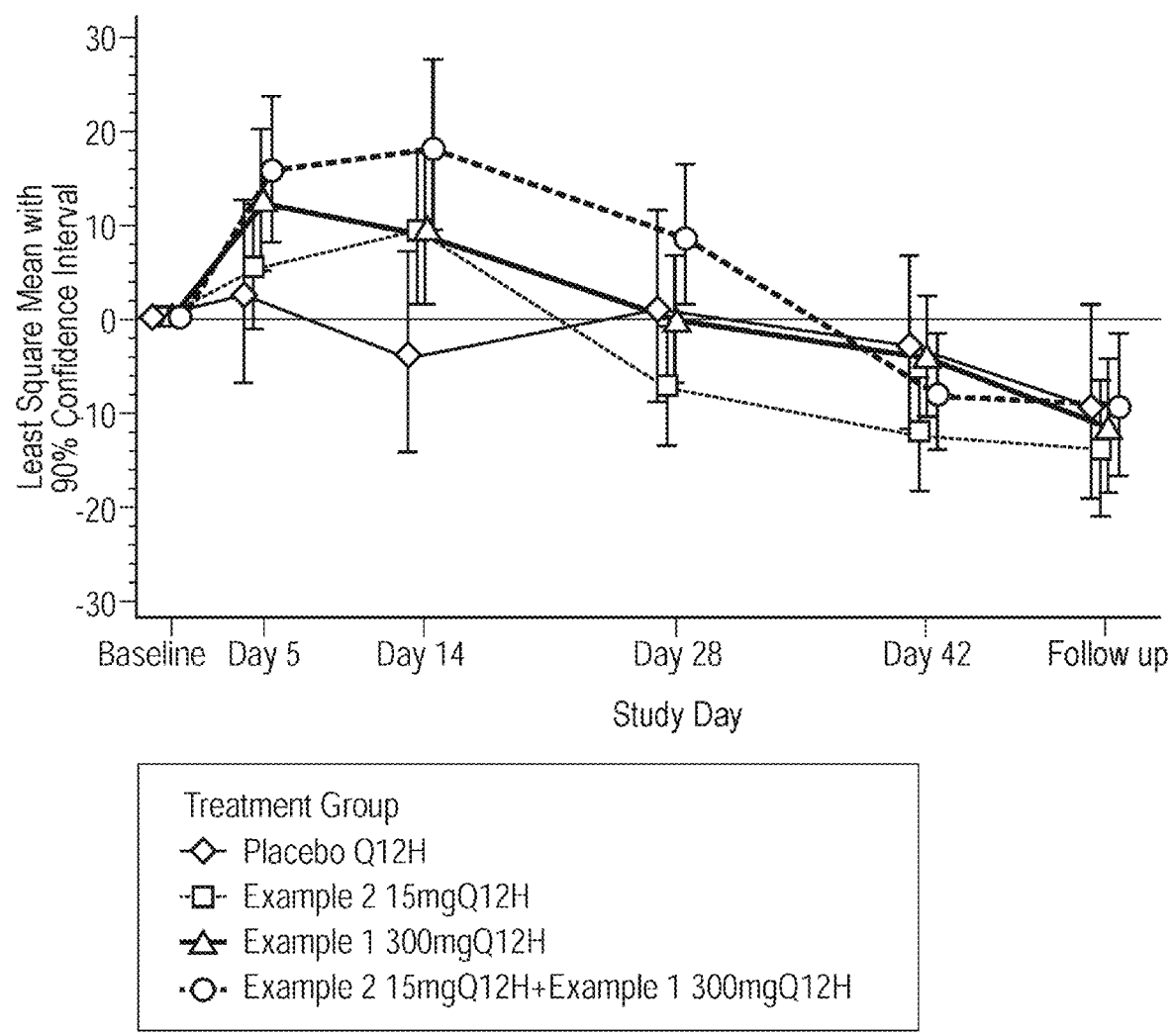
FIG. 27a shows a plot of least square means and 90% CIs for percent change from baseline in alaninine aminotransferase (ALT) for the Phase 2A study described herein.
Figure 27B:
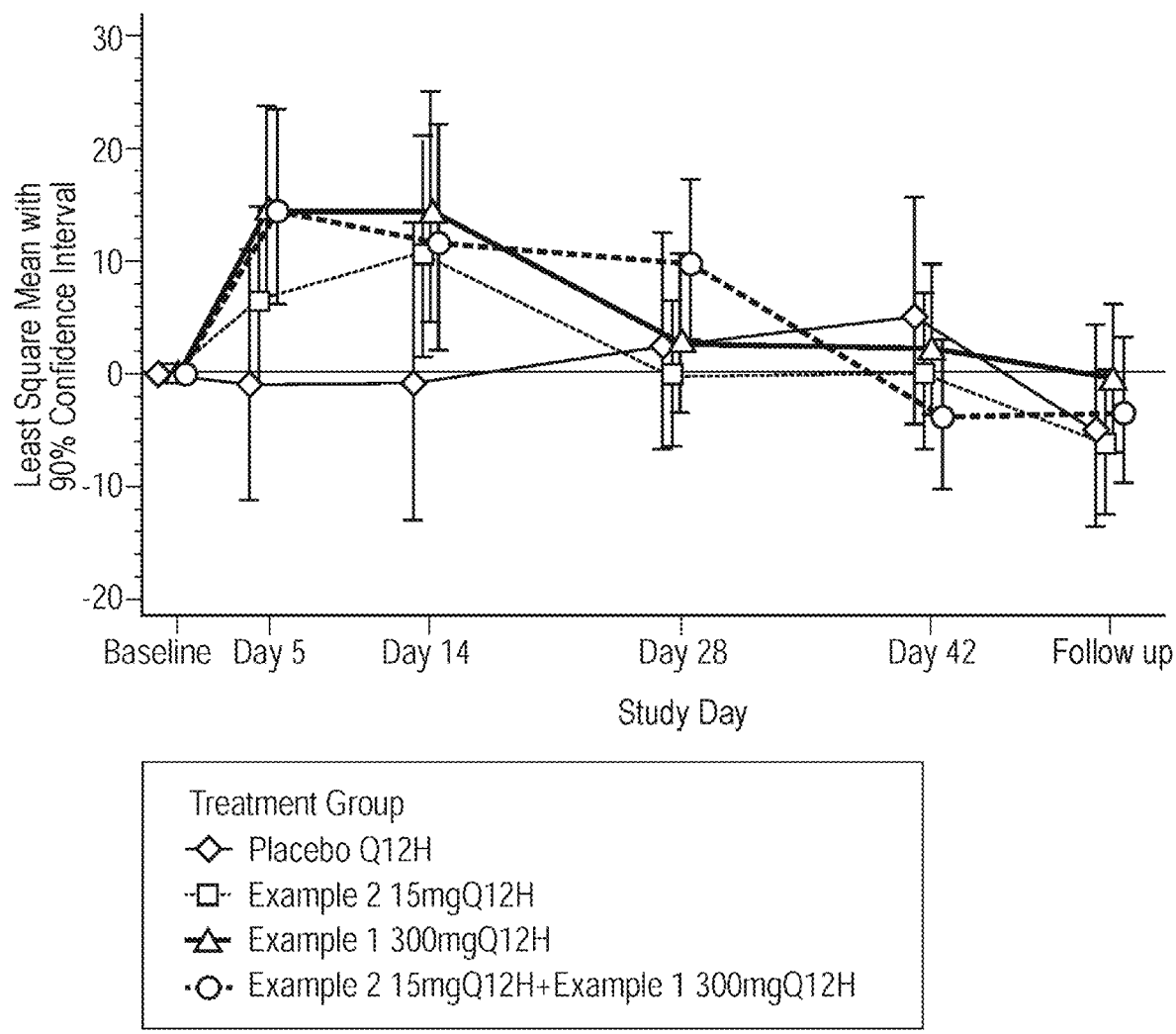
FIG. 27b shows a plot of least square means and 90% CIs for percent change from baseline in aspartate aminotransferase (AST) for the Phase 2A study described herein.
Figure 27C:
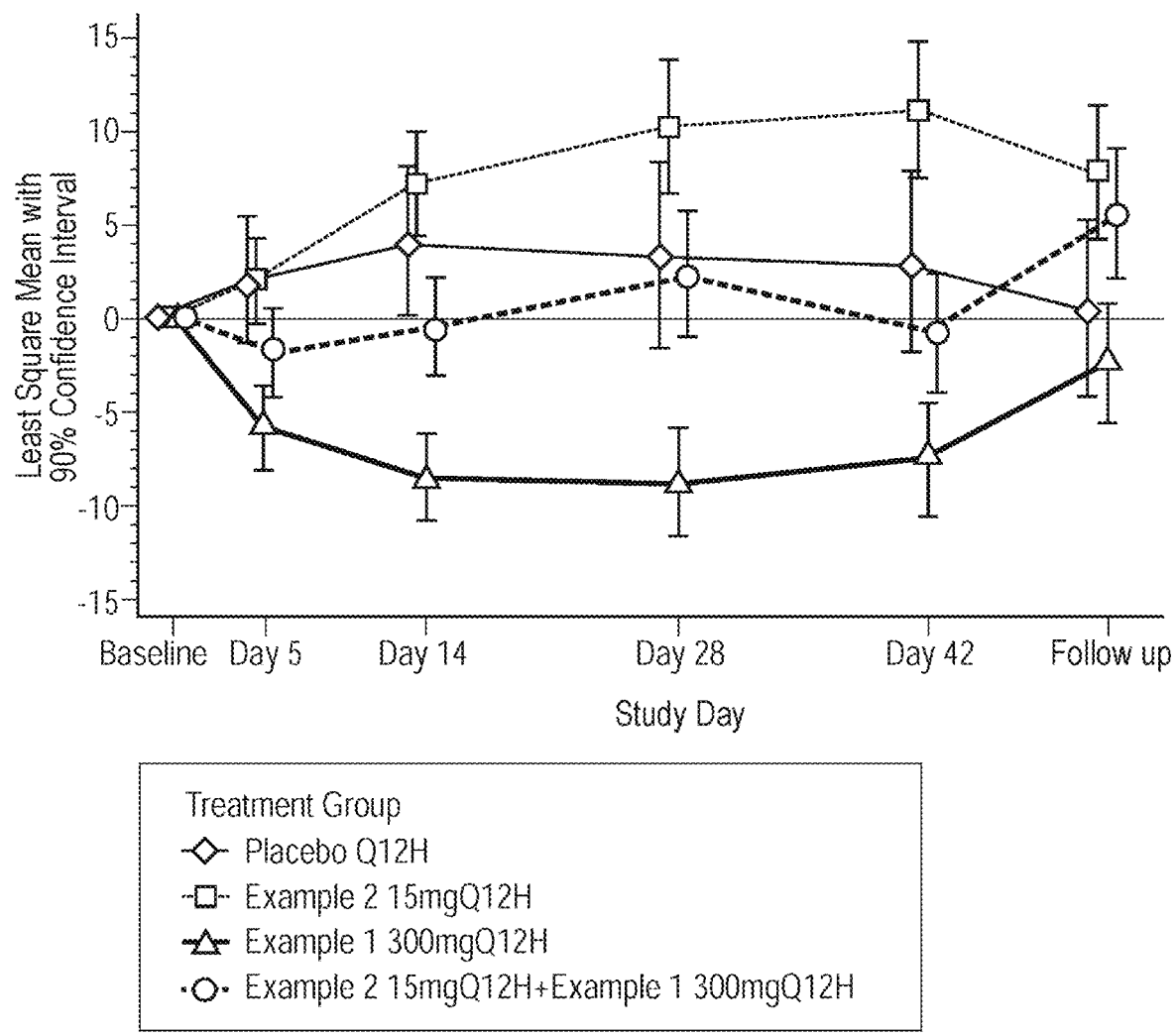
FIG. 27c shows a plot of least square means and 90% CIs for percent change from baseline in alkaline phosphotase for the Phase 2A study described herein.
Figure 27D:
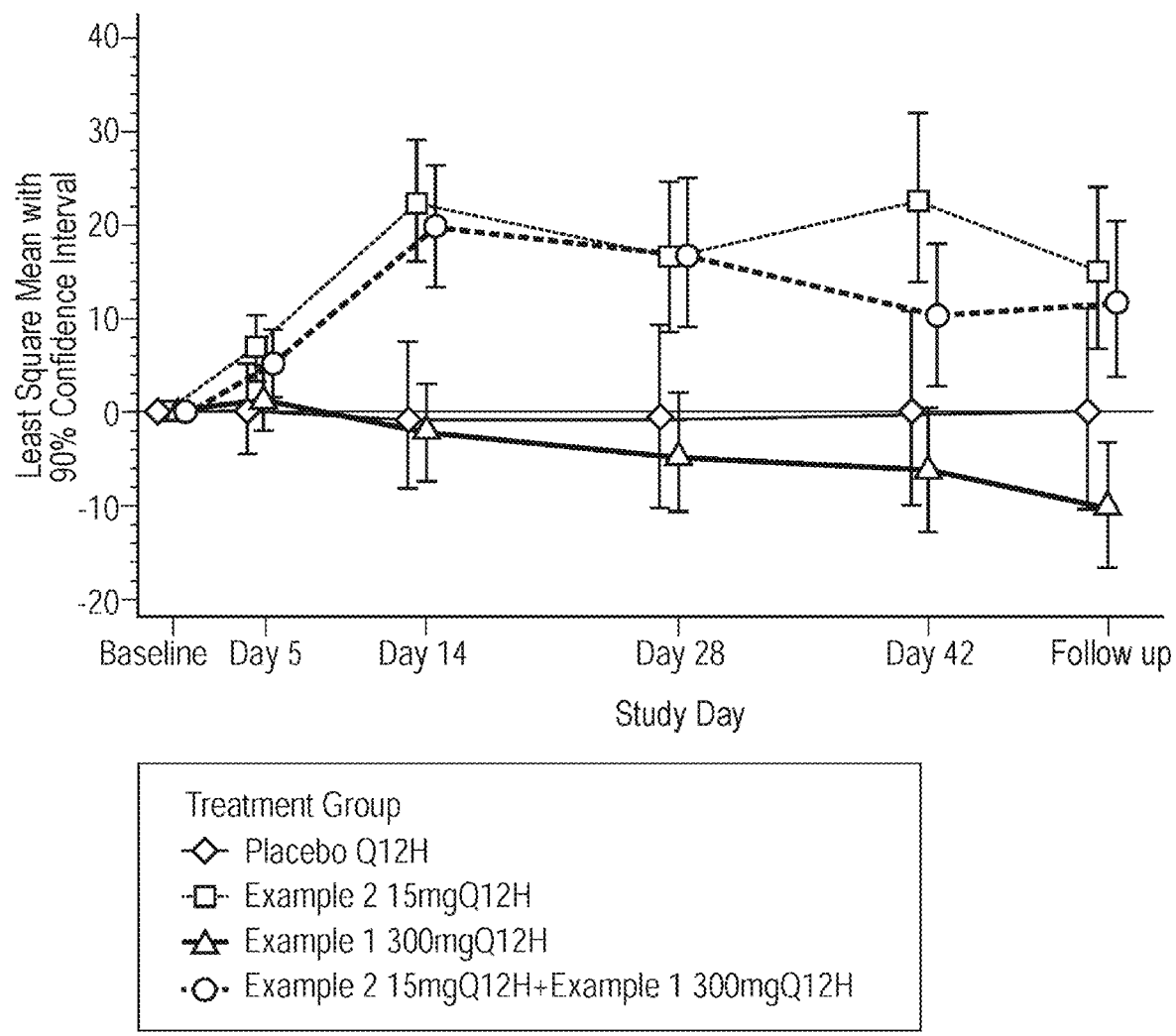
FIG. 27d shows a plot of least square means and 90% CIs for percent change from baseline in gamma glutamyl transferase (GGT) for the Phase 2A study described herein.

A summary of other endpoints of interest is provided in Table 15. The LS Mean (and 90% CIs) percent change from placebo on Day 42 are given. Table 15 provides a statistical analysis of percent change from baseline in liver function tests on Day 42—FAS. FIGS. 27a-27d provide plots of least square means and 90% CIs for percent change from baseline in liver function tests—FAS. FIG. 27a provides the plot for alanine aminotransferase (ALT); FIG. 27b provides the plot for aspartate aminotransferase (AST); FIG. 27c provides the plot for alkaline phosphotate; and FIG. 27d provides the plot for gamma glutamyl transferase (GGT).

TABLE 15

| Day 42 | Treatment | N | % Change from Baseline LS Mean (90% CI) | % Change from Placebo LS Mean (90% CI) | % Change from Placebo 2-sided P-value | % Change of Combination vs Each Monotherapy LS Mean (90% CI) | % Change of Combination vs Each Monotherapy 2-sided P-value |
|---|---|---|---|---|---|---|---|
| ALT | Placebo | 12 | −3.01 (−11.76, 6.61) | | | | |
| | Cmpd A 15 mg | 22 | −12.41 (−18.24, −6.18) | −9.70 (−19.67, 1.51) | 0.1508 | 5.15 (−4.42, 15.67) | 0.3842 |
| | Cmpd D 300 mg | 24 | −4.15 (−10.30, 2.42) | −1.18 (−11.95, 10.91) | 0.8647 | −3.92 (−12.51, 5.53) | 0.4803 |
| | Cmpd A 15 mg + Cmpd D 300 mg | 24 | −7.91 (−13.80, −1.61) | −5.05 (−15.40, 6.57) | 0.4575 | | |
| AST | Placebo | 12 | 5.13 (−4.44, 15.65) | | | | |
| | Cmpd A 15 mg | 22 | −0.03 (−6.73, 7.15) | −4.91 (−15.50, 7.01) | 0.4798 | −3.84 (−12.77, 6.01) | 0.5062 |
| | Cmpd D 300 mg | 22 | 2.21 (−4.67, 9.59) | −2.77 (−13.59, 9.40) | 0.6923 | −5.95 (−14.73, 3.74) | 0.3011 |
| | Cmpd A 15 mg + Cmpd D 300 mg | 23 | −3.87 (−10.25, 2.96) | −8.56 (−18.72, 2.88) | 0.2100 | | |
| Alkaline Phosphatase | Placebo | 12 | 2.93 (−1.78, 7.87) | | | | |
| | Cmpd A 15 mg | 22 | 11.20 (7.59, 14.92) | 8.03 (2.01, 14.40) | 0.0276 | −10.74 (−14.75, −6.53) | 0.0001 |
| | Cmpd D 300 mg | 24 | −7.51 (−10.46, −4.46) | −10.15 (−15.12, −4.88) | 0.0025 | 7.32 (2.53, 12.33) | 0.0118 |
| | Cmpd A 15 mg + Cmpd D 300 mg | 26 | −0.74 (−3.88, 2.50) | −3.57 (−8.90, 2.07) | 0.2903 | | |
| GGT | Placebo | 12 | 0.01 (−9.77, 10.85) | | | | |
| | Cmpd A 15 mg | 22 | 22.63 (14.06, 31.84) | 22.62 (8.12, 39.07) | 0.0085 | −10.16 (−18.77, −0.63) | 0.0808 |
| | Cmpd D 300 mg | 24 | −6.31 (−12.70, 0.54) | −6.32 (−17.31, 6.13) | 0.3867 | 17.60 (6.45, 29.91) | 0.0082 |
| | Cmpd A 15 mg + Cmpd D 300 mg | 26 | 10.17 (2.71, 18.18) | 10.17 (−2.73, 24.78) | 0.1995 | | |

In all treatment arms, a transient increase in ALT and AST was observed, spanning the first 4 weeks, as compared to placebo. By day 42 both were below baseline values. For alkaline phosphatase, a modest increase is noted in the placebo arm with a clear and statistically significant elevation in the Compound A monotherapy arm. Surpsingly, a clear and statistically significant decrease in alkaline phosphatase was noted in the Compound D treatment arm. In the Compound A/Compound D co-administration arm alkaline phosphatase values fluctuated around the baseline value, with no statistically significant change throughout the study. GGT showed no significant change from baseline in the placebo or the Compound D monotherpay arms, while, surprisingly, there was an increase observed in the Compound A monotherapy arms and Compound A/Compound D co-administration arms. The increase in GGT observed in the co-administration arm was significantly lower than the Compound A monotherapy arm on Day 42 only.

Safety and Tolerability

Table 16 shows the number of adverse events (all causalities) for subjects in the safety analysis set. Specifically, Table 16 shows treatment emergent adverse events (AEs) (All causalities)—safety analysis set.

TABLE 16

| Number (%) of Subjects | Placebo n (%) | Cmpd A 15 mg n (%) | Cmpd D 300 mg n (%) | Cmpd A 15 mg + Cmpd D 300 mg n (%) |
|---|---|---|---|---|
| Subjects evaluable for adverse events | 14 | 29 | 28 | 28 |
| Number of adverse events | 7 | 17 | 22 | 15 |
| Subjects with adverse events | 3 (21.4) | 10 (34.5) | 10 (35.7) | 10 (35.7) |
| Subjects with serious adverse events | 0 | 0 | 0 | 1 (3.6) |
| Subjects with severe adverse events | 0 | 1 (3.4) | 0 | 0 |
| Subjects discontinued from study due to adverse events (a) | 0 | 1 (3.4) | 1 (3.6) | 0 |
| Subjects discontinued study drug due to AE and continue Study (b) | 0 | 0 | 1 (3.6) | 0 |
| Subjects with dose reduced or temporary discontinuation due to adverse events | 0 | 1 (3.4) | 0 | 0 |

(a) Subjects who have an AE record that indicates that the AE caused the subject to be discontinued from the study
(b) Subjects who have an AE record that indicates that action taken with study treatment was drug withdrawn but AE did not cause the subject to be discontinued from study Incidence of AEs was similar between the Compound A/Compound D co-administration arm and both monotherapy treatment arms. One SAE of 'Mandibular Abcess' was reported in the Compound A/Compound D co-administration arm (deemed not treatment related). Two subjects were discontinued from study drug due to AEs. One subject in the Compound A monotherapy arm was discontinued due to severe AE of TG elevation (deemed treatment related); the subject remained asymptomatic. Another subject in the Compound D monotherapy arm was discontinued from study drug due to mild AE of creatine kinase and AST elevations (deemed not treatment related). With the exception of the TG, CK and AST elevations noted above, no major laboratory abnormalities were noted. Overall, all treatments were safe and well tolerated.

Other Safety Endpoints of Interest

Table 17 provides a statistical analysis of percent change from baseline in platelets on Day 42—FAS.

TABLE 17

| Day 42 | Treatment | N | % Change from Baseline LS Mean (90% CI) | % Change from Placebo LS Mean (90% CI) | % Change from Placebo 2-sided P-value | % Change of Combination vs Each Monotherapy LS Mean (90% CI) | % Change of Combination vs Each Monotherapy 2-sided P-value |
|---|---|---|---|---|---|---|---|
| Platelets | Placebo | 12 | −2.40 (−8.76, 4.40) | | | | |
| | Cmpd A 15 mg | 22 | −9.35 (−13.66, −4.82) | −7.12 (−14.51, 0.91) | 0.1423 | 9.00 (1.87, 16.62) | 0.0371 |
| | Cmpd D 300 mg | 24 | 4.92 (0.10, 9.97) | 7.50 (−0.99, 16.71) | 0.1473 | −5.83 (−11.86, 0.62) | 0.1351 |
| | Cmpd A 15 mg + Cmpd D 300 mg | 25 | −1.2 (−5.70, 3.52) | 1.23 (−6.75, 9.91) | 0.8044 | | |

A numerical trend for decrease over time in platelets was observed in the Compound A monotherapy treatment arm as compared to placebo. No decrease in platelets was noted in the Compound D monotherapy arm. It was surprisingly discovered that no decrease in platelets was also observed with Compound A/Compound D co-administration arms, relative to placebo.

Throughout this application, various publications are referenced. The disclosures of these publications in their entireties are hereby incorporated by reference into this application for all purposes.

It will be apparent to those skilled in the art that various modifications and variations can be made in the invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for treating a disease or condition selected from fatty liver, nonalcoholic fatty liver disease, nonalcoholic steatohepatitis, nonalcoholic steatohepatitis with liver fibrosis, nonalcoholic steatohepatitis with cirrhosis, and nonalcoholic steatohepatitis with cirrhosis and with hepatocellular carcinoma or with a metabolic-related disease, the method comprising the steps of:
   administering to a human in need thereof a therapeutically effective amount of a composition comprising from about 5 mg to about 1200 mg of (S)-2-(5-((3-ethoxypyridin-2-yl)oxy)pyridin-3-yl)-N-(tetrahydrofuran-3-yl)pyrimidine-5-carboxamide or a pharmaceutically acceptable salt thereof, and from about 5 mg to about 60 mg of 4-(4-(1-Isopropyl-7-oxo-1,4,6,7-tetrahydrospiro[indazole-5,4'-piperidine]-1'-carbonyl)-6-methoxypyridin-2-yl)benzoic acid or a pharmaceutically acceptable salt thereof.

2. A method for treating a disease or condition selected from fatty liver; alcoholic fatty liver disease; alcoholic steatohepatitis; alcoholic steatohepatitis with liver fibrosis; alcoholic steatohepatitis with cirrhosis; and alcoholic steatohepatitis with cirrhosis and with hepatocellular carcinoma or with a metabolic-related disease, the method comprising the steps of:
   administering to a human in need thereof a therapeutically effective amount of a composition comprising from about 5 mg to about 1200 mg of (S)-2-(5-((3-ethoxypyridin-2-yl)oxy)pyridin-3-yl)-N-(tetrahydrofuran-3-yl)pyrimidine-5-carboxamide or a pharmaceutically acceptable salt thereof, and from about 5 mg to about 60 mg of 4-(4-(1-Isopropyl-7-oxo-1,4,6,7-tetrahydrospiro[indazole-5,4'-piperidine]-1'-carbonyl)-6-methoxypyridin-2-yl)benzoic acid or a pharmaceutically acceptable salt thereof.

3. A method for treating a cardiovascular disease or condition selected from atherosclerosis, stroke, myocardial infarction, aortic vascular disease, cerebral vascular disease, renal vascular disease, heart failure, atrial fibrillation, or coronary heart disease, the method comprising the steps of:
   administering to a human in need thereof a therapeutically effective amount of a composition comprising from about 5 mg to about 1200 mg of (S)-2-(5-((3-ethoxypyridin-2-yl)oxy)pyridin-3-yl)-N-(tetrahydrofuran-3-yl)pyrimidine-5-carboxamide or a pharmaceutically acceptable salt thereof, and from about 5 mg to about 60 mg of 4-(4-(1-Isopropyl-7-oxo-1,4,6,7-tetrahydrospiro[indazole-5,4'-piperidine]-1'-carbonyl)-6-methoxypyridin-2-yl)benzoic acid or a pharmaceutically acceptable salt thereof.

4. A method for treating a metabolic disease or condition selected from obesity, dyslipidemia, type 2 diabetes mellitus, glycemic control in patients with type 2 diabetes mellitus, conditions of impaired glucose tolerance (IGT), conditions of impaired fasting plasma glucose, metabolic syndrome, syndrome X, hyperglycemia, hyperinsulinemia, insulin resistance, or impaired glucose metabolism, the method comprising the steps of:
   administering to a human in need thereof a therapeutically effective amount of a composition comprising from about 5 mg to about 1200 mg of (S)-2-(5-((3-ethoxypyridin-2-yl)oxy)pyridin-3-yl)-N-(tetrahydrofuran-3-yl)pyrimidine-5-carboxamide or a pharmaceutically acceptable salt thereof, and from about 5 mg to about 60 mg of 4-(4-(1-Isopropyl-7-oxo-1,4,6,7-tetrahydrospiro[indazole-5,4'-piperidine]-1'-carbonyl)-6-methoxypyridin-2-yl)benzoic acid or a pharmaceutically acceptable salt thereof.

5. The method according to claim 1, wherein the ratio of the of S)-2-(5-((3-ethoxypyridin-2-yl)oxy)pyridin-3-yl)-N-(tetrahydrofuran-3-yl)pyrimidine-5-carboxamide or a pharmaceutically acceptable salt thereof to 4-(4-(1-Isopropyl-7-oxo-1,4,6,7-tetrahydrospiro[indazole-5,4'-piperidine]-1'-carbonyl)-6-methoxypyridin-2-yl)benzoic acid or a pharmaceutically acceptable salt thereof is about 1:1, about 5:1, about 10:1, about 15:1, about 20:1, or about 30:1.

6. The method according to claim 1, wherein the therapeutically effective amount of (S)-2-(5-((3-ethoxypyridin-2-yl)oxy)pyridin-3-yl)-N-(tetrahydrofuran-3-yl)pyrimidine-5-carboxamide or a pharmaceutically acceptable salt thereof is about 5 mg, about 10 mg, about 15 mg, about 20 mg, about 25 mg, about 50 mg, about 75 mg, about 100 mg, about 150 mg, about 200 mg, about 225 mg, about 300 mg, about 400 mg, about 450 mg, about 600 mg or about 1200 mg; and the therapeutically effective amount of the 4-(4-(1-Isopropyl-7-oxo-1,4,6,7-tetrahydrospiro[indazole-5,4'-piperidine]-1'-carbonyl)-6-methoxypyridin-2-yl)benzoic acid or a pharmaceutically acceptable salt thereof is about 5 mg, about 10 mg, about 15 mg, about 20 mg, about 40 mg, about 50 mg, or about 60 mg.

7. The method of claim 6, wherein the therapeutically effective amount of (S)-2-(5-((3-ethoxypyridin-2-yl)oxy)pyridin-3-yl)-N-(tetrahydrofuran-3-yl)pyrimidine-5-carboxamide or a pharmaceutically acceptable salt thereof is about 300 mg.

8. The method of claim 7, wherein the therapeutically effective amount of the 4-(4-(1-Isopropyl-7-oxo-1,4,6,7-tetrahydrospiro[indazole-5,4'-piperidine]-1'-carbonyl)-6-methoxypyridin-2-yl)benzoic acid or a pharmaceutically acceptable salt thereof is about 10 mg.

9. The method of claim 7, wherein the therapeutically effective amount of the 4-(4-(1-Isopropyl-7-oxo-1,4,6,7-tetrahydrospiro[indazole-5,4'-piperidine]-1'-carbonyl)-6-methoxypyridin-2-yl)benzoic acid or a pharmaceutically acceptable salt thereof is about 15 mg.

10. The method of claim 7, wherein the therapeutically effective amount of the 4-(4-(1-Isopropyl-7-oxo-1,4,6,7-tetrahydrospiro[indazole-5,4'-piperidine]-1'-carbonyl)-6-methoxypyridin-2-yl)benzoic acid or a pharmaceutically acceptable salt thereof is about 20 mg.

11. The method according to claim 1, wherein the composition is administered once a day.

12. The method according to claim 1, wherein the composition is administered twice a day.

13. The method according to claim 1, wherein the (S)-2-(5-((3ethoxypyridin-2-yl)oxy)pyridin-3-yl)-N-(tetrahydrofuran-3-yl)pyrimidine-5-carboxamide is a crystalline solid of structure:

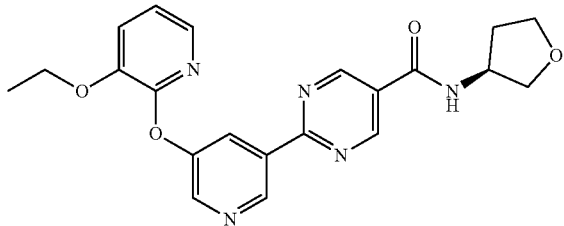 [SMILES: CCOc1cccnc1Oc1cncc(-c2ncc(C(=O)N[C@H]3CCOC3)cn2)c1]

or a pharmaceutically acceptable salt thereof.

14. The method of claim 13, wherein the crystalline solid has a powder x-ray diffraction pattern comprising 2-theta values of (CuKα radiation, wavelength of 1.54056 Å) 5.3±0.2, 7.7±0.2, and 15.4±0.2.

15. The method of claim 13, wherein the crystalline solid has a powder x-ray diffraction pattern comprising 2-theta values of (CuKα radiation, wavelength of 1.54056 Å) 6.5±0.2, 9.3±0.2, and 13.6±0.2.

16. The method according to claim 1, wherein the 4-(4-(1-Isopropyl-7-oxo-1,4,6,7-tetrahydrospiro[indazole-5,4'-piperidine]-1'-carbonyl)-6-methoxypyridin-2-yl)benzoic acid is a crystalline solid of structure:

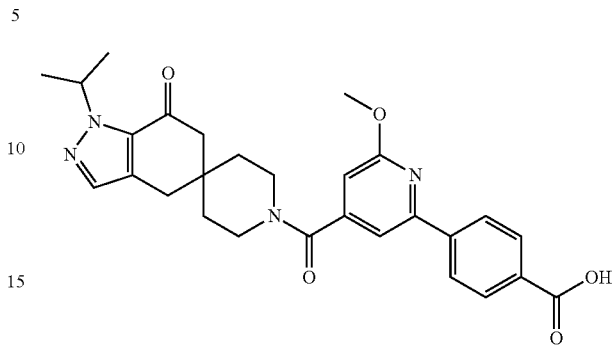

or a pharmaceutically acceptable salt thereof.

17. The method of claim 16, wherein the crystalline solid is 2-amino-2-(hydroxymethyl) propane-1,3-diol salt of 4-(4-(1-isopropyl-7-oxo-1,4,6,7-tetrahydrospiro[indazole-5,4'-piperidine]-1'-carbonyl)-6-methoxypyridin-2-yl)benzoic acid.

* * * * *